(12) United States Patent  
Nishikawa et al.

(10) Patent No.: US 9,316,400 B2  
(45) Date of Patent: Apr. 19, 2016

(54) APPLIANCE CONTROL METHOD, SPEECH-BASED APPLIANCE CONTROL SYSTEM, AND COOKING APPLIANCE

(71) Applicant: Panasonic Intellectual Property Corporation of America, Torrance, CA (US)

(72) Inventors: Yuri Nishikawa, Osaka (JP); Aki Yoneda, Hyogo (JP); Katsuyoshi Yamagami, Osaka (JP)

(73) Assignee: PANASONIC INTELLCTUAL PROPERTY CORPORATION OF AMERICA, Torrance, CA (US)

( * ) Notice: Subject to any disclaimer, the term of this patent is extended or adjusted under 35 U.S.C. 154(b) by 65 days.

(21) Appl. No.: 14/473,263

(22) Filed: Aug. 29, 2014

(65) Prior Publication Data

US 2015/0066516 A1 Mar. 5, 2015

Related U.S. Application Data

(60) Provisional application No. 61/873,140, filed on Sep. 3, 2013.

(30) Foreign Application Priority Data

Jul. 1, 2014 (JP) .................................. 2014-135827

(51) Int. Cl.

| G10L 21/00 | (2013.01) |
| G10L 25/00 | (2013.01) |
| F24C 7/08 | (2006.01) |
| G10L 15/22 | (2006.01) |

(52) U.S. Cl.  
CPC .. *F24C 7/08* (2013.01); *G10L 15/22* (2013.01)

(58) Field of Classification Search  
None  
See application file for complete search history.

(56) References Cited

U.S. PATENT DOCUMENTS

| 6,778,964 B2* | 8/2004 | Geiger | G10L 15/26 704/270 |
| 2003/0040915 A1* | 2/2003 | Aubauer | G10L 15/063 704/275 |
| 2011/0132201 A1 | 6/2011 | Richardson et al. | |
| 2013/0092032 A1* | 4/2013 | Cafferty | F24C 7/08 99/325 |
| 2013/0201316 A1* | 8/2013 | Binder | H04L 67/12 348/77 |

FOREIGN PATENT DOCUMENTS

| DE | 102005018276 | 10/2006 |
| EP | 0031142 | 7/1981 |
| JP | 2002-091491 | 3/2002 |

OTHER PUBLICATIONS

European Search report in European Patent Application No. 14183039.8, mail date is Feb. 23, 2015.

* cited by examiner

*Primary Examiner* — Marcus T Riley  
(74) *Attorney, Agent, or Firm* — Greenblum & Bernstein, P.L.C.

(57) ABSTRACT

In a case of receiving, from an audio input device, instruction information including first audio information indicating operation instructions for a cooking appliance when first and second cooking units are executing first and second cooking programs, respectively, operation instructions are recognized from the first audio information. In a case where it is determined that the instruction information includes second audio information related to the first cooking menu information or the second cooking menu information, a control command is transmitted to the cooking appliance to cause the cooking appliance to execute a process corresponding to the operation instructions, without executing a process according to the first cooking program or the second cooking program corresponding to one of the first cooking menu information or the second cooking menu information to which the second audio information is related.

23 Claims, 44 Drawing Sheets

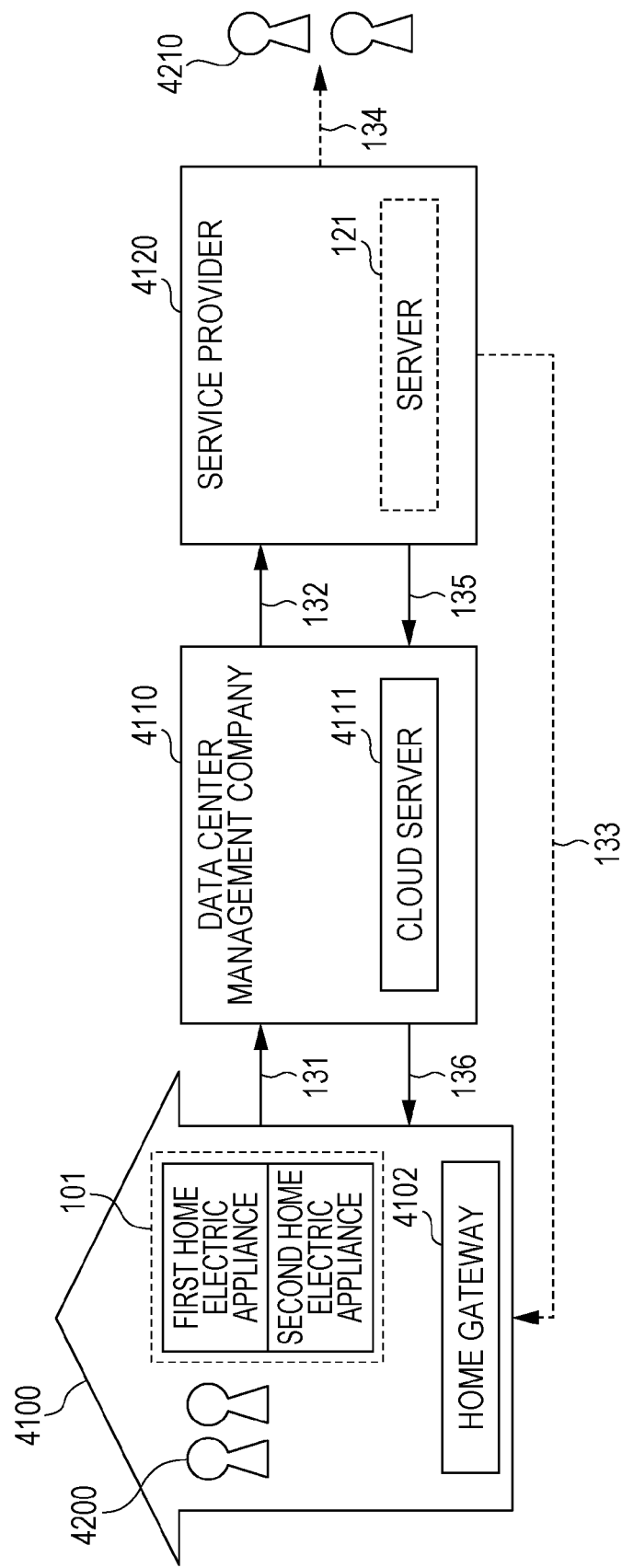

| WORD ID | WORD NAME | RELATED WORD ID | TYPE | CONCEPT |
|---|---|---|---|---|
| W001 | POT | | <equipment> | <pot> |
| W002 | FRYING PAN | | <equipment> | <pan> |
| ... | | | | |
| W010 | HAMBURGER STEAK | W030 | <menu> | <hamburger> |
| W011 | BEEF STEW | W020, W031 | <menu> | <beef_stew> |
| W012 | CHIKUZEN-NI STEW | W020 | <menu> | <chikuzen_ni> |
| W013 | GRATIN | W021, W031 | <menu> | <gratin> |
| ... | | | | |
| W020 | STEW | W011, W012 | <category> | <stewed> |
| W021 | GRILL | W013 | <category> | <grill> |
| ... | | | | |

| WORD ID | WORD NAME | RELATED WORD ID | TYPE | CONCEPT |
|---|---|---|---|---|
| W030 | GROUND MEAT | W010 | <ingredient> | <grind_meat> |
| W031 | ONION | W011, W013 | <ingredient> | <onion> |
| ... | | | | |
| W080 | IH COOKER | | <appliance> | <ih_heater> |
| W081 | OVEN RANGE | | <appliance> | <stove> |
| ... | | | | |
| W100 | TURN OFF THE HEAT | | <task> | <stop_heat> |
| W101 | LOW HEAT | | <task> | <low_heat> |

| WORD ID | WORD NAME | TYPE | CONCEPT |
|---------|-----------|------|---------|
| W020 | STEW | <category> | <stewed> |
| W100 | TURN OFF THE HEAT | <task> | <stop_heat> |
| W011 | BEEF STEW | <menu> | <beef_stew> |
| W012 | CHIKUZEN-NI STEW | <menu> | <chikuzen_ni> |

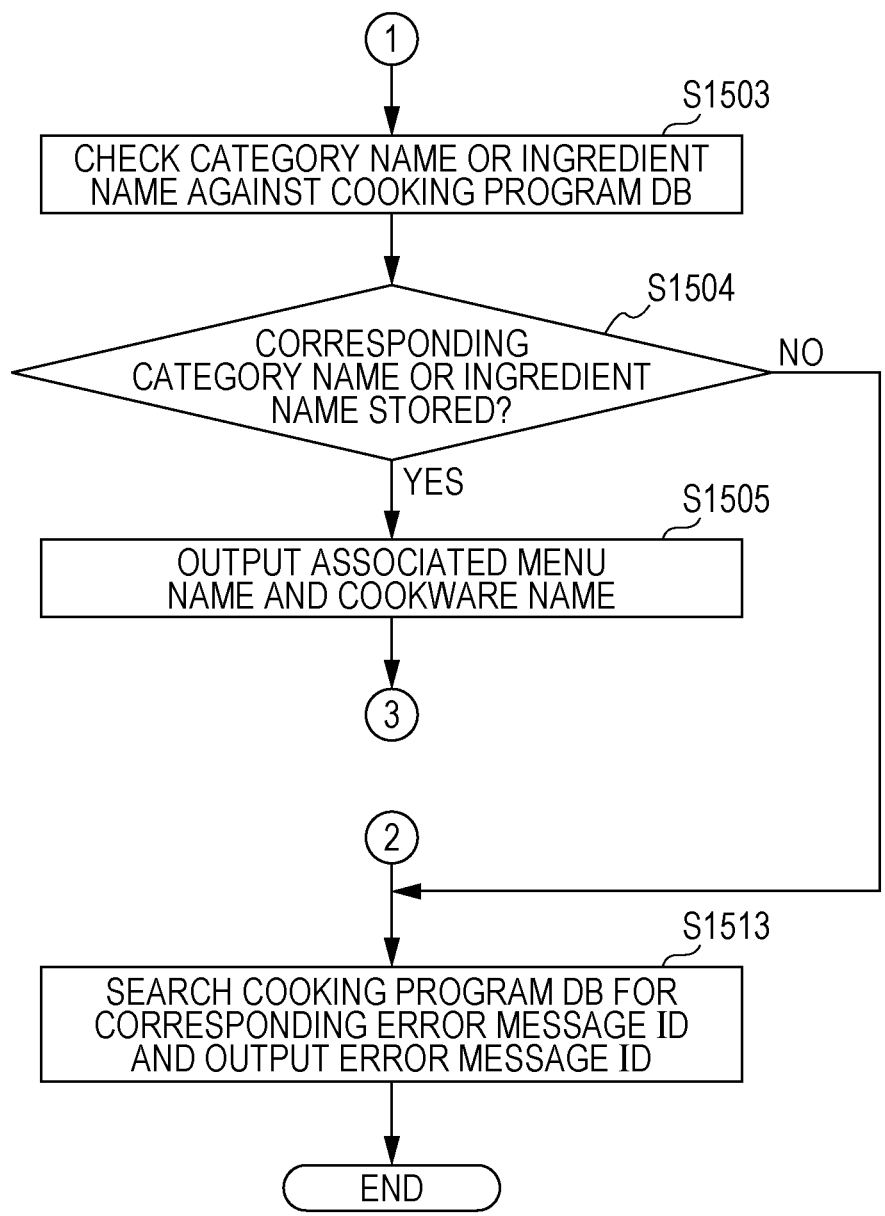

| GW-ID | APPLIANCE ID | APPLIANCE NAME <appliance> | ONGOING COOKING PROGRAM ID | ONGOING COOKING STEP ID | COOKWARE NAME <equipment> | MENU NAME <menu> | APPLIANCE OPERATING STATE |
|---|---|---|---|---|---|---|---|
| G001 | M01-01 (IH COOKER: HEATER 1) | <ih_heater> | T001 | S001 | <pot> | <chikuzen_ni> | IN STANDBY MODE |
| | M01-02 (IH COOKER: HEATER 2) | <ih_heater> | T002 | S002 | <pan> | <hamburger> | IN OPERATION (OVER LOW HEAT) |
| | M01-03 (IH COOKER: HEATER 3) | <ih_heater> | NONE | | — | — | — |
| | M02-01 (OVEN RANGE: TOP RACK) | <stove> | T003 | S002 | <gratin_plate> | <gratin> | IN OPERATION (2 MINUTES LEFT) |
| | M02-01 (OVEN RANGE: BOTTOM RACK) | <stove> | NONE | | — | — | — |
| | M03-01 (REFRIGERATOR) | <fridge> | NONE | | — | — | — |
| | ⋮ | ⋮ | ⋮ | | | | ⋮ |
| G002 | ⋮ | ⋮ | ⋮ | | | | ⋮ |

| FUNCTION ID | APPLIANCE ID | TASK CONTENT <task> | CONTROL COMMAND | RESPONSE MESSAGE |
|---|---|---|---|---|
| O01-01-01 | M01-01 | <begin_heat> | CMD=0xFFA05050 | "THE HEATER 1 WAS TURNED ON." |
| O01-01-02 | | <stop_heat> | CMD=0xFFA05051 | "THE HEATER 1 WAS TURNED OFF." |
| O01-01-03 | | <high_heat> | CMD=0xFFA05052 | "THE HEATER 1 WAS TURNED UP HIGH." |
| O01-01-04 | | <low_heat> | CMD=0xFFA05053 | "THE HEATER 1 WAS TURNED DOWN LOW." |
| ⋮ | | ⋮ | ⋮ | ⋮ |
| O02-01-01 | M02-01 | <microwave_mode> | CMD=0xFFB05050 | "THE TOP RACK WAS SET TO THE MICROWAVE MODE." |
| O02-01-02 | | <oven_mode> | CMD=0xFFB05051 | "THE TOP RACK WAS SET TO THE OVEN MODE." |
| O02-01-03 | | <stop_upper_heat> | CMD=0xFFB05052 | "THE HEAT AT THE TOP RACK WAS TURNED OFF." |
| ⋮ | | ⋮ | ⋮ | ⋮ |

| COOKING PROGRAM ID | MENU NAME <menu> | COOKWARE NAME <equipment> | INGREDIENT NAME <ingredient> | CATEGORY NAME <category> |
|---|---|---|---|---|
| T001 | <chikuzen_ni> | <pot> | <chicken> <carrot> ... | <stewed> |
| T002 | <hamburg> | <pan> | <grind_meat> <onion> ... | <grill> |
| T003 | <gratin> | <gratin_plate> | <chicken> <onion> ... | <grill> |
| ... | ... | ... | | |

| COOKING PROGRAM ID | COOKING STEP ID | RESPONSE MESSAGE |
|---|---|---|
| T001 | S001 | "POUR 400 CC OF PURIFIED WATER INTO THE POT ON THE STOVE." |
|  | S002 | "HEAT THE POT OVER A HIGH HEAT." |
| ⋮ | ⋮ | ⋮ |
| T002 | S001 | "CHOP ONION INTO SMALL PIECES." |
|  | S002 | "HEAT THE FRYING PAN ON THE STOVE OVER A LOW HEAT." |
| ⋮ | ⋮ | ⋮ |

| ERROR MESSAGE ID | ERROR TYPE | RESPONSE ERROR MESSAGE |
|---|---|---|
| E001 | NO CATEGORIES | "XXX IS NOT BEING USED RIGHT NOW." |
| E002 | NO CATEGORIES, MENU ITEMS, OR INGREDIENTS | "XXX IS NOT BEING MADE RIGHT NOW." |
| E003 | NO APPLIANCES | "XXX IS NOT AVAILABLE RIGHT NOW." |
| E004 | REDUNDANCY IN APPLIANCE, COOKWARE ITEM, CATEGORY, AND INGREDIENT | "PLEASE ENTER THE NAME OF A MENU ITEM." |
| E005 | REDUNDANCY IN MENU ITEM | "XXX IS BEING MADE RIGHT NOW." |
| E006 | NO AVAILABLE FUNCTIONS | "NO FUNCTIONS ARE AVAILABLE." |

1920

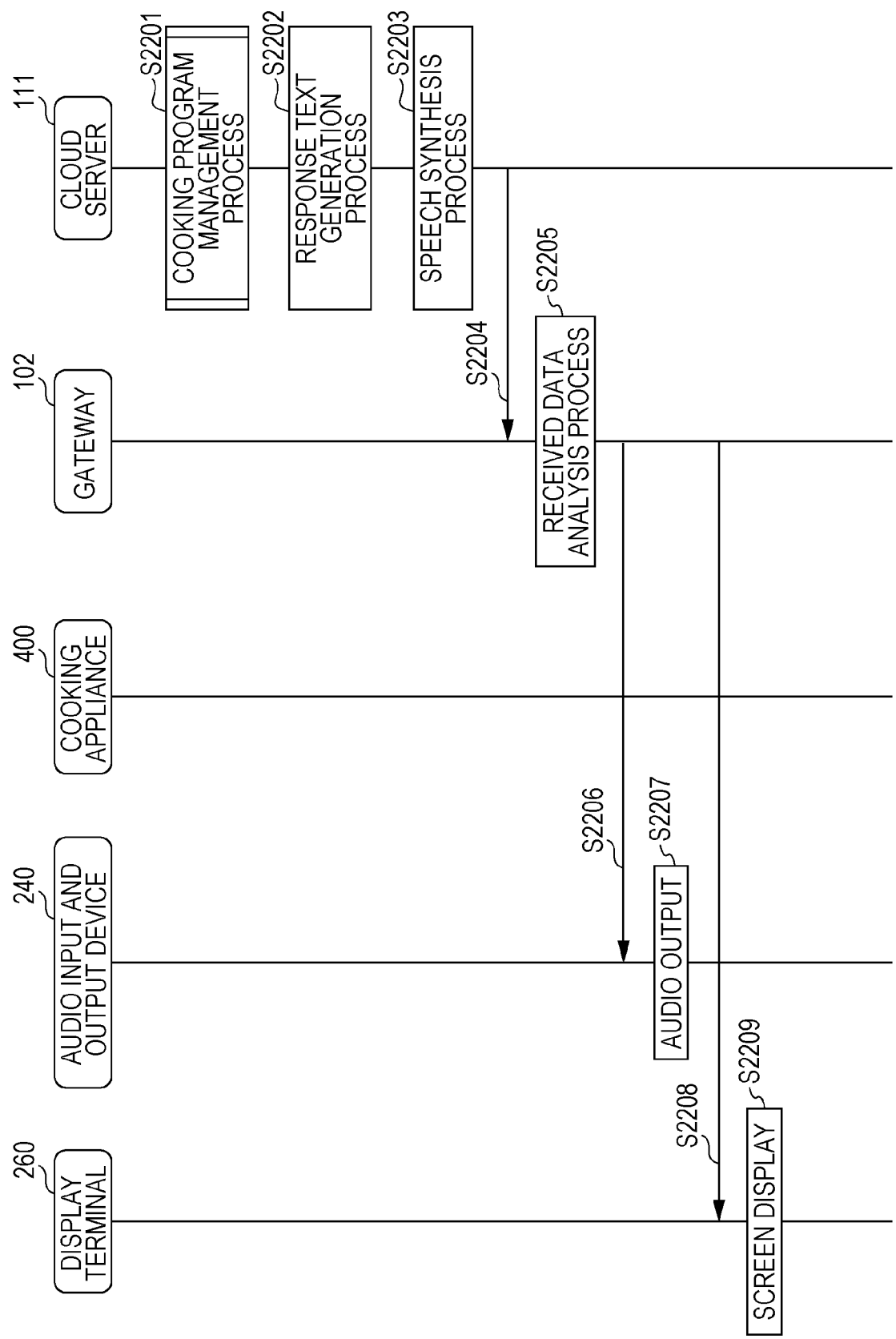

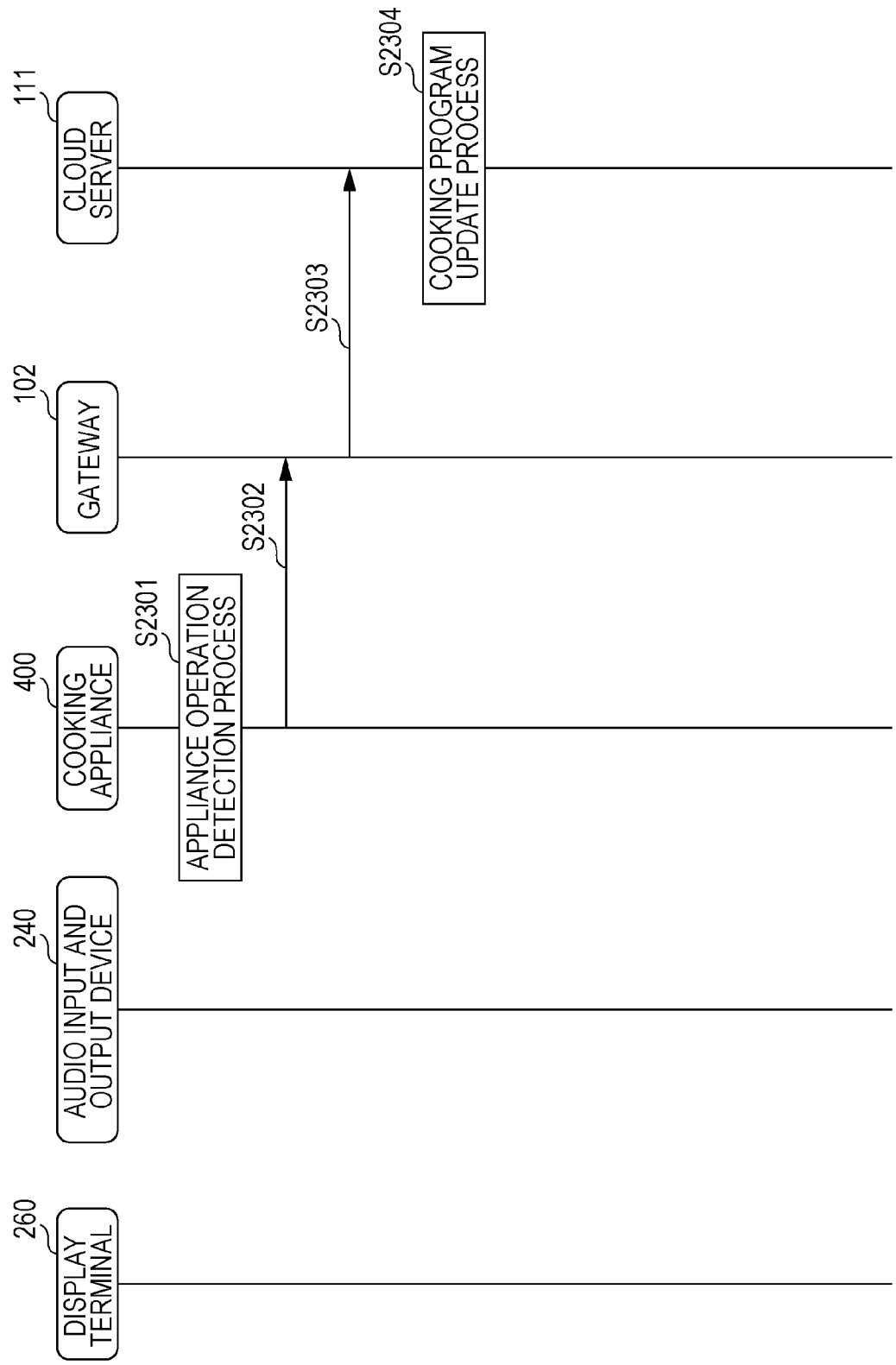

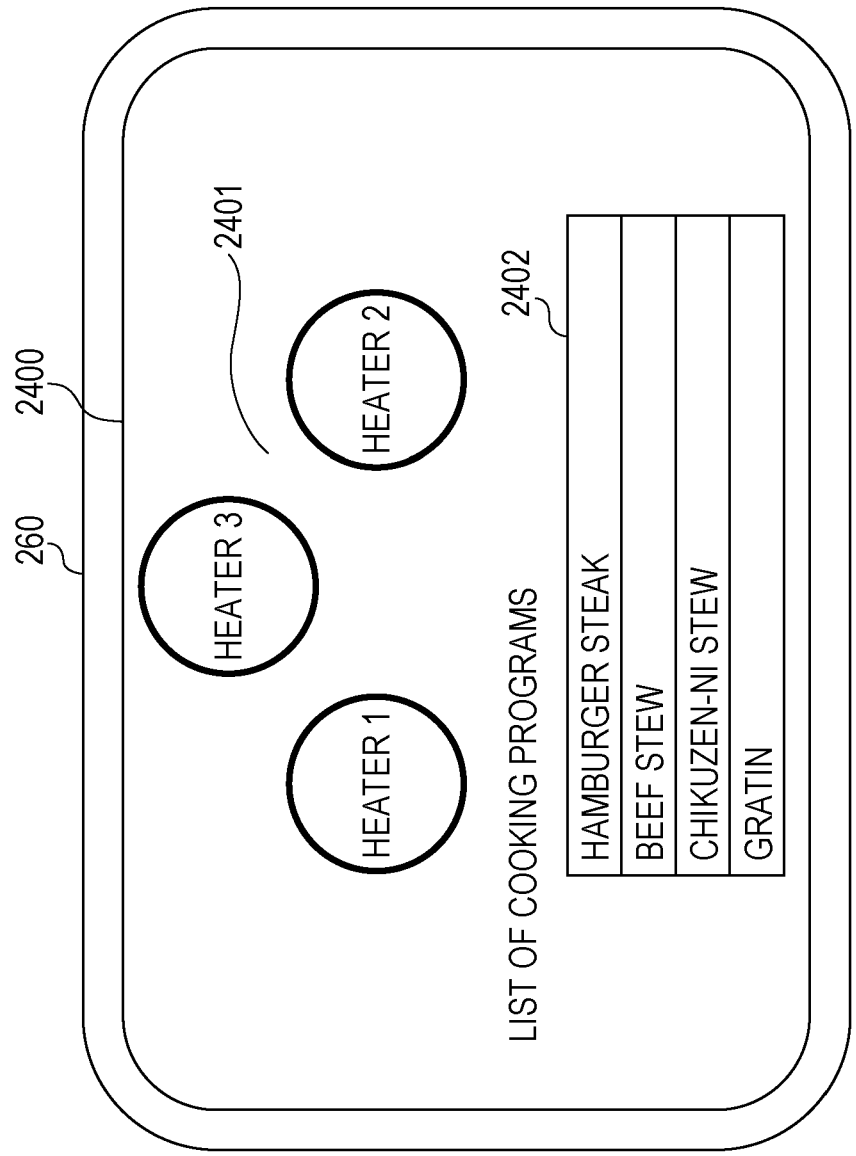

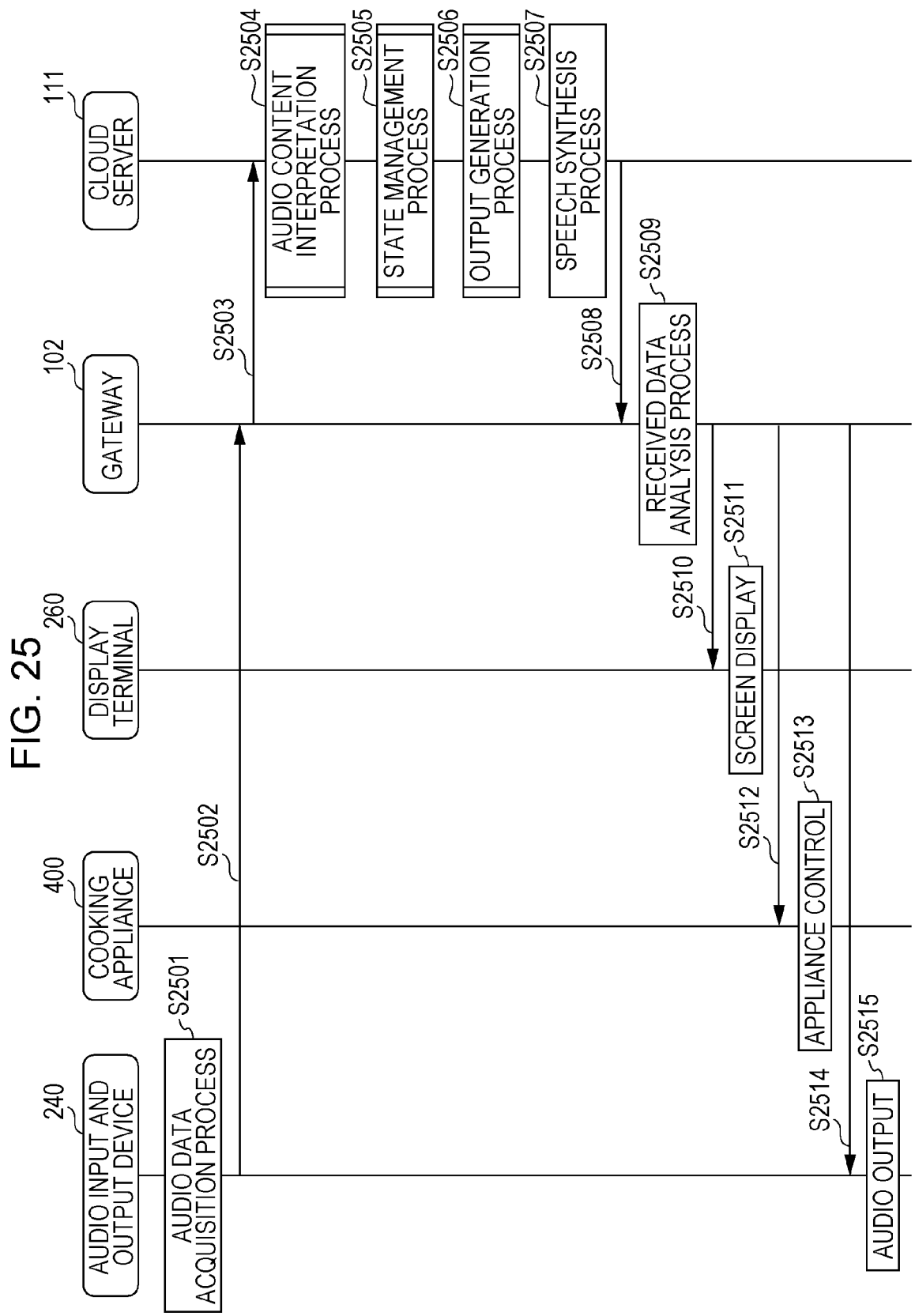

| APPLIANCE ID | APPLIANCE NAME \<appliance\> | ONGOING COOKING PROGRAM ID | ONGOING COOKING STEP ID | COOKWARE NAME \<equipment\> | MENU NAME \<menu\> | APPLIANCE OPERATING STATE |
|---|---|---|---|---|---|---|
| M01-01 (IH COOKER: HEATER 1) | \<ih_heater\> | T001 | S001 | \<pot\> | \<chikuzen_ni\> | IN STANDBY MODE |
| M01-02 (IH COOKER: HEATER 2) | \<ih_heater\> | T002 | S002 | \<pan\> | \<hamburger\> | IN OPERATION (OVER LOW HEAT) |
| M01-03 (IH COOKER: HEATER 3) | \<ih_heater\> | NONE | | - | - | - |
| M02-01 (OVEN RANGE: TOP RACK) | \<stove\> | T003 | S002 | \<gratin_plate\> | \<gratin\> | IN OPERATION (2 MINUTES LEFT) |
| M02-01 (OVEN RANGE: BOTTOM RACK) | \<stove\> | NONE | | - | - | - |
| M03-01 (REFRIGERATOR) | \<fridge\> | NONE | | - | - | - |
| ... | ... | | | | | ... |

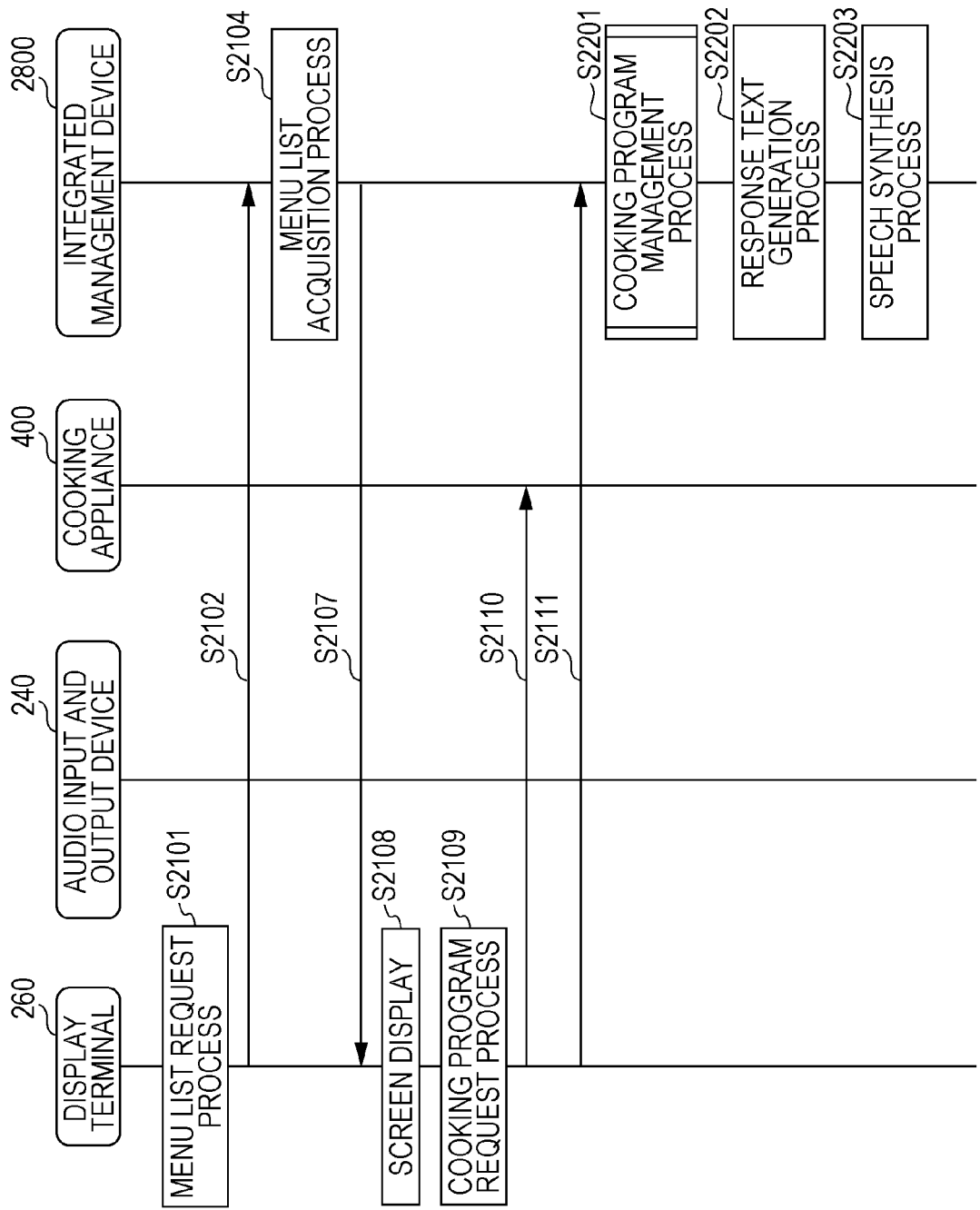

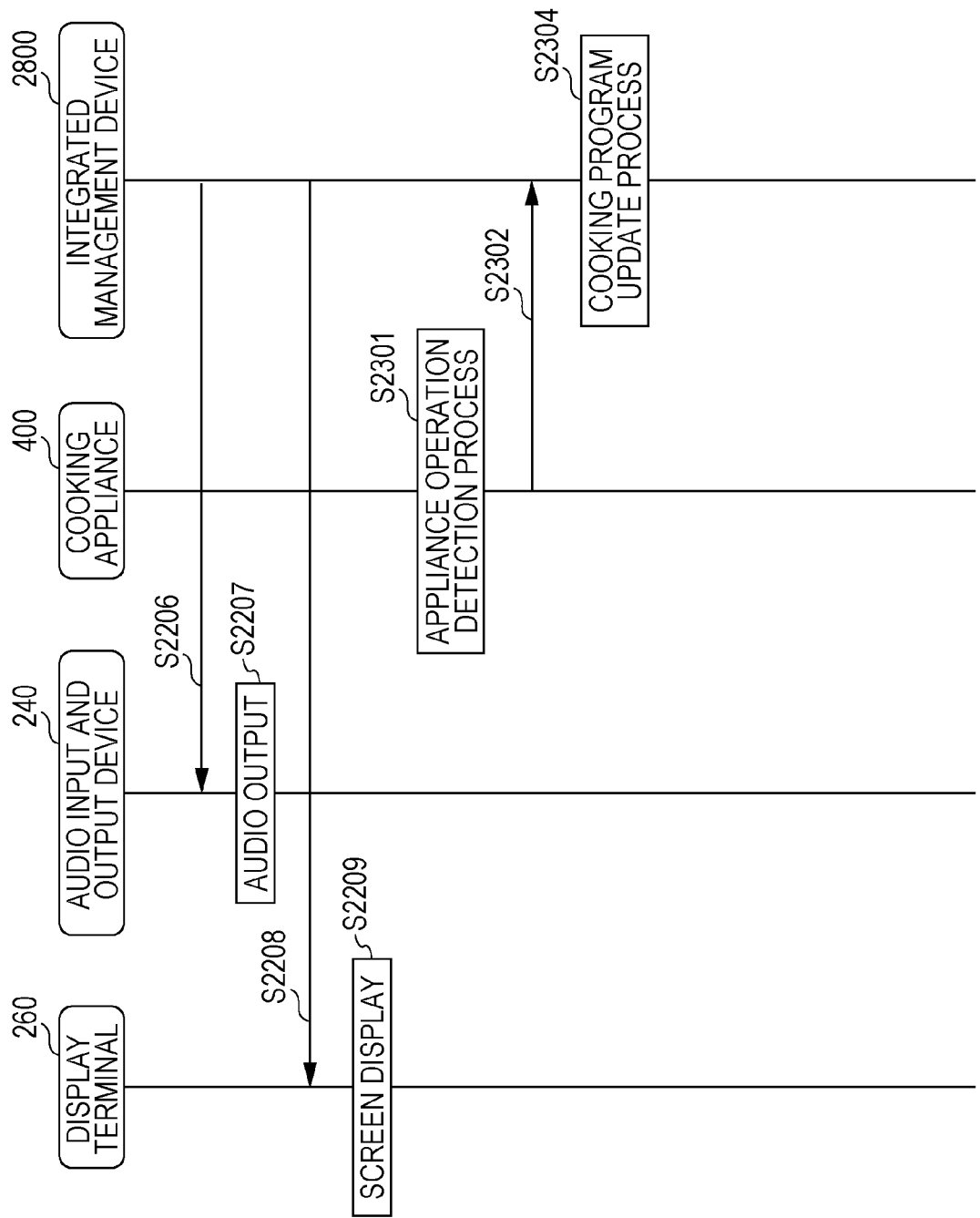

APPLIANCE CONTROL METHOD, SPEECH-BASED APPLIANCE CONTROL SYSTEM, AND COOKING APPLIANCE

BACKGROUND OF THE INVENTION

1. Field of the Invention

The present disclosure relates to an appliance control method, a speech-based appliance control system, and a cooking appliance.

2. Description of the Related Art

An example of background art is disclosed in Japanese Unexamined Patent Application Publication No. 2002-91491 (hereinafter referred to as Patent Literature 1). Patent Literature 1 discloses a speech-based control system for a plurality of appliances that locates the direction from which an utterance made by a user originates to achieve an improvement in the recognition rate of the target appliance to be controlled.

SUMMARY OF THE INVENTION

However, further improvements are needed in the speech-based control system disclosed in Patent Literature 1.

In one general aspect, the techniques disclosed here feature a method for controlling a cooking appliance using a user's speech in a speech-based appliance control system. The speech-based appliance control system includes the cooking appliance including a first cooking unit and a second cooking unit, and includes an audio input device configured to receive input of user's speech. In the method, in a case of receiving, from an audio input device, instruction information including first audio information indicating operation instructions for a cooking appliance when first and second cooking units are executing first and second cooking programs, respectively, operation instructions are recognized from the first audio information. In a case where it is determined that the instruction information includes second audio information related to the first cooking menu information or the second cooking menu information, a control command is transmitted to the cooking appliance to cause the cooking appliance to execute a process corresponding to the operation instructions, without executing a process according to the first cooking program or the second cooking program corresponding to one of the first cooking menu information or the second cooking menu information to which the second audio information is related.

According to the aspect described above, further improvements may be achieved.

BRIEF DESCRIPTION OF THE DRAWINGS

FIG. 1A is a diagram illustrating an overview of a service provided by a speech-based appliance control system according to an embodiment;

FIG. 13A is a diagram illustrating an example of an utterance interpretation dictionary DB;

FIG. 13B is a diagram illustrating the example of the utterance interpretation dictionary DB;

FIG. 14 is a diagram illustrating an example of context data extracted by the utterance interpretation unit;

FIG. 15B is a flowchart illustrating the example of the operation of the state management unit;

FIG. 17 is a diagram illustrating a specific example of an appliance state management DB according to the first embodiment;

FIG. 18 is a diagram illustrating a specific example of an appliance function DB according to the first embodiment;

FIG. 19A is a diagram illustrating an example of a menu list included in a cooking program DB;

FIG. 19B is a diagram illustrating an example of a cooking step list included in the cooking program DB;

FIG. 20A is a diagram illustrating an example of an error message list included in the cooking program DB;

FIG. 22 is a sequence diagram illustrating the operation of the speech-based appliance control system according to the first embodiment;

FIG. 23 is a sequence diagram illustrating the operation of the speech-based appliance control system according to the first embodiment;

FIG. 24A is a diagram illustrating an example of a menu selection screen displayed on the display terminal;

FIG. 25 is a sequence diagram illustrating a process for determining the target of audio instructions in the speech-based appliance control system according to the first embodiment;

FIG. 29 is a diagram illustrating a specific example of an appliance state management DB according to the second embodiment;

FIG. 30A is a sequence diagram illustrating the operation of the speech-based appliance control system according to the second embodiment;

FIG. 30B is a sequence diagram illustrating the operation of the speech-based appliance control system according to the second embodiment;

DESCRIPTION OF THE PREFERRED EMBODIMENTS

Figure 1B:
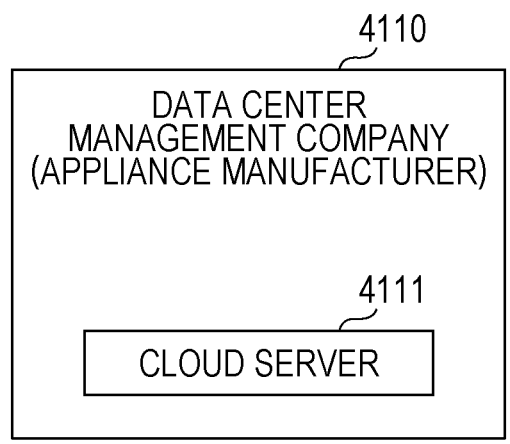
FIG. 1B is a diagram illustrating an example of a data center management company that is an appliance manufacturer.

Findings on which the Present Disclosure is Based

The inventors have found that the technique described in Patent Literature 1 given above has the following problem.

Patent Literature 1 discloses a speech-based control system including appliances to be controlled, and microphones respectively placed near the appliances for detecting user speech, and provides the following technique: Audio data detected by the microphones is collected by an audio collecting means. The content of the audio data input to the audio collecting means is analyzed by a speech recognition means. The direction from which an utterance made by the user originates is located by a distribution analysis means using the amplitude of the audio data input to the audio collecting means. An appliance to be controlled and the content of the operation to be performed on the appliance are determined by an inference means on the basis of the content of the audio data analyzed by the speech recognition means and the direction located by the distribution analysis means. A control signal is issued to the appliance to be controlled on the basis of the appliance and the content of the operation which are determined by the inference means.

Naturally, a user gives instructions to a target appliance by using speech with their face directed toward the target appliance. Because of this natural behavior, the configuration described above can determine which of a plurality of appliances that exist the user has given instructions to.

In recent years, cooking appliances in which a plurality of tasks are feasible, for example, an induction-heating (IH) cooker including a plurality of heating units or a microwave oven having a top-rack heating unit and a bottom-rack heating unit that are capable of executing different heating programs, are widely used. In these cooking appliances, the distances between a plurality of heating units are short. Thus, it is difficult to distinguish a difference in direction from which audio instructions given by a user to each of the heating units originate. Accordingly, there is a problem with the technique disclosed in Patent Literature 1 in that it is difficult to give instructions to the cooking appliances described above by using speech by specifying one of a plurality of tasks.

To address the problem described above, the inventors have developed the following solution.

A first aspect of the present disclosure provides a method for controlling a cooking appliance using a user's speech in a speech-based appliance control system including the cooking appliance and an audio input device configured to receive input of the user's speech, the cooking appliance including a first cooking unit and a second cooking unit. The method includes transmitting, to the cooking appliance via a first network, first cooking program information indicating a first cooking program, the first cooking program corresponding to a first cooking recipe, and second cooking program information indicating a second cooking program, the second cooking program corresponding to a second cooking recipe; in a case of receiving, from the audio input device, instruction information including first audio information indicating operation instructions for the cooking appliance when the first cooking unit is operated based on the first cooking program and the second cooking unit is operated based on the second cooking program, recognizing the operation instructions from the first audio information; determining, using a database configured to manage first cooking menu information indicating the name of a cooking menu item corresponding to the first cooking recipe and second cooking menu information indicating the name of a cooking menu item corresponding to the second cooking recipe, whether or not the received instruction information includes the first audio information and second audio information related to the first cooking menu information or the second cooking menu information; and in a case where it is determined that the received instruction information includes the second audio information, transmitting to the cooking appliance via the first network a control command for causing the cooking appliance to execute a process corresponding to the operation instructions, without executing a process that is based on corresponding to one of the first cooking menu information or the second cooking menu information to which the second audio information is related.

According to this aspect, first cooking program information indicating a first cooking program corresponding to a first cooking recipe, and second cooking program information indicating a second cooking program corresponding to a second cooking recipe are transmitted to a cooking appliance via a first network. In response to receipt of instruction information including first audio information indicating operation instructions for the cooking appliance from an audio input device while a first cooking unit in the cooking appliance is executing a process that is based on a first cooking program and a second cooking unit in the cooking appliance is executing a process that is based on a second cooking program, the operation instructions are recognized from the first audio information.

Using a database configured to manage first cooking menu information indicating the name of a cooking menu item corresponding to the first cooking recipe and second cooking menu information indicating the name of a cooking menu item corresponding to the second cooking recipe, it is determined whether or not the instruction information includes second audio information related to the first cooking menu information or the second cooking menu information. In a case where it is determined that the instruction information includes the second audio information, a control command is transmitted to the cooking appliance via the first network to cause the cooking appliance to execute a process corresponding to the operation instructions instead of executing a process that is executed in accordance with a cooking program corresponding to the cooking menu information to which the second audio information is related.

Accordingly, for example, in a case where it is determined that the instruction information includes second audio information related to the first cooking menu information, the first cooking unit executes the process corresponding to the operation instructions instead of executing a process that is executed in accordance with the first cooking program. For example, in a case where it is determined that the instruction information includes second audio information related to the second cooking menu information, the second cooking unit executes the process corresponding to the operation instructions instead of executing a process that is executed in accordance with the second cooking program. As a result, operation instructions for the first cooking unit or the second cooking unit in the cooking appliance may be accurately executed.

In the first aspect, for example, in a case where it is determined that the instruction information does not include the second audio information, an error message indicating that the process corresponding to the operation instructions is not executable at the cooking appliance may be provided to the user of the cooking appliance.

According to this aspect, in a case where it is determined that the instruction information does not include the second audio information, an error message indicating that the process corresponding to the operation instructions is not executable is provided to a user. This allows the user to once again make instructions by using speech.

In the first aspect, for example, the speech-based appliance control system may be configured to be further connected to a display device, and the error message may be displayed on the display device.

According to this aspect, an error message is displayed on a display of a display device. This allows the user to visually check that the process corresponding to the operation instructions is not executable.

In the first aspect, for example, the speech-based appliance control system may be configured to be further connected to an audio output device configured to output audio, and the error message may be provided to a user of the cooking appliance using the audio output device.

According to this aspect, an error message is provided to a user using an audio output device. This allows the user to auditorily check that the process corresponding to the operation instructions is not executable.

In the first aspect, for example, in a case where it is determined that the instruction information does not include the second audio information, the process corresponding to the operation instructions may be executed instead of processes that are based on all the programs including the first cooking program and the second cooking program that are being executed in the cooking appliance.

According to this aspect, in a case where it is determined that the instruction information does not include the second audio information, the process corresponding to the operation instructions is executed instead of processes that are based on all the programs including the first cooking program and the second cooking program that are being executed in the cooking appliance. Since it is determined that the instruction information does not include the second audio information, it is difficult to understand which of the first cooking unit and the second cooking unit the operation instructions are provided to. In this case, according to this aspect, both the first cooking unit and the second cooking unit execute the process corresponding to the operation instructions instead of executing the respective processes that are executed in accordance with the first cooking program and the second cooking program. As a result, at least operation instructions for the cooking appliance may be executed.

In the first aspect, for example, the operation instructions may be used for interrupting the process that is based on the first cooking program or the second cooking program in the cooking appliance.

According to this aspect, the operation instructions are used for interrupting a process that is being executed in the cooking appliance in accordance with the first cooking program or the second cooking program. Thus, the execution of a process in the first cooking unit or the second cooking unit in accordance with the first cooking program or the second cooking program is interrupted.

In the first aspect, for example, the operation instructions may be used for executing a process having a cooking parameter different from a process that is being executed in the cooking appliance in accordance with the first cooking program or the second cooking program.

According to this aspect, the operation instructions are instructions for executing a process having a cooking parameter different from a process that is being executed in the cooking appliance in accordance with the first cooking program or the second cooking program. Thus, a process having a cooking parameter different from a process that is being executed in the first cooking unit or the second cooking unit in accordance with the first cooking program or the second cooking program is executed.

In the first aspect, for example, the speech-based appliance control system may be configured to further include a display device, display screen information indicating a display screen that provides two or more cooking recipes including the first cooking recipe and the second cooking recipe may be transmitted to the display device via a second network, and first cooking recipe selection information indicating that the first cooking recipe has been selected on the display device, and second cooking recipe selection information indicating that the second cooking recipe has been selected on the display device may be received from the display device via the second network.

According to this aspect, display screen information indicating a display screen that provides two or more cooking recipes including the first cooking recipe and the second cooking recipe is transmitted to a display device via a second network. First cooking recipe selection information indicating that the first cooking recipe has been selected on the display device, and second cooking recipe selection information indicating that the second cooking recipe has been selected on the display device are received from the display device via the second network. This allows the user to recognize that the first cooking recipe and the second cooking recipe have been selected on the display device.

In the first aspect, for example, the first cooking program information may be transmitted to the cooking appliance via the display device in response to receipt of the first cooking recipe selection information from the display device, and the second cooking program information may be transmitted to the cooking appliance via the display device in response to receipt of the second cooking recipe selection information from the display device.

According to this aspect, the first cooking program information and the second cooking program information are transmitted to the cooking appliance via the display device in response to receipt of the first cooking recipe selection information and the second cooking recipe selection information from the display device, respectively. Thus, the display device may be used for both the selection of the first cooking recipe and the second cooking recipe and the transmission of the first cooking program information and the second cooking program information to the cooking appliance.

In the first aspect, for example, the database may include correspondence relationship information indicating a first correspondence relationship between the first cooking unit and the first cooking program and a second correspondence relationship between the second cooking unit and the second cooking program, a cooking unit that is to execute the process corresponding to the operation instructions may be specified from among the first cooking unit and the second cooking unit on the basis of the correspondence relationship information, and the control command may include specific-cooking-unit information indicating the specified one of the first cooking unit and the second cooking unit.

According to this aspect, the database includes correspondence relationship information indicating a correspondence relationship between the first cooking unit and the first cooking program and a correspondence relationship between the second cooking unit and the second cooking program. A cooking unit that is to execute the process corresponding to the operation instructions is specified from among the first cooking unit and the second cooking unit on the basis of the correspondence relationship information. The control command includes specific-cooking-unit information indicating the specified cooking unit. Thus, the process corresponding to the operation instructions is executed in a cooking unit specified from among the first cooking unit and the second cooking unit on the basis of the specific-cooking-unit information, instead of a process that is executed in accordance with the corresponding cooking program. As a result, operation instructions for the first cooking unit or the second cooking unit in the cooking appliance may be accurately executed.

In the first aspect, for example, the cooking appliance may be configured to manage the correspondence relationship information, a cooking unit that is to execute the process corresponding to the operation instructions may be specified from among the first cooking unit and the second cooking unit on the basis of the correspondence relationship information and the specific-cooking-unit information, and the specified cooking unit may be caused to execute the process corresponding to the operation instructions.

According to this aspect, the cooking appliance is configured to manage correspondence relationship information indicating a correspondence relationship between the first cooking unit and the first cooking program and a correspondence relationship between the second cooking unit and the second cooking program. A cooking unit that is to execute the process corresponding to the operation instructions is specified from among the first cooking unit and the second cooking unit on the basis of the correspondence relationship information and the specific-cooking-unit information. The specified cooking unit executes the process corresponding to the operation instructions. Thus, the operation instructions transmitted to the cooking appliance may be accurately executed in the first cooking unit or the second cooking unit.

In the first aspect, for example, the display device may be included in the cooking appliance.

In the first aspect, for example, the display device may be included in an appliance that is different from the cooking appliance.

A second aspect of the present disclosure provides a method for controlling a cooking appliance using a user's speech in a speech-based appliance control system, the speech-based appliance control system including the cooking appliance and an audio input device configured to receive input of user's speech, the cooking appliance including a first cooking unit and a second cooking unit. The appliance control method includes transmitting, to the cooking appliance via a first network, first cooking program information indicating the first cooking program, the first cooking program corresponding to a first cooking recipe, and second cooking program information indicating the second cooking program different from the first cooking program, the second cooking program corresponding to a second cooking recipe; in a case of receiving, from the audio input device, instruction information including first audio information indicating operation instructions for the cooking appliance when the first cooking unit is operated based on the first cooking program and the second cooking unit is operated based on the second cooking program, recognizing the operation instructions from the first audio information; determining, using a database configured to manage first cookware information indicating the name of a cookware item used in the first cooking recipe and second cookware information indicating the name of a cookware item used in the second cooking recipe, whether or not the instruction information includes second audio information related to the first cookware information or the second cookware information; and in a case where it is determined that the instruction information includes the first audio information and the second audio information, transmitting to the cooking appliance via the first network a control command for causing the cooking appliance to execute a process corresponding to the operation instructions without executing a process that is based on the first cooking program or the second cooking program corresponding to one of the first cookware information or the second cookware information to which the second audio information is related.

According to this aspect, first cooking program information indicating a first cooking program corresponding to a first cooking recipe, and second cooking program information indicating a second cooking program corresponding to a second cooking recipe are transmitted to a cooking appliance via a first network. In response to receipt of instruction information including first audio information indicating operation instructions for the cooking appliance from an audio input device while a first cooking unit in the cooking appliance is executing a process that is based on a first cooking program and a second cooking unit in the cooking appliance is executing a process that is based on a second cooking program, the operation instructions are recognized from the first audio information.

Using a database configured to manage first cookware information indicating the name of a cookware item used in the first cooking recipe and second cookware information indicating the name of a cookware item used in the second cooking recipe, it is determined whether or not the instruction information includes second audio information related to the first cookware information or the second cookware information. In a case where it is determined that the instruction information includes the second audio information, a control command is transmitted to the cooking appliance via the first network to cause the cooking appliance to execute a process corresponding to the operation instructions instead of executing a process that is executed in accordance with a cooking program corresponding to the cookware information to which the second audio information is related.

Accordingly, for example, in a case where it is determined that the instruction information includes second audio information related to the first cookware information, the first cooking unit executes the process corresponding to the operation instructions instead of executing a process that is executed in accordance with the first cooking program. For example, in a case where it is determined that the instruction information includes second audio information related to the second cookware information, the second cooking unit executes the process corresponding to the operation instructions instead of executing a process that is executed in accordance with the second cooking program. As a result, operation instructions for the first cooking unit or the second cooking unit in the cooking appliance may be accurately executed.

In the second aspect, for example, in a case where it is determined that the instruction information does not include the second audio information, an error message indicating that the process corresponding to the operation instructions is not executable at the cooking appliance may be provided to the user of the cooking appliance.

In the second aspect, for example, the speech-based appliance control system may be configured to be further connected to a display device, and the error message may be displayed on the display device.

In the second aspect, for example, the speech-based appliance control system may be configured to further include an audio output device configured to output audio, and the error message may be provided to the user of the cooking appliance using the audio output device.

In the second aspect, for example, in a case where it is determined that the instruction information does not include the second audio information, the process corresponding to the operation instructions may be executed instead of processes that are based on all the programs including the first cooking program and the second cooking program that are being executed in the cooking appliance.

In the second aspect, for example, the operation instructions may be used for interrupting a process that is being executed in the cooking appliance in accordance with the first cooking program or the second cooking program.

In the second aspect, for example, the operation instructions may be used for executing a process having a cooking parameter different from a process that is being executed in the cooking appliance in accordance with the first cooking program or the second cooking program.

In the second aspect, for example, the speech-based appliance control system may be configured to further include a display device, display screen information indicating a display screen that provides two or more cooking recipes including the first cooking recipe and the second cooking recipe may be transmitted to the display device via a second network, and first cooking recipe selection information indicating that the first cooking recipe has been selected on the display device, and second cooking recipe selection information indicating that the second cooking recipe has been selected on the display device may be received from the display device via the second network.

In the second aspect, for example, the first cooking program information may be transmitted to the cooking appliance via the display device in a case of receiving the first cooking recipe selection information from the display device, and the second cooking program information may be transmitted to the cooking appliance via the display device in case of receiving the second cooking recipe selection information from the display device.

In the second aspect, for example, the database may include correspondence relationship information indicating a first correspondence relationship between the first cooking unit and the first cooking program and a second correspondence relationship between the second cooking unit and the second cooking program, one of the first cooking unit of the second cooking unit that is to execute the process corresponding to the operation instructions may be specified from among the first cooking unit and the second cooking unit on the basis of the correspondence relationship information, and the control command may include specific-cooking-unit information indicating the specified one of the first cooking unit and the second cooking unit.

In the second aspect, for example, the process corresponding to the operation instructions are executed at the one of the first cooking unit or the second cooking unit specified on the basis of the specific-cooking-unit information.

In the second aspect, for example, the display device may be included in the cooking appliance.

In the second aspect, for example, the display device may be included in an appliance that is different from the cooking appliance.

A third aspect of the present disclosure provides a speech-based appliance control system including a cooking appliance having a first cooking unit and a second cooking unit, an audio input device configured to receive input of a user's speech, and a server connectable to the cooking appliance and the audio input device. The cooking appliance is controlled using the user's speech. The cooking appliance includes a first communication unit configured to receive from the server first cooking program information indicating the first cooking program, the first cooking program corresponding to a first cooking recipe, and second cooking program information indicating the second cooking program, the second cooking program corresponding to a second cooking recipe, and a second control unit configured to cause the first cooking unit to operate based on a first cooking program, and configured to cause the second cooking unit to operate based on the second cooking program. The audio input device includes an audio acquisition unit configured to acquire instruction information including first audio information indicating operation instructions for the cooking appliance, and a second communication unit configured to transmit the acquired instruction information to the server. The server includes a third communication unit configured to transmit the first cooking program information and the second cooking program information to the cooking appliance, a database configured to manage first cooking menu information indicating the name of a cooking menu item corresponding to the first cooking recipe and second cooking menu information indicating the name of a cooking menu item corresponding to the second cooking recipe, a determination unit configured to, in a case of receiving the instruction information from the audio input device when the first cooking unit is operated based on the first cooking program and the second cooking unit is operated based on the second cooking program, recognize the operation instructions from the first audio information included in the received instruction information and determine whether or not the instruction information includes second audio information related to the first cooking menu information or the second cooking menu information, and a fourth communication unit configured to, in a case where it is determined that the instruction information includes the second audio information, transmit to the cooking appliance a control command for causing the cooking appliance to execute a process corresponding to the operation instructions, without executing a process that is executed in accordance with the first cooking program or the second cooking program corresponding to one of the first cooking menu information or the second cooking menu information to which the second audio information is related.

According to this aspect, in response to receipt of instruction information including first audio information indicating operation instructions for a cooking appliance from an audio input device while a first cooking unit in the cooking appliance is executing a process that is based on a first cooking program and a second cooking unit in the cooking appliance is executing a process that is based on a second cooking program, the operation instructions are recognized from the first audio information included in the received instruction information. It is determined whether or not the instruction information includes second audio information related to the first cooking menu information or the second cooking menu information.

In a case where it is determined that the instruction information includes the second audio information, a control command is transmitted to the cooking appliance to cause the cooking appliance to execute a process corresponding to the operation instructions instead of executing a process that is executed in accordance with a cooking program corresponding to the cooking menu information to which the second audio information is related.

Accordingly, for example, in a case where it is determined that the instruction information includes second audio information related to the first cooking menu information, the first cooking unit executes the process corresponding to the operation instructions instead of executing a process that is executed in accordance with the first cooking program. For example, in a case where it is determined that the instruction information includes second audio information related to the second cooking menu information, the second cooking unit executes the process corresponding to the operation instructions instead of executing a process that is executed in accordance with the second cooking program. As a result, operation instructions for the first cooking unit or the second cooking unit in the cooking appliance may be accurately executed.

A fourth aspect of the present disclosure provides a cooking appliance used in the speech-based appliance control system according to the third aspect.

The above-described generic or specific aspects may be implemented by a system, a method, an integrated circuit, a computer program, or a computer-readable recording medium such as a compact disc read-only memory (CD-ROM), or may be implemented by any combination of a system, a method, an integrated circuit, a computer program, and a recording medium.

Embodiments will be described in detail hereinafter with reference to the drawings.

The embodiments described hereinafter provide specific examples of the present disclosure. The values, shapes, constituent elements, steps, the orders of the steps, etc., given in the following embodiments are illustrative, and are not intended to limit the present disclosure. In addition, among the constituent elements in the following embodiments, a constituent element not recited in any of the independent claims indicating the most generic concept of the present disclosure is described as optional. In addition, every embodiment disclosed herein may be combined with every other embodiment of the present disclosure.

Overview of Service to be Provided

First, an overview of a service provided by a speech-based appliance control system according to embodiments disclosed herein will be described.

FIG. 1A is a diagram illustrating an overview of a service provided by a speech-based appliance control system according to embodiments disclosed herein. The speech-based appliance control system includes a group 4100, a data center management company 4110, and a service provider 4120.

The group 4100 may indicate, for example, a company, an organization, a household, or the like whatever its size. The group 4100 includes a plurality of home electric appliances 101 including a first home electric appliance and a second home electric appliance, and a home gateway 4102. The plurality of home electric appliances 101 includes an appliance that is capable of accessing the Internet (such as a smartphone, a personal computer (PC), or a television receiver). The plurality of home electric appliances 101 further includes an appliance that is incapable of accessing the Internet by itself (such as lighting, a washing machine, or a refrigerator). The plurality of home electric appliances 101 may include an appliance that is incapable of accessing the Internet by itself but is capable of accessing the Internet via the home gateway 4102. Users 4200 use the plurality of home electric appliances 101 in the group 4100.

The data center management company 4110 includes a cloud server 4111. The cloud server 4111 is a virtual server that builds a cooperative relationship with various appliances over the Internet. The cloud server 4111 mainly manages vast volumes of data (or "big data") that are difficult to handle with traditional database management tools or the like. The data center management company 4110 engages in business activities such as operating a data center that manages data and that manages the cloud server 4111. The details of the activities that the data center management company 4110 undertakes are described below.

It is noted here that the data center management company 4110 is not limited to a company engaging in business activities such as operating a data center that manages data and that manages the cloud server 4111.

Figure 1C:
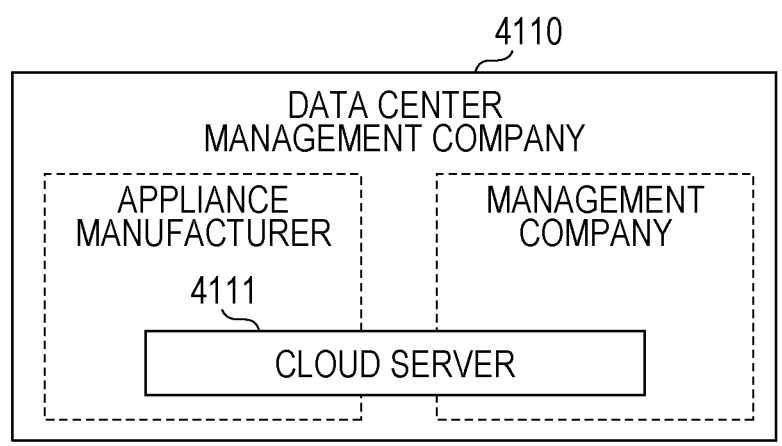
FIG. 1C is a diagram illustrating an example of a data center management company that is one or both of an appliance manufacturer and a management company.

FIGS. 1B and 1C are diagrams illustrating examples of the data center management company 4110. For example, as illustrated in FIG. 1B, in a case where an appliance manufacturer that develops or manufactures one of the plurality of home electric appliances 101 performs activities such as managing data or managing the cloud server 4111, the appliance manufacturer corresponds to the data center management company 4110. Note that the data center management company 4110 is not limited to a single company. For example, as illustrated in FIG. 1C, in a case where an appliance manufacturer and a management company collaborate or share with each other to manage data or manage the cloud server 4111, one or both of them correspond to the data center management company 4110.

The service provider 4120 includes a server 121. When used herein, the server 121 includes, for example, a memory in a personal use PC whatever the size. In some cases, the service provider 4120 may not include the server 121. In these cases, the service provider 4120 may include a different device configured to perform the functions of the server 121.

In the speech-based appliance control system described above, the home gateway 4102 may not necessarily be used. The home gateway 4102 is a device that allows the home electric appliances 101 to access the Internet. Accordingly, in a case where the home electric appliances 101 do not include an appliance that is incapable of accessing the Internet by itself, for example, in a case where all the home electric appliances 101 in the group 4100 are connecting to the Internet, the home gateway 4102 is not used.

The flow of information in the speech-based appliance control system described above will now be described with reference to FIG. 1A.

First, the first home electric appliance or the second home electric appliance in the group 4100 transmits log information to the cloud server 4111 in the data center management company 4110. The cloud server 4111 collects the log information on the first home electric appliance or the second home electric appliance (arrow 131 in FIG. 1A). The log information may be information indicating, for example, the operating state or operation date and time of the plurality of home electric appliances 101. The log information includes, for example, the viewing history of a TV viewer, scheduled recording information on a recorder, the date and time when a washing machine runs, the amount of laundry, the date and time when a refrigerator door opens and closes, and the number of times the refrigerator door opens and closes. The log information is not limited to the information described above, and may include a variety of pieces of information available from the home electric appliances 101. The log information may be provided from the plurality of home electric appliances 101 directly to the cloud server 4111 via the Internet. The log information may also temporarily be collected in the home gateway 4102 from the plurality of home electric appliances 101, and may be provided from the home gateway 4102 to the cloud server 4111.

Then, the cloud server 4111 in the data center management company 4110 provides the collected log information to the service provider 4120 at a constant rate. The "constant rate" may be the unit of how the data center management company 4110 can organize the collected information and provide the information to the service provider 4120, or may be the unit requested by the service provider 4120. Instead of the information being provided at a "constant rate", the amount of information may not necessarily be constant, and, for example, the amount of information that is provided may vary depending on the situation. The log information is saved in the server 121 included in the service provider 4120, if necessary (arrow 132 in FIG. 1A).

Then, the service provider 4120 organizes the log information into information adapted to a service that is provided to users, and provides the information to the users. The users to whom the information is provided may be the users 4200 who use the plurality of home electric appliances 101, or may be external users 4210. In a method for providing the information to the users 4200 or 4210, for example, the information may be provided from the service provider 4120 directly to the users 4200 or 4210 (arrow 133 or 134 in FIG. 1A). In another method for providing the information to the users 4200, for example, the information may be provided to the users 4200, passing back through the cloud server 4111 in the data center management company 4110 (arrows 135 and 136 in FIG. 1A).

Alternatively, the cloud server 4111 in the data center management company 4110 may organize the log information into information adapted to a service that is provided to users, and may provide the information to the service provider 4120.

The users 4200 may be identical to or different from the users 4210.

First Embodiment

Figure 2:
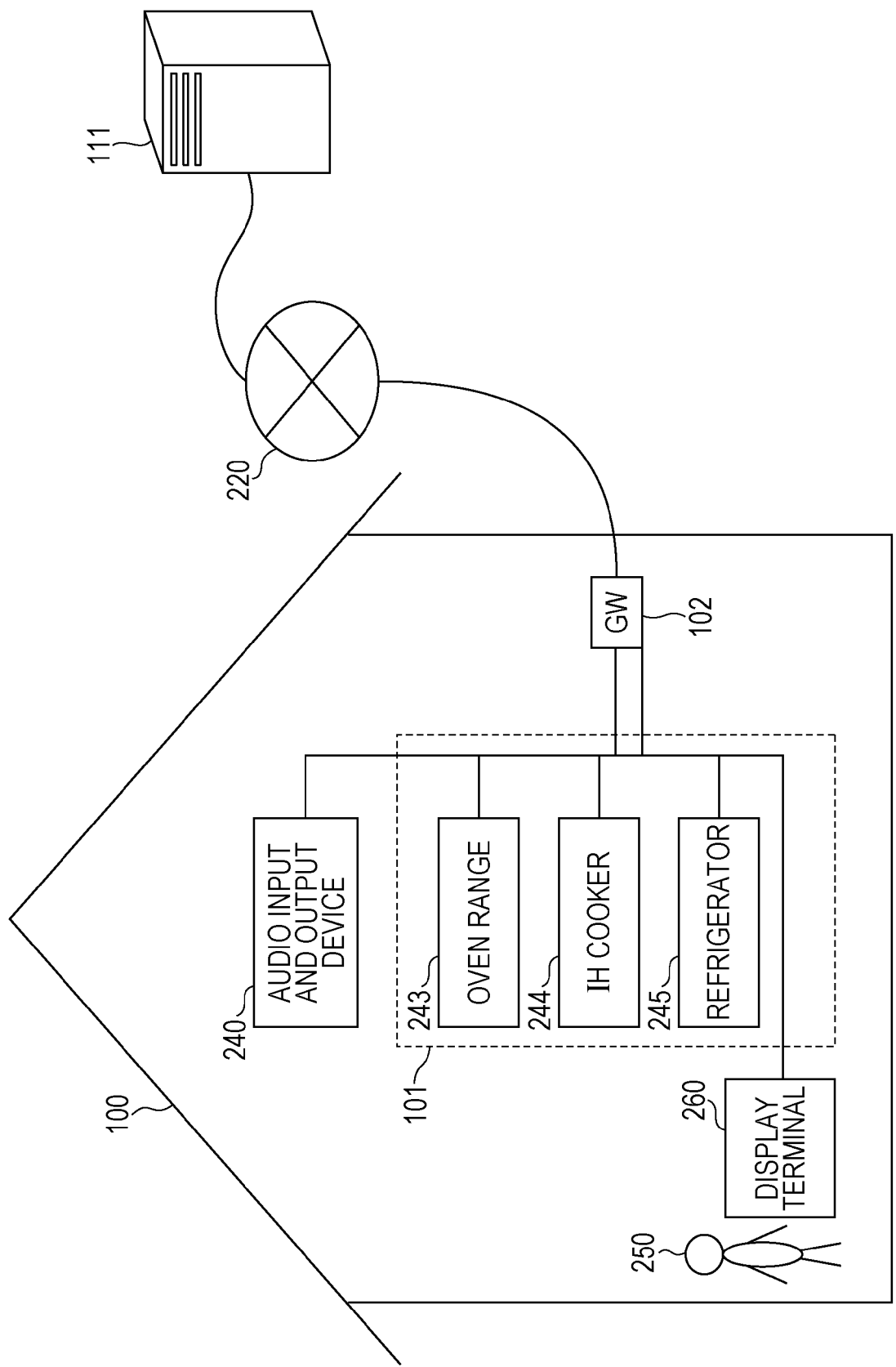
FIG. 2 is a configuration diagram of the speech-based appliance control system according to a first embodiment.

FIG. 2 is a diagram illustrating the configuration of a speech-based appliance control system according to a first embodiment. The configuration of the speech-based appliance control system according to the first embodiment will be described with reference to FIG. 2.

The speech-based appliance control system illustrated in FIG. 2 includes an audio input and output device 240, a plurality of home electric appliances 101, a display terminal 260, a gateway 102, an information communication network 220, and a cloud server 111. The home electric appliances 101 include an oven range 243, an induction-heating (IH) cooker 244, and a refrigerator 245. The plurality of home electric appliances 101 may include any other desired appliance instead of or in addition to the oven range 243, the IH cooker 244, and the refrigerator 245.

The audio input and output device 240 (an example of an audio input device) includes an audio acquisition unit configured to acquires speech from a user 250, and an audio output unit configured to output audio to the user 250. A group 100 is a space within which the audio input and output device 240 can provide information (or a space over which audio interaction is feasible). The group 100 may be, for example, a house of the user 250.

The audio input and output device 240 recognizes speech of the user 250. The audio input and output device 240 presents audio information and controls the plurality of home electric appliances 101 in accordance with instructions entered by the user 250 through speech. More specifically, the audio input and output device 240 reads content aloud, responds to a question made by the user 250, and controls the home electric appliance 101 in accordance with instructions entered by the user 250 through speech.

The display terminal 260 (an example of a display device) has an input function that allows the user 250 to give appliance control instructions, and an information output function that provides information to the user 250. The input function of the display terminal 260 may be implemented by a touch panel or a push button. The display terminal 260 may be a mobile phone, a smartphone, or a tablet device.

The display terminal 260, the audio input and output device 240, and the plurality of home electric appliances 101 may be connected to the gateway 102 using wired or wireless connection. Additionally, the audio input and output device 240 and at least one of the plurality of home electric appliances 101 may be integrated into a single unit.

Figure 3:
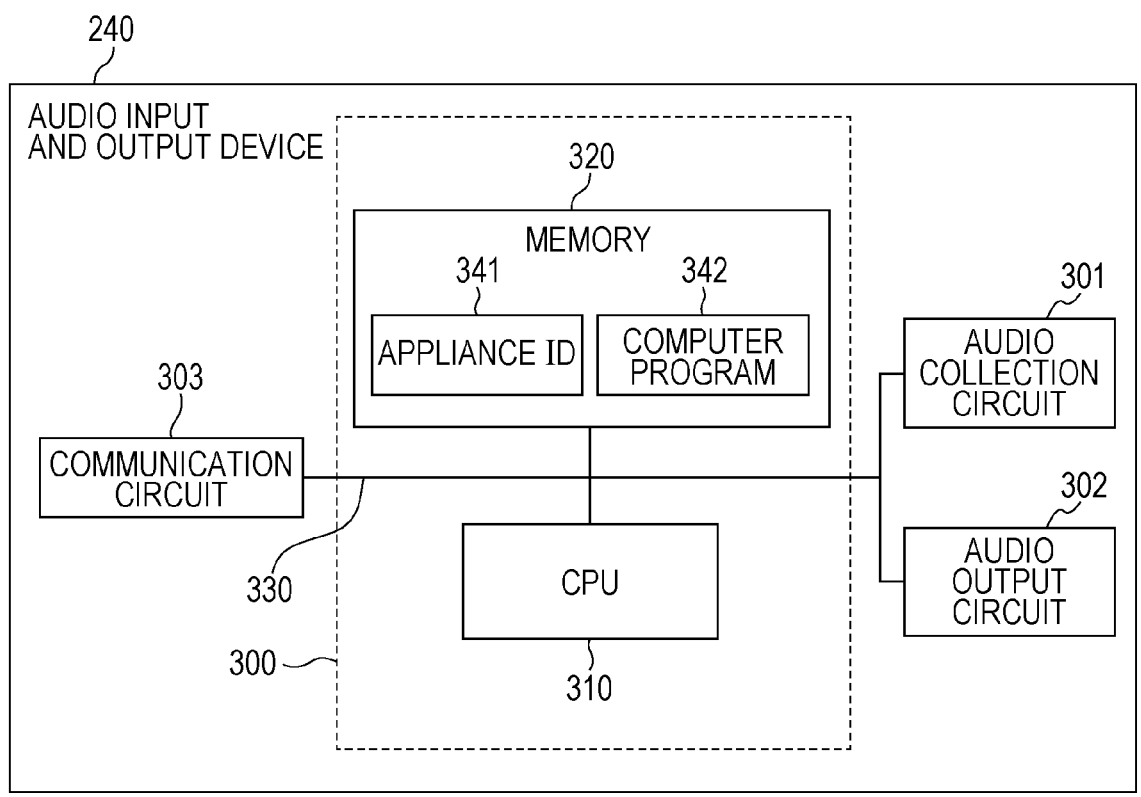
FIG. 3 is a diagram illustrating the hardware configuration of an audio input and output device according to the first embodiment and the second embodiment.

FIG. 3 is a block diagram illustrating the hardware configuration of the audio input and output device 240. The hardware configuration of the audio input and output device 240 will be described with reference to FIG. 3.

As illustrated in FIG. 3, the audio input and output device 240 includes a processing circuit 300, an audio collection circuit 301, an audio output circuit 302, and a communication circuit 303. These circuits are connected to one another via a bus 330, and are capable of exchanging data or instructions.

The processing circuit 300 includes a central processing unit (CPU) 310 and a memory 320. Alternatively, the processing circuit 300 may include dedicated hardware configured to implement the operations described below, instead of the CPU 310 and the memory 320. The memory 320 stores an appliance ID 341 and a computer program 342.

The appliance ID 341 is an identifier uniquely assigned to the audio input and output device 240. The appliance ID 341 may be independently assigned by a manufacturer, or may be a physical address (or so-called Media Access Control (MAC) address), which is uniquely assigned basically on a network.

The audio collection circuit 301 collects user speech and generates an analog audio signal. The audio collection circuit 301 converts the generated analog audio signal into digital data and then transmits the digital data to the bus 330.

The audio output circuit 302 converts the digital data received via the bus 330 into an analog audio signal. The audio output circuit 302 outputs the resulting analog audio signal.

The communication circuit 303 is a circuit that communicates with other devices (e.g., the gateway 102) via a network. The communication circuit 303 performs communication complying with, for example, the Ethernet (registered trademark) standards. The communication circuit 303 transmits log information or ID information generated by the processing circuit 300 to the gateway 102. The communication circuit 303 transmits a signal received from the gateway 102 to the processing circuit 300 via the bus 330.

The audio input and output device 240 may also include, in addition to the illustrated constituent elements, a constituent element(s) to implement the requested function.

Figure 4:
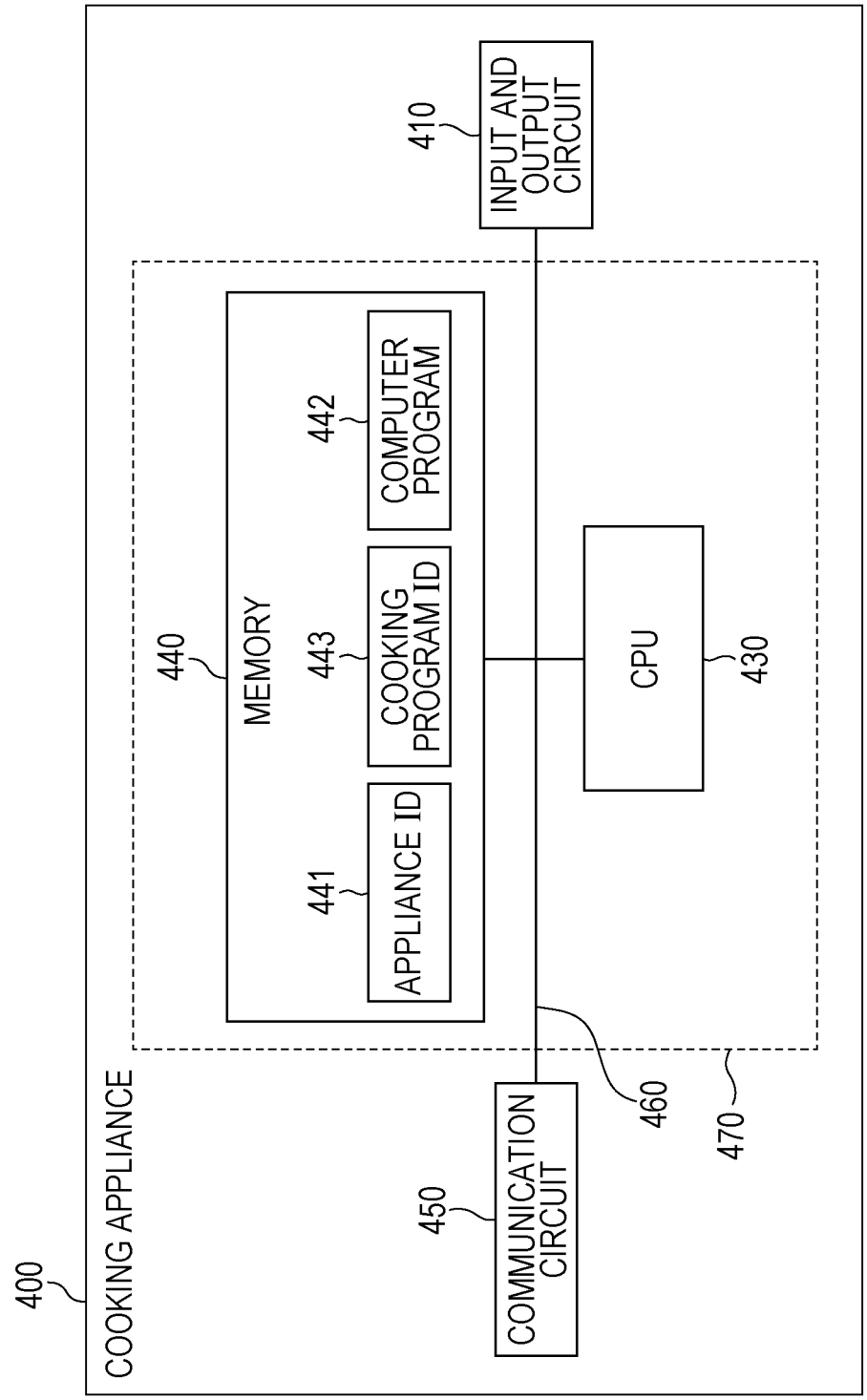
FIG. 4 is a diagram illustrating the hardware configuration of a cooking appliance according to the first embodiment and the second embodiment.

FIG. 4 is a block diagram illustrating the hardware configuration of a cooking appliance 400 that is an example of the home electric appliances 101. The hardware configuration of the cooking appliance 400 will be described with reference to FIG. 4. The oven range 243, the IH cooker 244, and the refrigerator 245 are examples of the cooking appliance 400.

The cooking appliance 400 includes an input and output circuit 410, a communication circuit 450, and a processing circuit 470. These circuits are connected to one another via a bus 460, and are capable of exchanging data or instructions.

The processing circuit 470 includes a CPU 430 and a memory 440. Alternatively, the processing circuit 470 may include dedicated hardware configured to implement the operations described below, instead of the CPU 430 and the memory 440. The memory 440 stores an appliance ID 441, a computer program 442, and a cooking program ID 443.

The appliance ID 441 is an identifier uniquely assigned to the cooking appliance 400. The cooking program ID 443 is an identifier uniquely assigned to a cooking program. The appliance ID 441 and the cooking program ID 443 may be independently assigned by a manufacturer, or may be a physical address (or so-called Media Access Control (MAC) address), which is uniquely assigned basically on a network.

The input and output circuit 410 outputs a result of processing performed by the processing circuit 470. The input and output circuit 410 converts an input analog signal into digital data, and transmits the digital data to the bus 460. For example, in a case where the input and output circuit 410 has a display function, the input and output circuit 410 displays a result of processing performed by the processing circuit 470. In this case, the cooking appliance 400 that includes the input and output circuit 410 (an example of a display device) having a display function may have the function of the display terminal 260.

The communication circuit 450 is a circuit that communicates with other devices (e.g., the gateway 102) via a network. The communication circuit 450 performs communication complying with, for example, the Ethernet (registered trademark) standards. The communication circuit 450 transmits log information or ID information generated by the processing circuit 470 to the gateway 102. The communication circuit 450 transmits a signal received from the gateway 102 to the processing circuit 470 via the bus 460.

The cooking appliance 400 may also include, in addition to the illustrated constituent elements, a constituent element(s) to implement the requested function.

Figure 5:
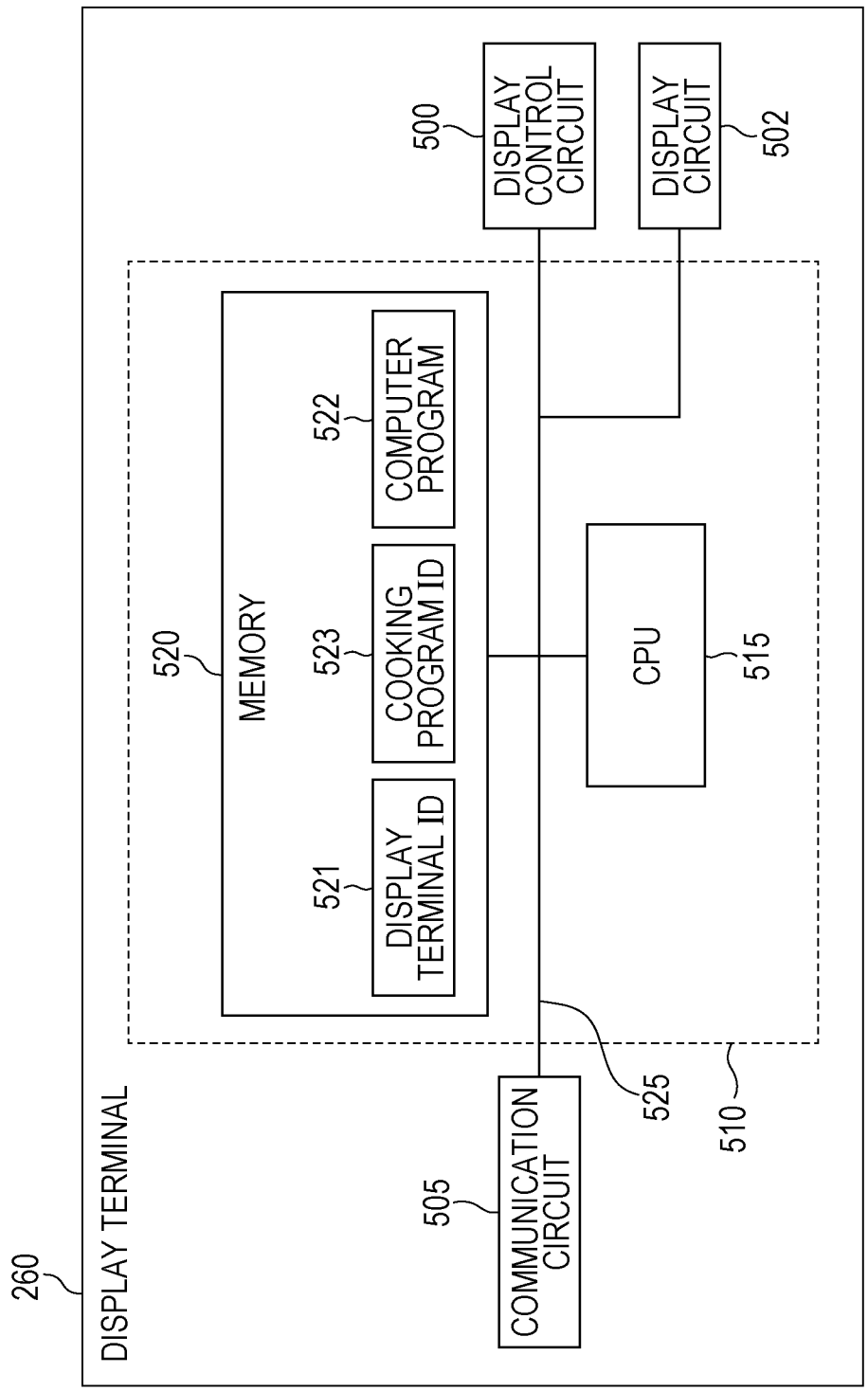
FIG. 5 is a diagram illustrating the hardware configuration of a display terminal according to the first embodiment and the second embodiment.

FIG. 5 is a block diagram illustrating the hardware configuration of the display terminal 260. As illustrated in FIG. 5, the display terminal 260 includes a display control circuit 500, a display circuit 502, a communication circuit 505, and a processing circuit 510. These circuits are connected to one another via a bus 525, and are capable of exchanging data or instructions.

The display circuit 502 includes a liquid crystal display and so on. The display circuit 502 displays an image such as an object image including icons or operation buttons, and a text image. The display control circuit 500 controls the operation of the display circuit 502 to display an image on the display circuit 502.

The communication circuit 505 is a circuit that communicates with other devices (e.g., the audio input and output device 240, the cooking appliance 400, etc.) via a network. The communication circuit 505 performs communication complying with, for example, the Ethernet (registered trademark) standards or near field communication standards. The communication circuit 505 transmits log information or ID information generated by the processing circuit 510 to the audio input and output device 240 or the cooking appliance 400. The communication circuit 505 transmits a signal received from the audio input and output device 240 or the cooking appliance 400 to the processing circuit 510 via the bus 525.

The processing circuit 510 includes a CPU 515 and a memory 520. Alternatively, the processing circuit 510 may include dedicated hardware configured to implement the operations described below, instead of the CPU 515 and the memory 520. The memory 520 stores a display terminal ID 521, a computer program 522, and a cooking program ID 523. The display terminal ID 521 is an identifier uniquely assigned to the display terminal 260. Similarly to the cooking program ID 443, the cooking program ID 523 is an identifier uniquely assigned to a cooking program.

The display terminal 260 may also include, in addition to the illustrated constituent elements, a constituent element(s) to implement the requested function.

In FIG. 5, the display terminal ID 521 and the cooking program ID 523 are stored in the memory 520 in which the computer program 522 is stored. However, this is an example. The computer program 522 may be stored in a random access memory (RAM) or a read-only memory (ROM), and the display terminal ID 521 and the cooking program ID 523 may be stored in a flash memory.

Figure 6:
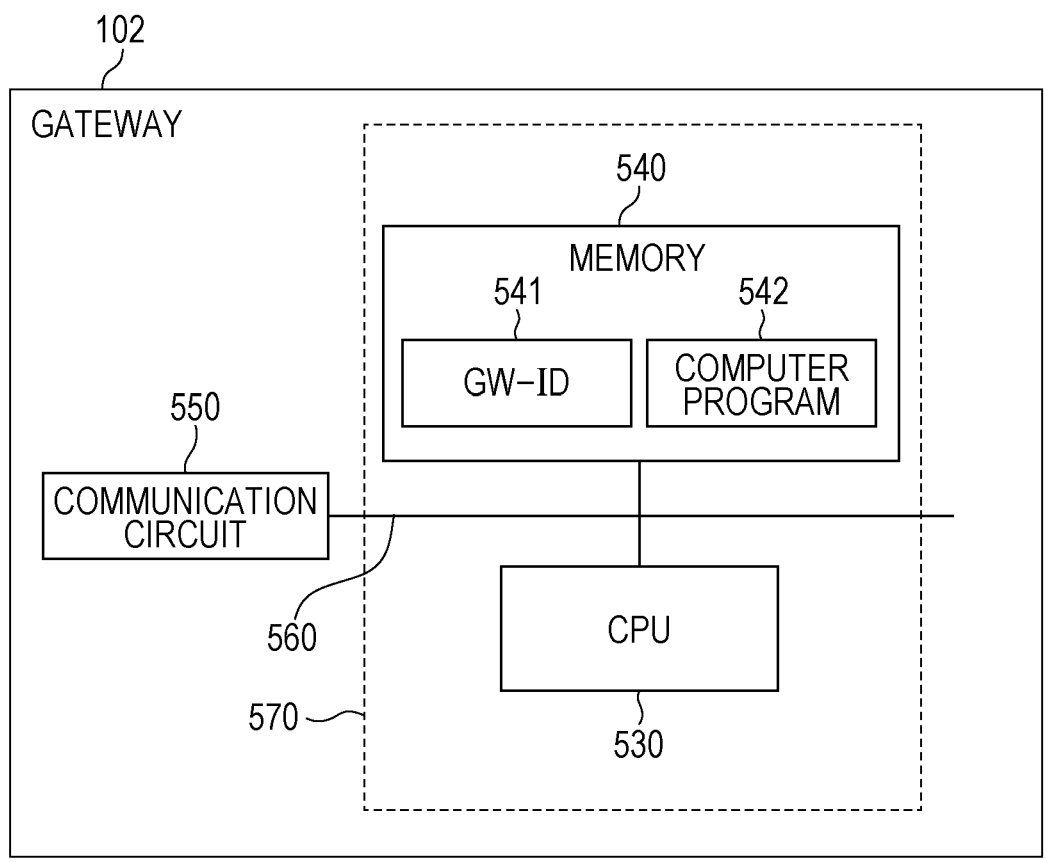
FIG. 6 is a diagram illustrating the hardware configuration of a gateway according to the first embodiment.

FIG. 6 is a block diagram illustrating the hardware configuration of the gateway 102. The gateway 102 includes a communication circuit 550 and a processing circuit 570. These circuits are connected to each other via a bus 560, and are capable of exchanging data or instructions.

The communication circuit 550 is a circuit that communicates with other devices (e.g., the audio input and output device 240, the cooking appliance 400, etc.) via a network. The communication circuit 550 performs communication complying with, for example, the Ethernet (registered trademark) standards. The communication circuit 550 transmits log information or ID information generated by the processing circuit 570 to the audio input and output device 240 or the cooking appliance 400. In addition, the communication circuit 550 transmits a signal received from the audio input and output device 240 or the cooking appliance 400 to the processing circuit 570 via the bus 560.

The processing circuit 570 includes a CPU 530 and a memory 540. Alternatively, the processing circuit 570 may include dedicated hardware configured to implement the operations described below, instead of the CPU 530 and the memory 540. The memory 540 stores a gateway ID 541 and a computer program 542. The gateway ID 541 is an identifier uniquely assigned to the gateway 102. The gateway 102 may also include, in addition to the illustrated constituent elements, a constituent element(s) to implement the requested function.

In FIG. 6, the gateway ID 541 is stored in the memory 540 in which the computer program 542 is stored. However, this is an example. The computer program 542 may be stored in a RAM or a ROM, and the gateway ID 541 may be stored in a flash memory.

Figure 7:
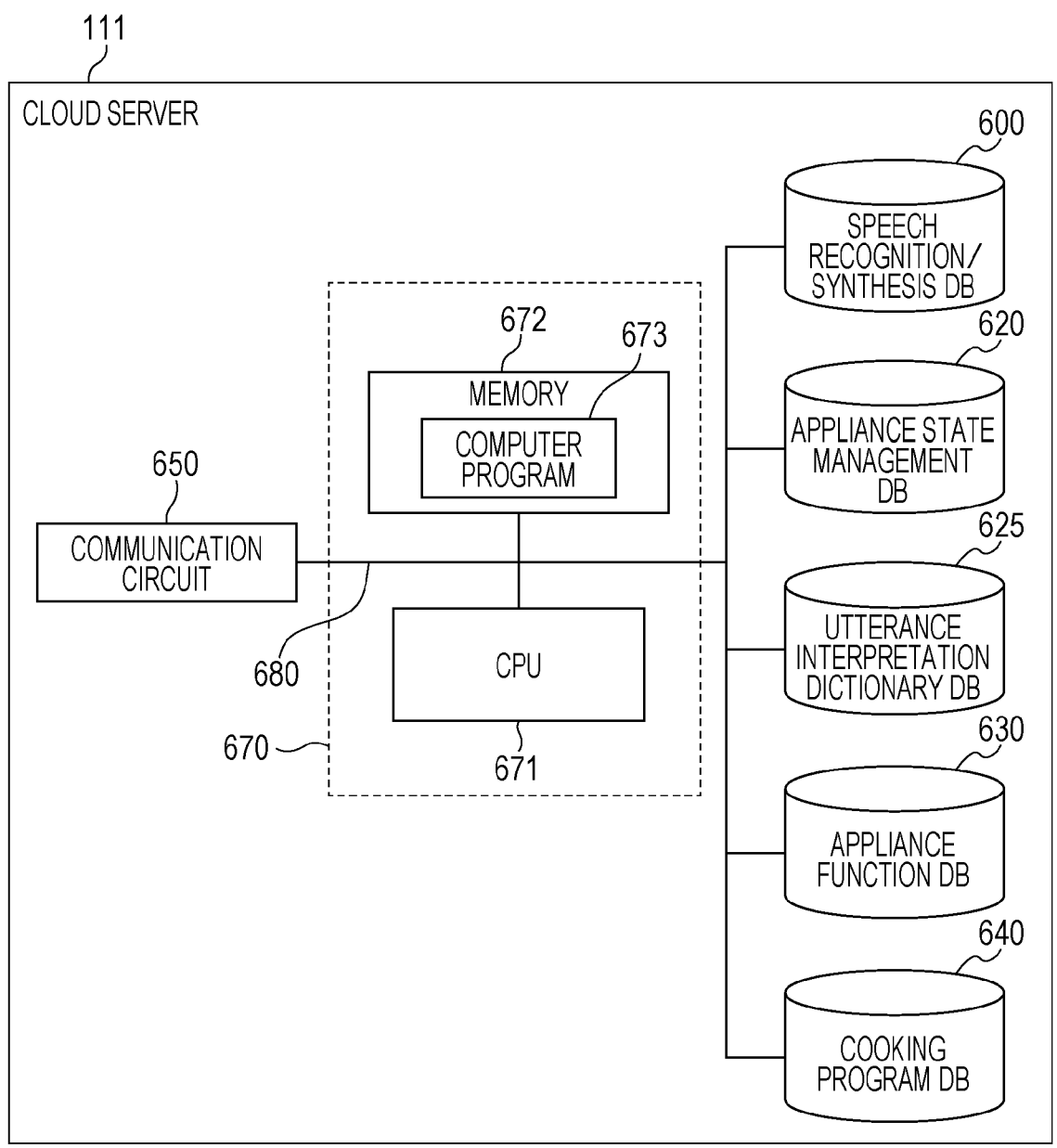
FIG. 7 is a diagram illustrating the hardware configuration of a cloud server according to the first embodiment.

FIG. 7 is a block diagram illustrating the hardware configuration of the cloud server 111. The cloud server 111 includes a communication circuit 650, a processing circuit 670, a speech recognition database (DB) 600, an appliance state management DB 620 (an example of a database), an utterance interpretation dictionary DB 625, an appliance function DB 630, and a cooking program DB 640. The processing circuit 670 includes a CPU 671, and a memory 672 in which a computer program 673 is stored. These constituent elements are connected to one another via a bus 680, and are capable of mutually exchanging data.

The processing circuit 670 is connected to the speech recognition/synthesis DB 600, the appliance state management DB 620, the utterance interpretation dictionary DB 625, the appliance function DB 630, and the cooking program DB 640 via the bus 680. The processing circuit 670 acquires or edits management information stored in the databases 600, 620, 625, 630, and 640.

In this embodiment, the speech recognition/synthesis DB 600, the appliance state management DB 620, the utterance interpretation dictionary DB 625, the appliance function DB 630, and the cooking program DB 640 are elements included in the cloud server 111. The speech recognition/synthesis DB 600, the appliance state management DB 620, the utterance interpretation dictionary DB 625, the appliance function DB 630, and the cooking program DB 640 may be provided outside the cloud server 111, in which case the cloud server 111 may further include an Internet line in addition to the bus 680.

The communication circuit 650 is a circuit that communicates with other communication devices (e.g., the gateway 102) via a network. The communication circuit 650 performs communication complying with, for example, the Ethernet (registered trademark) standards.

The CPU 671 controls the operation of the cloud server 111. The CPU 671 executes a group of instructions written in the computer program 673 developed in the memory 672. Accordingly, the CPU 671 is capable of implementing a variety of functions. A group of instructions for allowing the cloud server 111 to implement the operations described below is written in the computer program 673.

The computer program 673 described above may be recorded on a recording medium such as a CD-ROM and distributed as a marketed product. Alternatively, the computer program 673 may be transmitted via an electric communication line such as the Internet. An appliance (e.g., a PC) including the hardware illustrated in FIG. 7 is capable of functioning as the cloud server 111 according to this embodiment by reading the computer program 673.

The CPU 671 and the memory 672 in which the computer program 673 is stored may be implemented as hardware such as a digital signal processor (DSP) in which a computer program is integrated in a single semiconductor circuit. The DSP is capable of implementing all the processing operations implementable by the CPU 671 that executes the computer program 673 described above on a single integrated circuit. This DSP in place of the CPU 671 and the memory 672 illustrated in FIG. 7 may be used as the processing circuit 670.

The speech recognition/synthesis DB 600 stores acoustic models and language models for speech recognition. The appliance state management DB 620, the utterance interpretation dictionary DB 625, the appliance function DB 630, and the cooking program DB 640 will be described in detail below.

Figure 8:
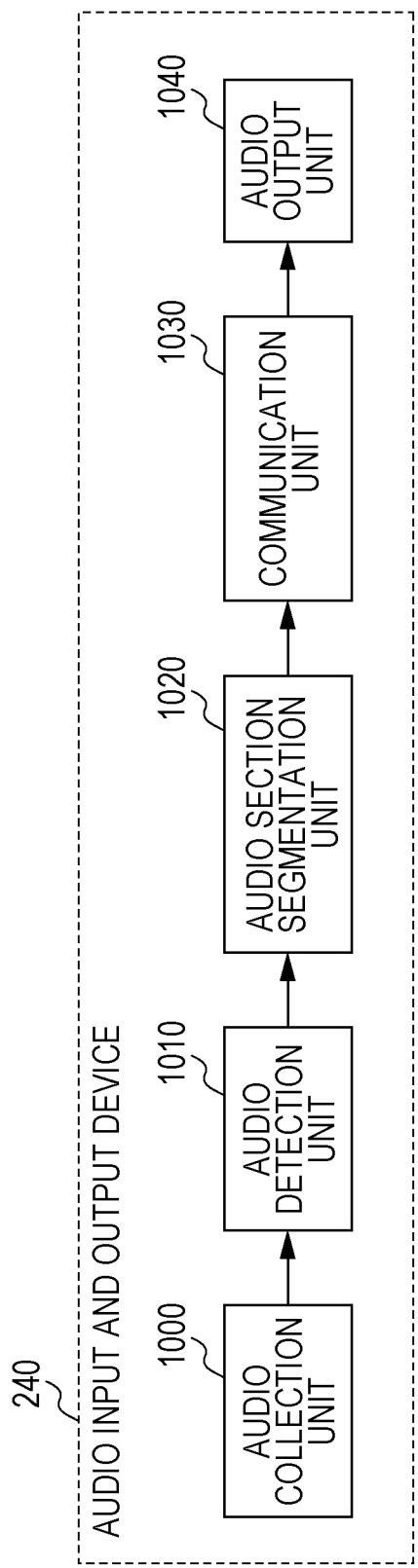
FIG. 8 is a diagram illustrating the system configuration of the audio input and output device according to the first embodiment and the second embodiment.

FIG. 8 is a block diagram illustrating the system configuration of the audio input and output device 240. The audio input and output device 240 includes an audio collection unit 1000, an audio detection unit 1010, an audio section segmentation unit 1020, a communication unit 1030, and an audio output unit 1040.

The audio collection unit 1000 corresponds to the audio collection circuit 301. The audio collection unit 1000 collects user speech and generates an analog audio signal. The audio collection unit 1000 converts the generated analog audio signal into digital data, and generates an audio signal.

The audio detection unit 1010 and the audio section segmentation unit 1020 are implemented by the processing circuit 300. The CPU 310 that executes the computer program 342 functions as, for example, the audio detection unit 1010 at a certain point in time, and functions as the audio section segmentation unit 1020 at a different point in time. At least one of the audio detection unit 1010 and the audio section segmentation unit 1020 may be implemented by hardware configured to perform dedicated processing, such as a DSP.

The audio detection unit 1010 determines whether or not audio has been detected. For example, if the level of the audio signal (e.g., the amplitude of the audio signal) generated by the audio collection unit 1000 is less than or equal to a predetermined value, the audio detection unit 1010 determines that no audio has been detected.

The audio section segmentation unit 1020 extracts a section in which audio is present from the acquired audio signal. The audio collection unit 1000, the audio detection unit 1010, and the audio section segmentation unit 1020 constitute an example of an audio acquisition unit.

The communication unit 1030 (an example of a second communication unit) corresponds to the communication circuit 303. The communication unit 1030 communicates with other communication devices (e.g., the gateway 102) via a network. The communication unit 1030 performs communication complying with, for example, the Ethernet (registered trademark) standards. The communication unit 1030 transmits an audio signal for the section extracted by the audio section segmentation unit 1020. Further, the communication unit 1030 passes the received audio signal to the audio output unit 1040.

The audio output unit 1040 corresponds to the audio output circuit 302. The audio output unit 1040 converts the audio signal received by the communication unit 1030 into an analog audio signal. The audio output unit 1040 outputs the resulting analog audio signal.

Figure 9:
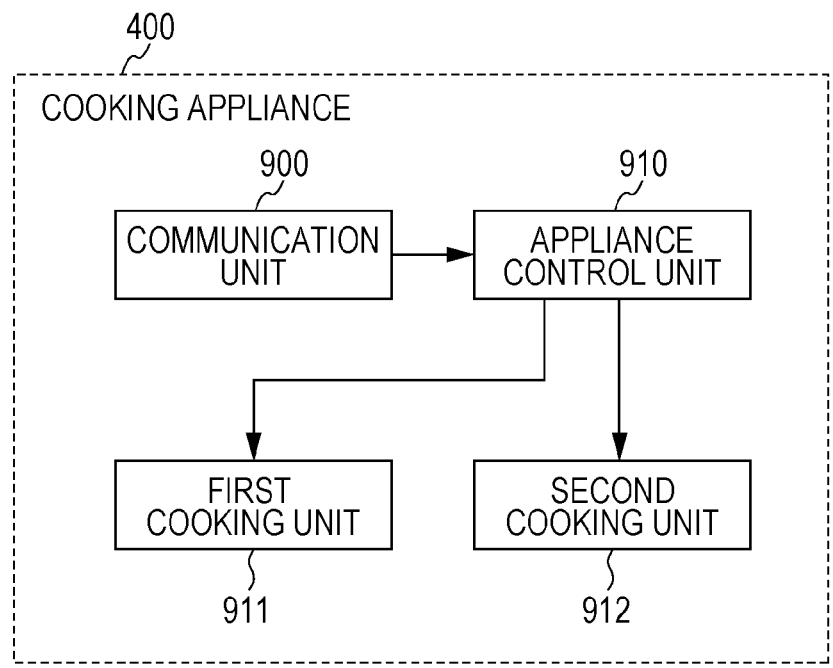
FIG. 9 is a diagram illustrating the system configuration of the cooking appliance according to the first embodiment and the second embodiment.

FIG. 9 is a block diagram illustrating the system configuration of the cooking appliance 400. The cooking appliance 400 includes a communication unit 900, an appliance control unit 910, a first cooking unit 911, and a second cooking unit 912.

The communication unit 900 (an example of a first communication unit) corresponds to the communication circuit 450. The communication unit 900 communicates with other communication devices (e.g., the gateway 102) via a network. The communication unit 900 performs communication complying with, for example, the Ethernet (registered trademark) standards.

The appliance control unit 910 (an example of a second control unit) corresponds to the input and output circuit 410 and the processing circuit 470. The processing circuit 470 corresponding to the appliance control unit 910 reads the control data received by the communication unit 900. The processing circuit 470 corresponding to the appliance control unit 910 controls the input and output circuit 410 using the read control data.

The appliance control unit 910 controls the operations of the first cooking unit 911 and the second cooking unit 912 in accordance with control commands received by the communication unit 900. The first cooking unit 911 and the second cooking unit 912 are configured to be capable of simultaneously executing different cooking programs. In a case where the cooking appliance 400 is the IH cooker 244, the first cooking unit 911 corresponds to, for example, a "heater 1", and the second cooking unit 912 corresponds to, for example, a "heater 2". In a case where the cooking appliance 400 is the oven range 243, the first cooking unit 911 corresponds to, for example, a "top rack", and the second cooking unit 912 corresponds to, for example, a "bottom rack".

Figure 10:
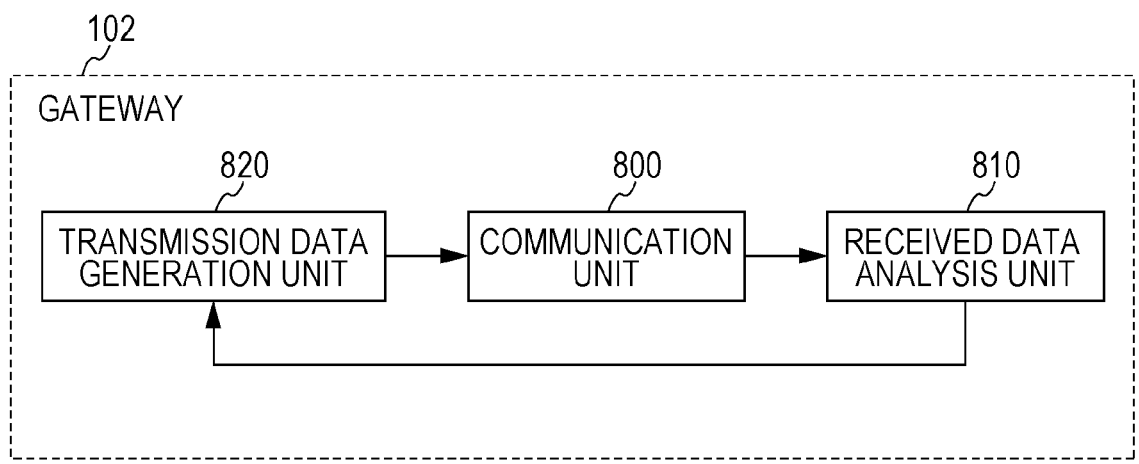
FIG. 10 is a diagram illustrating the system configuration of the gateway according to the first embodiment.

FIG. 10 is a block diagram illustrating the system configuration of the gateway 102. The gateway 102 includes a communication unit 800, a received data analysis unit 810, and a transmission data generation unit 820.

The communication unit 800 corresponds to the communication circuit 550. The communication unit 800 is a circuit that communicates with other devices (e.g., the audio input and output device 240, the cooking appliance 400, etc.) via a network. The communication unit 800 performs communication complying with, for example, the Ethernet (registered trademark) standards. The communication unit 800 passes received data to the received data analysis unit 810. Further, the communication unit 800 transmits data generated by the transmission data generation unit 820.

The received data analysis unit 810 corresponds to the processing circuit 570. The received data analysis unit 810 analyzes the data received by the communication unit 800 to determine the type of the received data. As a result of the analysis of the received data in terms of type, the received data analysis unit 810 determines the next target appliance (e.g., the audio input and output device 240 or the cooking appliance 400), and the data to be transmitted to the target appliance.

The transmission data generation unit 820 corresponds to the processing circuit 570. The transmission data generation unit 820 generates transmission data based on the next target appliance and the data to be transmitted to the target appliance, which are determined by the received data analysis unit 810.

Figure 11:
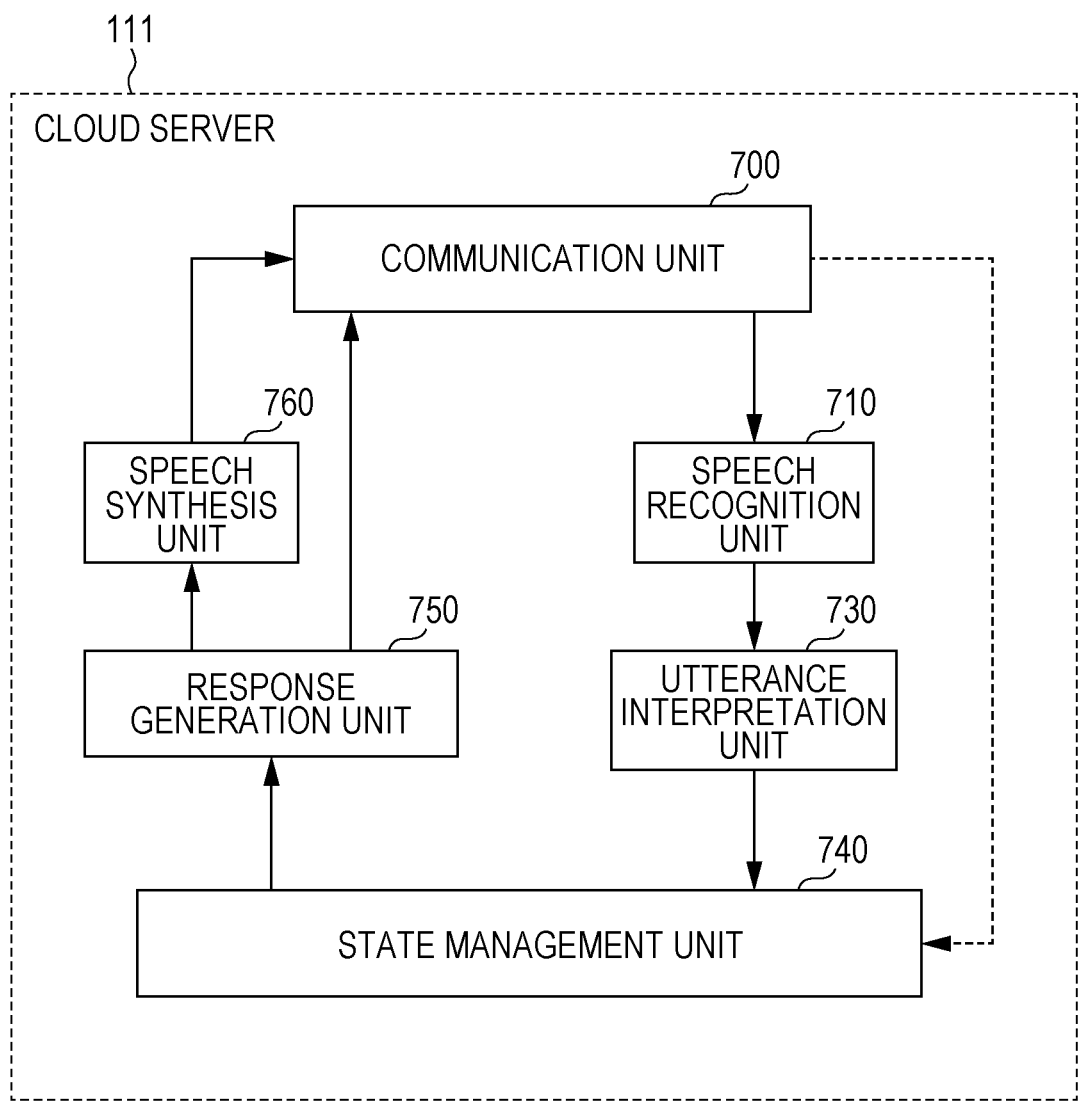
FIG. 11 is a diagram illustrating the system configuration of the cloud server according to the first embodiment.

FIG. 11 is a block diagram illustrating the system configuration of the cloud server 111. The cloud server 111 includes a communication unit 700, a speech recognition unit 710, an utterance interpretation unit 730, a state management unit 740, a response generation unit 750, and a speech synthesis unit 760.

The communication unit 700 (an example of a third communication unit and a fourth communication unit) corresponds to the communication circuit 650. The communication unit 700 is a circuit that communicates with other devices (e.g., the gateway 102) via a network. The communication unit 700 performs communication complying with, for example, the Ethernet (registered trademark) standards.

The speech recognition unit 710 is implemented by the processing circuit 670 and the speech recognition/synthesis DB 600. The speech recognition unit 710 converts an audio signal into character string data. Specifically, the speech recognition unit 710 acquires information on pre-registered acoustic models from the speech recognition/synthesis DB 600, and converts the audio signal into phonemic data using the acoustic models and the frequency characteristics of the audio signal. The speech recognition unit 710 also acquires information on pre-registered language models from the speech recognition/synthesis DB 600, and generates specific character string data using the language models in accordance with the arrangement of the phonemes in the phonemic data.

The utterance interpretation unit 730 is implemented by the processing circuit 670, the appliance function DB 630, and the cooking program DB 640. The utterance interpretation unit 730 extracts context data from the character string data. The context data may include, specifically, the target appliance name, the menu name (or food name), the cookware name, or the task content. The utterance interpretation unit 730 checks the character string data against the appliance function DB 630 and the cooking program DB 640 to extract context data.

The state management unit 740 (an example of a determination unit) is implemented by the processing circuit 670, the appliance state management DB 620, and the cooking program DB 640. The state management unit 740 receives the context data as input, and acquires data stored in the appliance state management DB 620 and the cooking program DB 640. The state management unit 740 changes the acquired data to update the appliance state management DB 620 and the cooking program DB 640.

The response generation unit 750 is implemented by the processing circuit 670, the appliance state management DB 620, the appliance function DB 630, and the cooking program DB 640. The response generation unit 750 searches the appliance state management DB 620, the appliance function DB 630, and the cooking program DB 640, and generates a control signal for controlling the cooking appliance 400 to be controlled. The response generation unit 750 searches the appliance function DB 630 and the cooking program DB 640, and generates character string data of information to be provided to the user 250.

The speech synthesis unit 760 is implemented by the processing circuit 670 and the speech recognition/synthesis DB 600. The speech synthesis unit 760 converts the character string data into an audio signal. Specifically, the speech synthesis unit 760 acquires information on pre-registered acoustic models and language models from the speech recognition/synthesis DB 600, and converts the character string data into a specific audio signal using the acoustic models and the language models.

Figure 12:
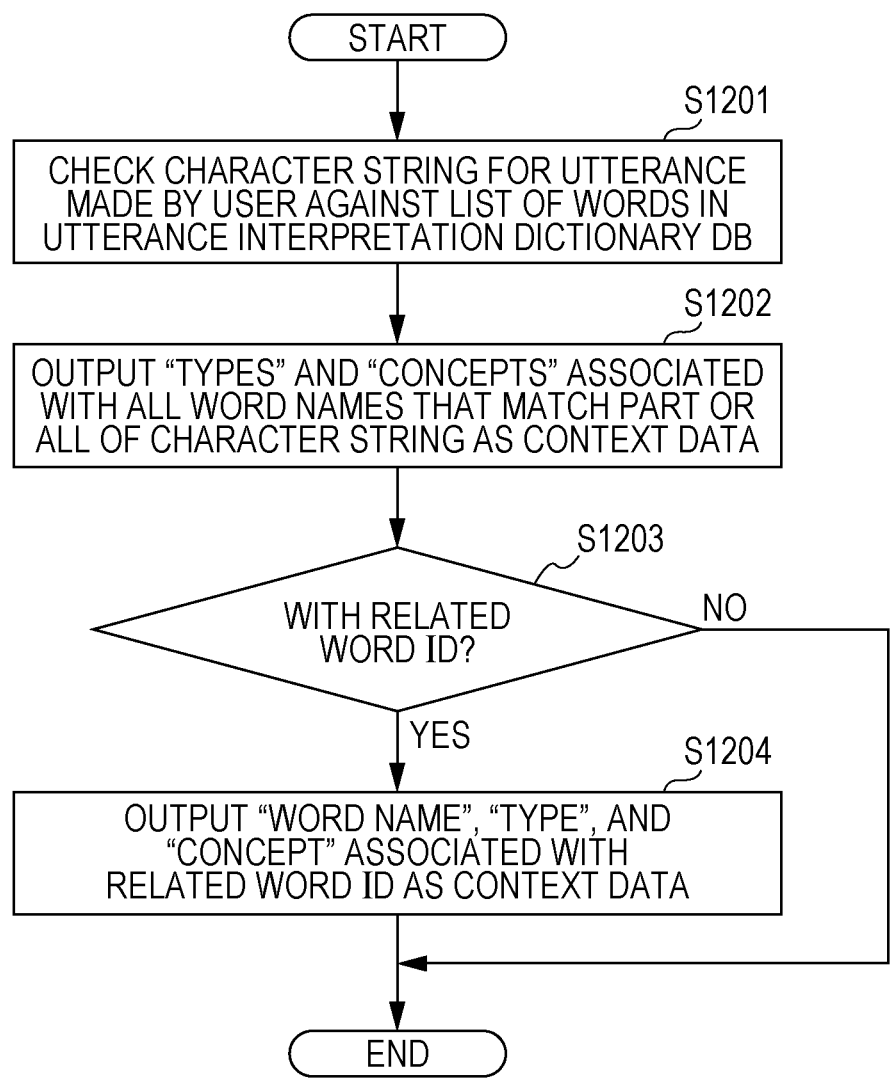
FIG. 12 is a flowchart illustrating an example of the operation of an utterance interpretation unit.

FIG. 12 is a flowchart illustrating an example of the operation of the utterance interpretation unit 730. FIGS. 13A and 13B are diagrams illustrating an example of the utterance interpretation dictionary DB 625. FIG. 14 is a diagram illustrating an example of context data 1400 extracted by the utterance interpretation unit 730. The context data 1400 illustrated in FIG. 14 is an example of context data in a case where a user speaks an utterance "Turn off the heat to the stew". In the following, the stew is described as a Japanese stewed or simmered vegetable dish ("nimono").

As illustrated in FIGS. 13A and 13B, the utterance interpretation dictionary DB 625 holds word IDs, word names, related word IDs, types, and concepts in association with one another.

The word IDs are identifiers uniquely assigned to the words registered in the word names. For example, the word name "pot" is registered with the word ID "W001". The related word IDs are word IDs of words related to the words registered in the word names. For example, the word ID "W030" associated with the word name "ground meat" is registered as a related word ID of the word name "hamburger steak".

Conversely, the word ID "W010" associated with the word name "hamburger steak" is registered as a related word ID associated with the word name "ground meat".

The types represent the types of the words registered in the word names. The types include <equipment>, <menu>, <category>, <ingredient>, <appliance>, and <task>. The type <equipment> represents a cooking equipment or cookware product. The type <menu> represents a menu item or food item. The type <category> represents the general concept of a menu item. The type <ingredient> represents the names of ingredients used in cooking. The type <appliance> represents a cooking appliance. The type <task> represents instructions for an action or the like.

For example, the word name "pot" is registered with the type <equipment>. For example, the word name "hamburger steak" is registered with the type <menu>. For example, the word name "stew" is registered with the type <category>. For example, the word name "ground meat" is registered with the type <ingredient>. For example, the word name "IH cooker" is registered with the type <appliance>. For example, the word name "turn off the heat" is registered with the type <task>.

The concepts represent logical symbols for the words registered in the word names. The concepts correspond to the words registered in the word names in a one-to-one way. For example, the word name "stew" is registered with the concept <stewed>. For example, the word name "oven range" is registered with the concept <stove>. For example, the word name "turn off the heat" is registered with the concept <stop_heat>.

A process illustrated in FIG. 12 is initiated by the utterance interpretation unit 730 immediately after the speech recognition unit 710 converts an audio signal for an utterance made by a user into character string data.

In S1201, the utterance interpretation unit 730 in the cloud server 111 checks a character string for the utterance made by the user (i.e., the character string data output from the speech recognition unit 710) against a list of word names in the utterance interpretation dictionary DB 625. In step S1202, the utterance interpretation unit 730 outputs, as context data, the "types" and "concepts" associated with all the word names that match part or all of the character string. As illustrated in FIG. 14, the context data is output in a table form.

In the example in FIG. 14, the utterance interpretation unit 730 determines that the word name "stew" and the word name "turn off the heat" in the utterance "Turn off the heat of the stew" match the corresponding word names in the utterance interpretation dictionary DB 625. As may be seen from FIGS. 13A and 13B, the utterance interpretation unit 730 outputs, as the context data 1400, the information associated with the word name "stew", namely, the word ID "W020", the type <category>, and the concept <stewed>, and the information associated with the word name "turn off the heat", namely, the word ID "W100", the type <task>, and the concept <stop_heat>.

In S1203, the utterance interpretation unit 730 determines whether or not each word name has a related word ID. If each word name has no related word ID (NO in S1203), the process illustrated in FIG. 12 ends. If each word name has a related word ID (YES in S1203), then in S1204, the utterance interpretation unit 730 outputs the "word name", "type", and "concept" associated with the related word ID as context data.

In the example in FIG. 14, as may be seen from FIGS. 13A and 13B, the utterance interpretation unit 730 determines that there is no related word ID associated with the word name "turn off the heat", and determines that there are related word IDs associated with the word name "stew". Then, the utterance interpretation unit 730 outputs the word name "beef stew", the type <menu>, and the concept <beef_stew>, which are associated with the related word ID "W011" associated with the word name "stew", and the word name "chikuzen-ni stew", the type <menu>, and the concept <chikuzen_ni>, which are associated with the related word ID "W012" associated with the word name "stew", as context data. As a result, the context data 1400 illustrated in FIG. 14 is output from the utterance interpretation unit 730.

FIG. 17 is a diagram illustrating a specific example of the appliance state management DB 620. The appliance state management DB 620 holds, for example, gateway IDs (GW-IDs), appliance IDs, appliance names <appliance>, ongoing cooking program IDs, ongoing cooking step IDs, cookware names <equipment>, menu names <menu>, and appliance operating states in association with one another.

The gateway IDs are identifiers uniquely assigned to gateways 102. In the example in FIG. 17, gateway IDs "G001" and "G002" are registered.

The appliance IDs are identifiers uniquely assigned to separate cooking units included in cooking appliances 400. In the example in FIG. 17, the appliance ID "M01-01" is registered with the "heater 1" of the IH cooker 244, the appliance ID "M01-02" is registered with the "heater 2" of the IH cooker 244, and the appliance ID "M01-03" is registered with a "heater 3" of the IH cooker 244. In addition, the appliance ID "M02-01" is registered with the "top rack" in the oven range 243, and the appliance ID "M02-02" is registered with the "bottom rack" in the oven range 243.

The appliance names <appliance> represent logical symbols for cooking appliances 400. The appliance names <appliance> correspond to the cooking appliances 400 in a one-to-one way. In the example in FIG. 17, the appliance name <ih_heater> is registered with each of the heaters 1, 2, and 3 of the IH cooker 244. In addition, the appliance name <stove> is registered with each of the top rack and bottom rack in the oven range 243.

The ongoing cooking program IDs are identifiers of ongoing cooking programs currently being undertaken. In the example in FIG. 17, the cooking programs with the cooking program IDs "T001", "T002", and "T003" are currently undertaken. The ongoing cooking step IDs are identifiers of individual cooking steps in currently ongoing cooking programs. In the example in FIG. 17, the cooking step with the cooking step ID "S001" is being performed in the cooking associated with the cooking program ID "T001", the cooking step with the cooking step ID "S002" is being performed in the cooking associated with the cooking program ID "T002", and the cooking step with the cooking step ID "S002" is being performed in the cooking associated with the cooking program ID "T003".

The cookware names <equipment> represent cookware items used in accordance with the associated cooking programs. In the example in FIG. 17, <pot> is used in the cooking associated with the cooking program ID "T001", <pan> is used in the cooking associated with the cooking program ID "T002", and <gratin$_{13}$plate> is used in the cooking associated with the cooking program ID "T003".

The menu names <menu> represent menu items (or food items) currently being cooked. In the example in FIG. 17, the menu item associated with the cooking program ID "T001" is represented by <chikuzen_ni>, the menu item associated with the cooking program ID "T002" is represented by <hamburger>, and the menu item associated with the cooking program ID "T003" is represented by <gratin>.

The appliance operating states indicate, for example, whether the corresponding appliances are currently in operation or in standby state. In the example in FIG. 17, the "heater 1" of the IH cooker 244 is in the appliance operating state "in standby mode", the "heater 2" of the IH cooker 244 is in the appliance operating state "in operation (over a low heat)", and the "top rack" in the oven range 243 is in the appliance operating state "in operation (2 minutes left)".

As described above, the IH cooker 244 has three cooking units, namely, the "heater 1", the "heater 2", and the "heater 3". The three cooking units are configured to be capable of simultaneously operating in accordance with different cooking programs. Accordingly, separate appliance IDs are registered with the "heater 1", the "heater 2", and the "heater 3" in order to individually identify the three cooking units. The "heater 1" of the IH cooker 244 is an example of a first cooking unit, and the "heater 2" of the IH cooker 244 is an example of a second cooking unit.

Similarly, the oven range 243 has two cooking units, namely, the "top rack" and the "bottom rack". The two cooking units are configured to be capable of simultaneously operating in accordance with different cooking programs. Accordingly, separate appliance IDs are registered with the "top rack" and the "bottom rack" in order to individually identify the two cooking units. The "top rack" in the oven range 243 is an example of the first cooking unit, and the "bottom rack" in the oven range 243 is an example of the second cooking unit.

FIG. 18 is a diagram illustrating a specific example of the appliance function DB 630. The appliance function DB 630 holds, for example, function IDs, appliance IDs, task contents <task>, control commands, and response messages in association with one another. The function IDs are identifiers uniquely assigned to functions of cooking units registered in association with the appliance IDs. The task contents <task> represent logical symbols indicating tasks for the functions with the function IDs. The control commands represent control commands used to perform the functions with the function IDs. The response messages represent messages issued when the functions with the function IDs are performed.

In the example in FIG. 18, the function ID "O01-01-01" represents the function of the cooking unit with the appliance ID "M01-01", that is, referring to FIG. 17, the function of the "heater 1" of the IH cooker 244. This function is associated with the task content <begin heat>, the control command "CMD=0xFFA05050", and the response message "The heater 1 was turned on".

Figure 20B:
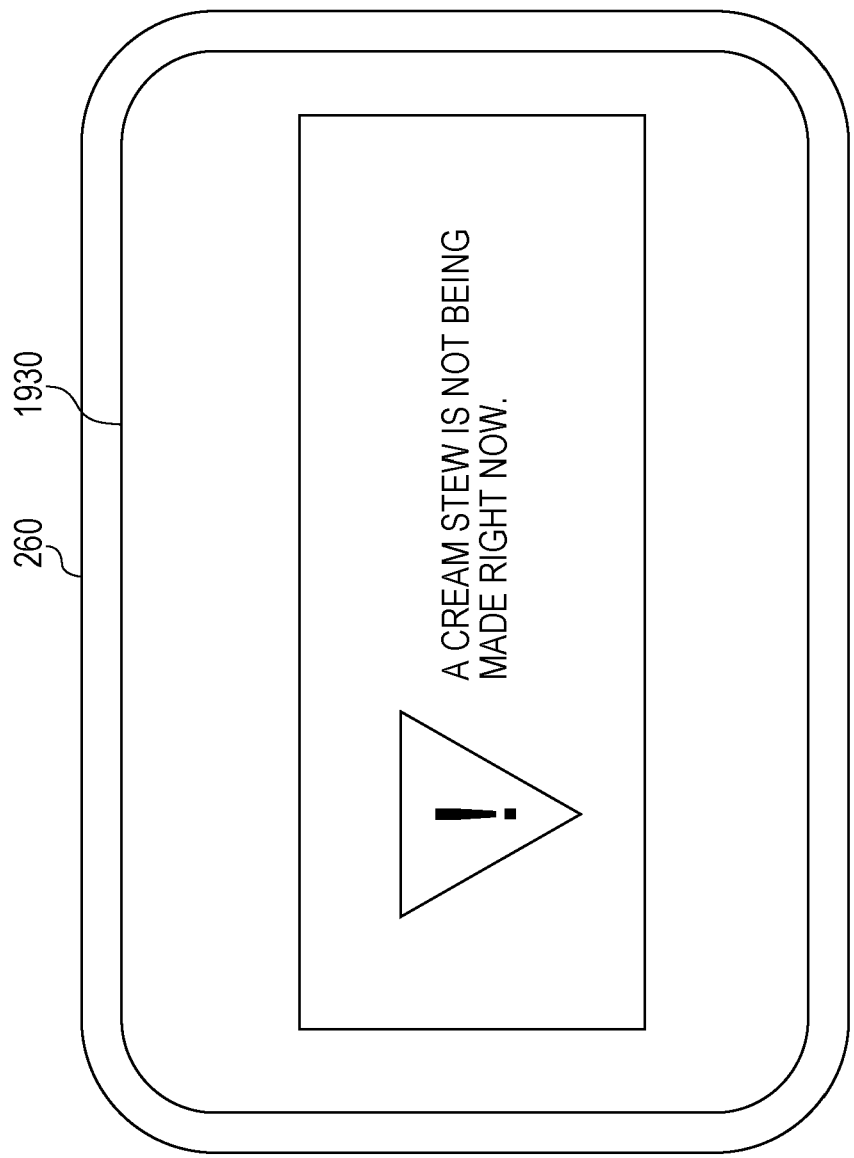
FIG. 20B is a diagram illustrating an example of a display screen of the display terminal.

FIG. 19A is a diagram illustrating an example of a menu list 1900 included in the cooking program DB 640. FIG. 19B is a diagram illustrating an example of a cooking step list 1910 included in the cooking program DB 640. FIG. 20A is a diagram illustrating an example of an error message list 1920 included in the cooking program DB 640. FIG. 20B is a diagram illustrating an example of a display screen 1930 of the display terminal 260.

As illustrated in FIG. 19A, the menu list 1900 in the cooking program DB 640 holds, for example, cooking program IDs, menu names <menu>, cookware names <equipment>, ingredient names <ingredient>, and category names <category> in association with one another. In the example illustrated in FIG. 19A, the cooking program ID "T001" is associated with the menu name <chikuzen_ni>, the cookware name <pot>, the ingredient names <chicken>, <carrot>, etc., and the category name <stewed>.

As illustrated in FIG. 19B, the cooking step list 1910 in the cooking program DB 640 holds, for example, cooking program IDs, cooking step IDs, and response messages in association with one another. In the example in FIG. 19B, the cooking procedure associated with the cooking program ID "T001" includes cooking steps with the cooking step IDs "S001", "S002", and so on. The response message "Heat the pot over a high heat" is registered in association with the cooking step with the cooking step ID "S002".

As illustrated in FIG. 20A, the error message list 1920 in the cooking program DB 640 holds, for example, error message IDs, error types, and response error messages in association with one another. In the example illustrated in FIG. 20A, "no categories, menu items, or ingredients" is registered as the error type with the error message ID "E002", and "XXX is not being made right now" is registered as the response error message. In the case of the error message ID "E002" in FIG. 20A, for example, as illustrated in FIG. 20B, the display terminal 260 displays a display screen 1930 including the response error message "A cream stew is not being made right now".

Figure 15A:
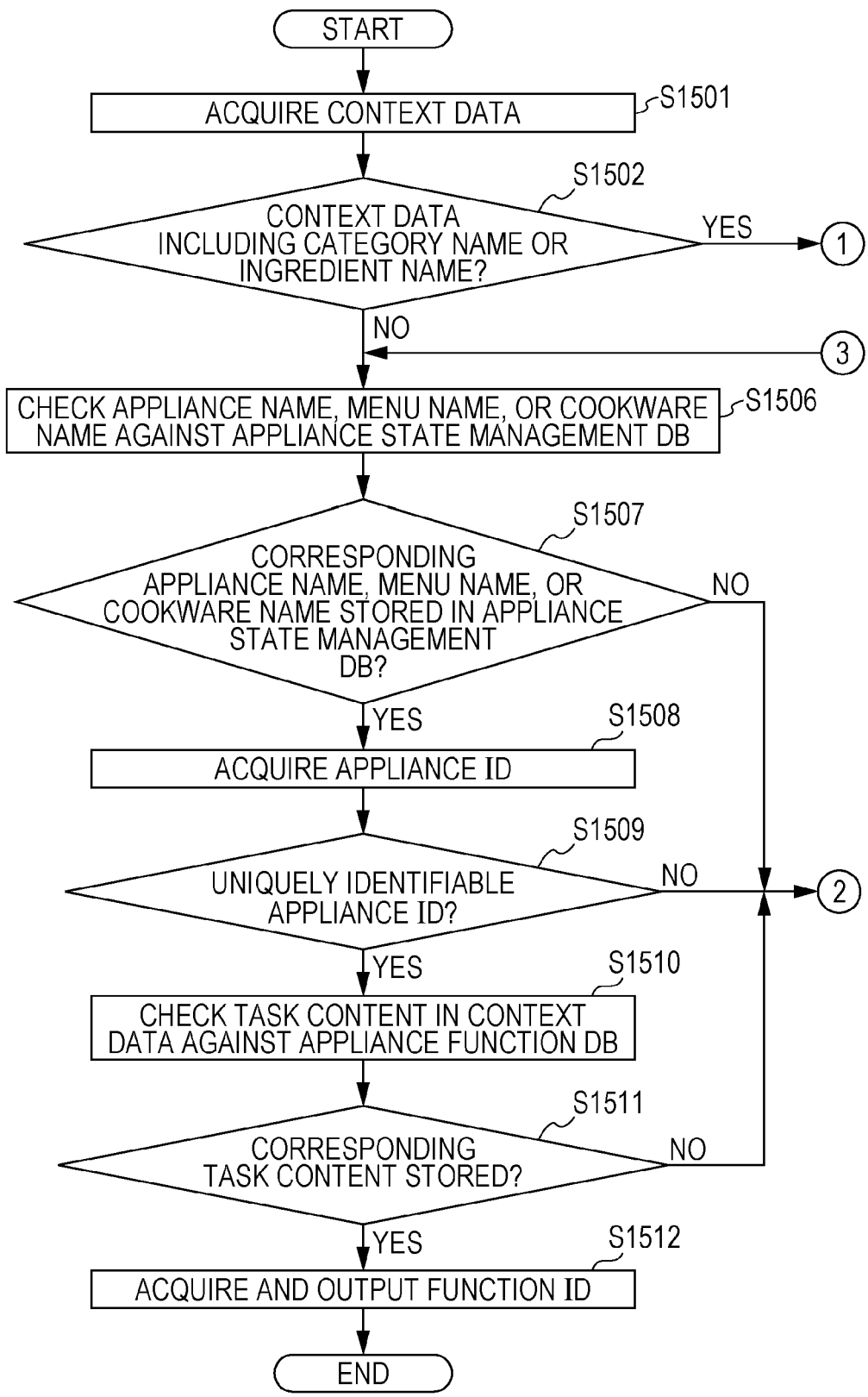
FIG. 15A is a flowchart illustrating an example of the operation of a state management unit.

FIGS. 15A and 15B are flowcharts illustrating an example of the operation of the state management unit 740 in the cloud server 111. First, the state management unit 740 acquires context data output from the utterance interpretation unit 730 (S1501). Then, the state management unit 740 determines whether or not the acquired context data includes a category name or an ingredient name (S1502). If it is determined that the context data does not include a category name or an ingredient name (NO in S1502), the state management unit 740 advances the process to S1506.

If it is determined that the context data includes a category name or an ingredient name (YES in S1502), the state management unit 740 checks the category name or the ingredient name against the cooking program DB 640 (S1503). The state management unit 740 determines whether or not the corresponding category name or ingredient name has been registered in the cooking program DB 640 (S1504). If it is determined that the corresponding category name or ingredient name has not been registered in the cooking program DB 640 (NO in S1504), the state management unit 740 advances the process to S1513.

If it is determined that the corresponding category name or ingredient name has been registered in the cooking program DB 640 (YES in S1504), the state management unit 740 outputs the associated menu name and cookware name (S1505), and then advances the process to S1506.

In S1506, in a case where NO is determined in S1502, the state management unit 740 checks the appliance name, menu name, or cookware name in the context data against the appliance state management DB 620. Alternatively, in S1506, in a case where the process proceeds to S1506 from S1505, the state management unit 740 checks the menu name and cookware name output in S1505 against the appliance state management DB 620.

In S1507, the state management unit 740 determines whether or not the corresponding appliance name, menu name, or cookware name has been registered in the appliance state management DB 620. If it is determined that the corresponding appliance name, menu name, or cookware name has not been registered in the appliance state management DB 620 (NO in S1507), the state management unit 740 advances the process to S1513.

If it is determined that the corresponding appliance name, menu name, or cookware name has been registered in the appliance state management DB 620 (YES in S1507), the state management unit 740 acquires the appliance ID from the appliance state management DB 620 (S1508). Then, the state management unit 740 determines whether or not the acquired appliance ID is uniquely identifiable (S1509). If it is determined that the acquired appliance ID is not uniquely identifiable (NO in S1509), the state management unit 740 advances the process to S1513.

If it is determined that the appliance ID is uniquely identifiable (YES in S1509), the state management unit 740 checks the task content in the context data against the appliance function DB 630 (S1510). Then, the state management unit 740 determines whether or not the corresponding task content has been registered in the appliance function DB 630 (S1511). If it is determined that the corresponding task content has not been registered in the appliance function DB 630 (NO in S1511), the state management unit 740 advances the process to S1513.

If it is determined that the corresponding task content has been registered in the appliance function DB 630 (YES in S1511), the state management unit 740 acquires the function ID from the appliance function DB 630, and outputs the acquired function ID (S1512). Then, the process illustrated in FIGS. 15A and 15B ends.

In S1513, the state management unit 740 searches the error message list 1920 in the cooking program DB 640 for the corresponding error message ID, and outputs the error message ID. Then, the process illustrated in FIGS. 15A and 15B ends.

For example, in a case where the process proceeds to S1513 since NO is obtained in S1504, the corresponding category name or ingredient name has not been registered. Thus, the state management unit 740 acquires the error message ID "E002".

For example, in a case where the process proceeds to S1513 since NO is obtained in S1507, the corresponding appliance name, menu name, or cookware name has not been registered. Thus, the state management unit 740 acquires any of the error message IDs "E001", "E002", and "E003".

For example, in a case where the process proceeds to S1513 since NO is obtained in S1509, the appliance ID is not uniquely identifiable. Thus, the state management unit 740 acquires the error message ID "E004".

For example, in a case where the process proceeds to S1513 since NO is obtained in S1511, the corresponding task content has not been registered. Thus, the state management unit 740 acquires the error message ID "E006".

If a plurality of error message IDs are obtained, the state management unit 740 may set the error message ID to be acquired to, for example, "E002" by default.

In S1513, an error message ID is output, and then the current process ends. After that, when the user 250 speaks an utterance in response to the error message, the operation of the utterance interpretation unit 730 (FIG. 12) is initiated.

Figure 16:
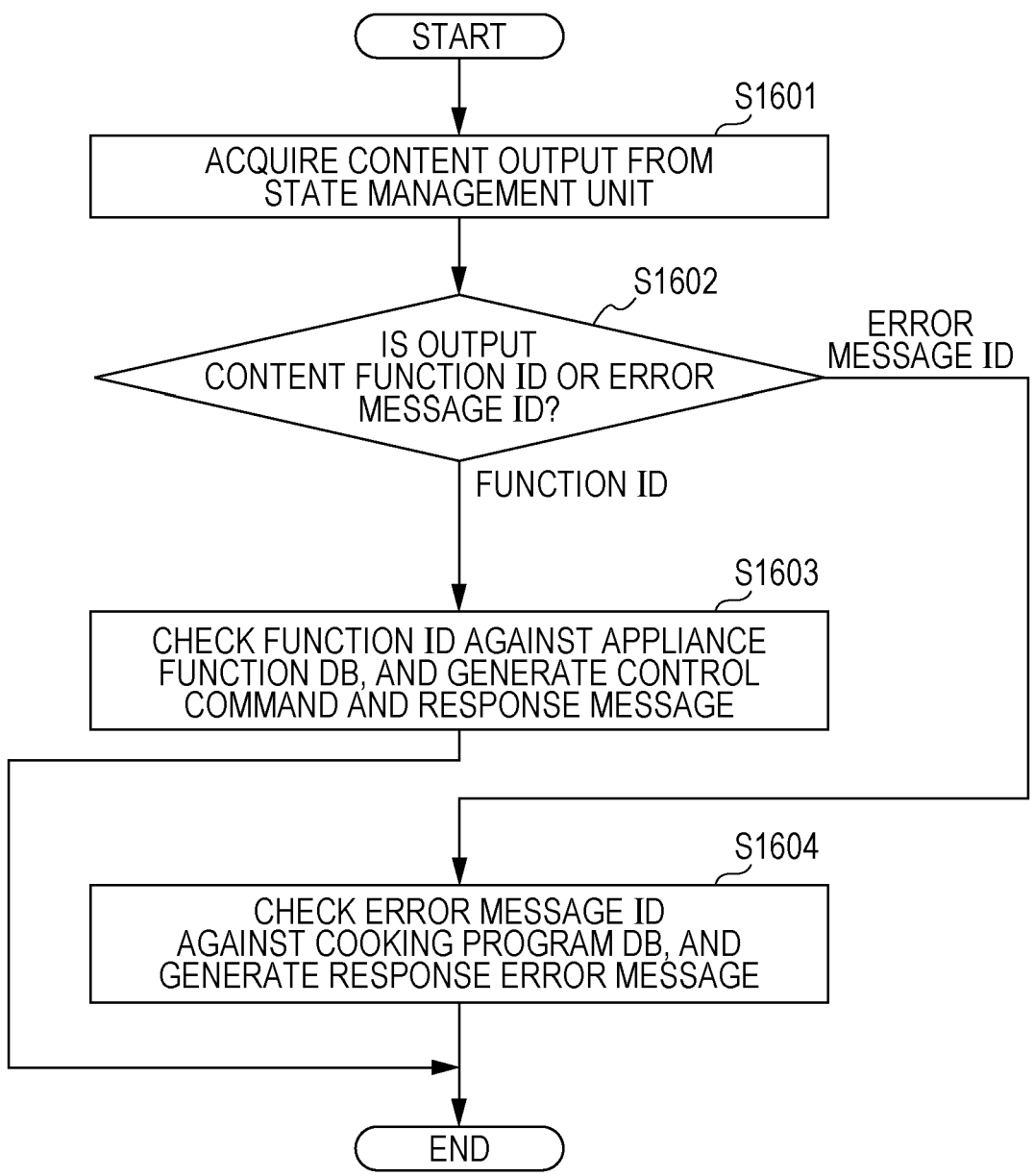
FIG. 16 is a flowchart illustrating an example of the operation of a response generation unit.

FIG. 16 is a flowchart illustrating an example of the operation of the response generation unit 750 in the cloud server 111. First, the response generation unit 750 acquires the content output from the state management unit 740 in S1512 or S1513 of FIGS. 15A and 15B (S1601). Then, the response generation unit 750 determines whether the acquired output content is a function ID or an error message ID (S1602).

If the acquired output content is a function ID ("function ID" in S1602), the response generation unit 750 checks the function ID against the appliance function DB 630, and generates a control command and a response message (S1603).

If the acquired output content is an error message ID ("error message ID" in S1602), the response generation unit 750 checks the error message ID against the error message list 1920 included in the cooking program DB 640, and generates a response error message (S1604).

Figure 21:
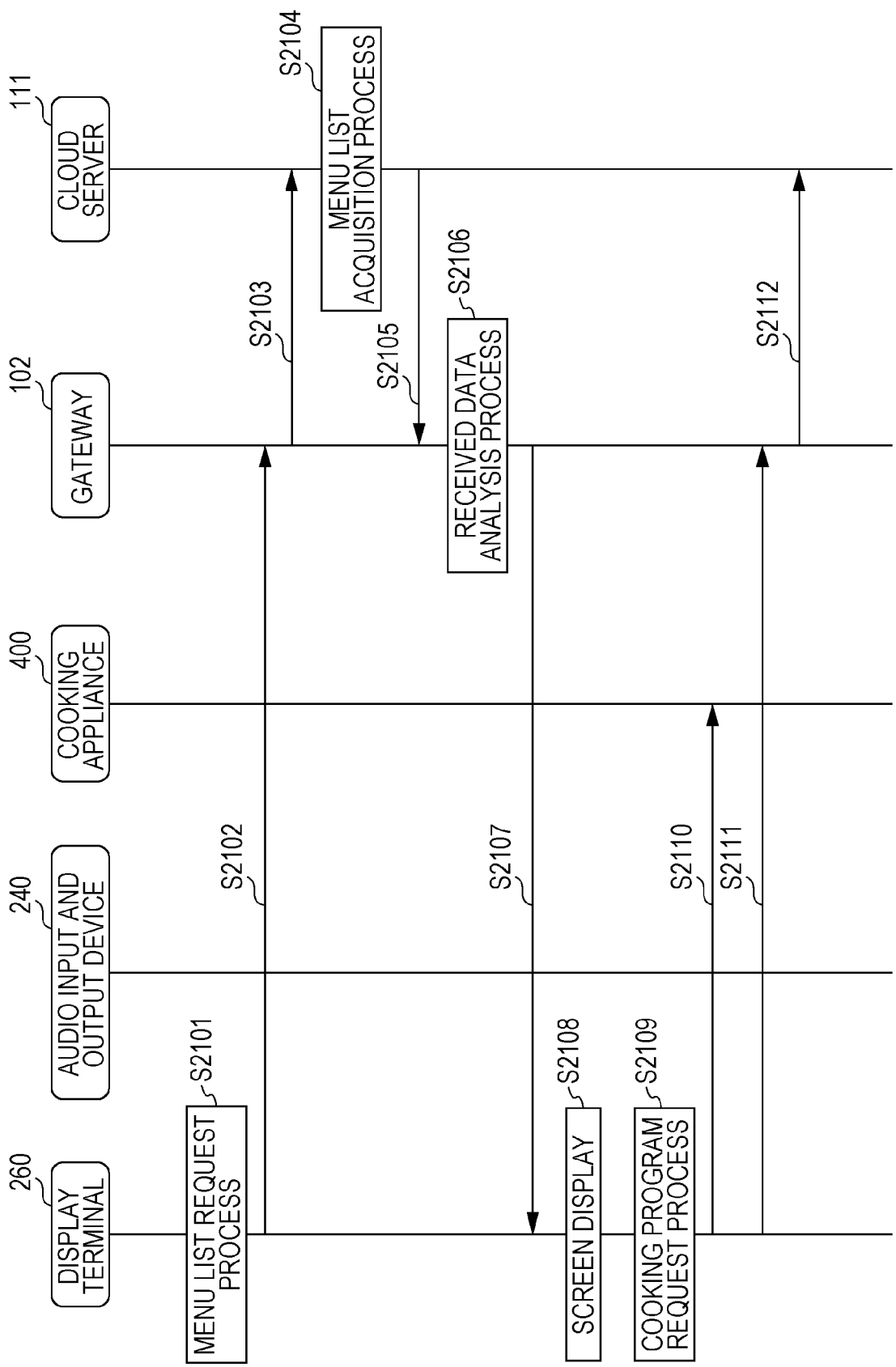
FIG. 21 is a sequence diagram illustrating the operation of a speech-based appliance control system according to the first embodiment.
Figure 24B:
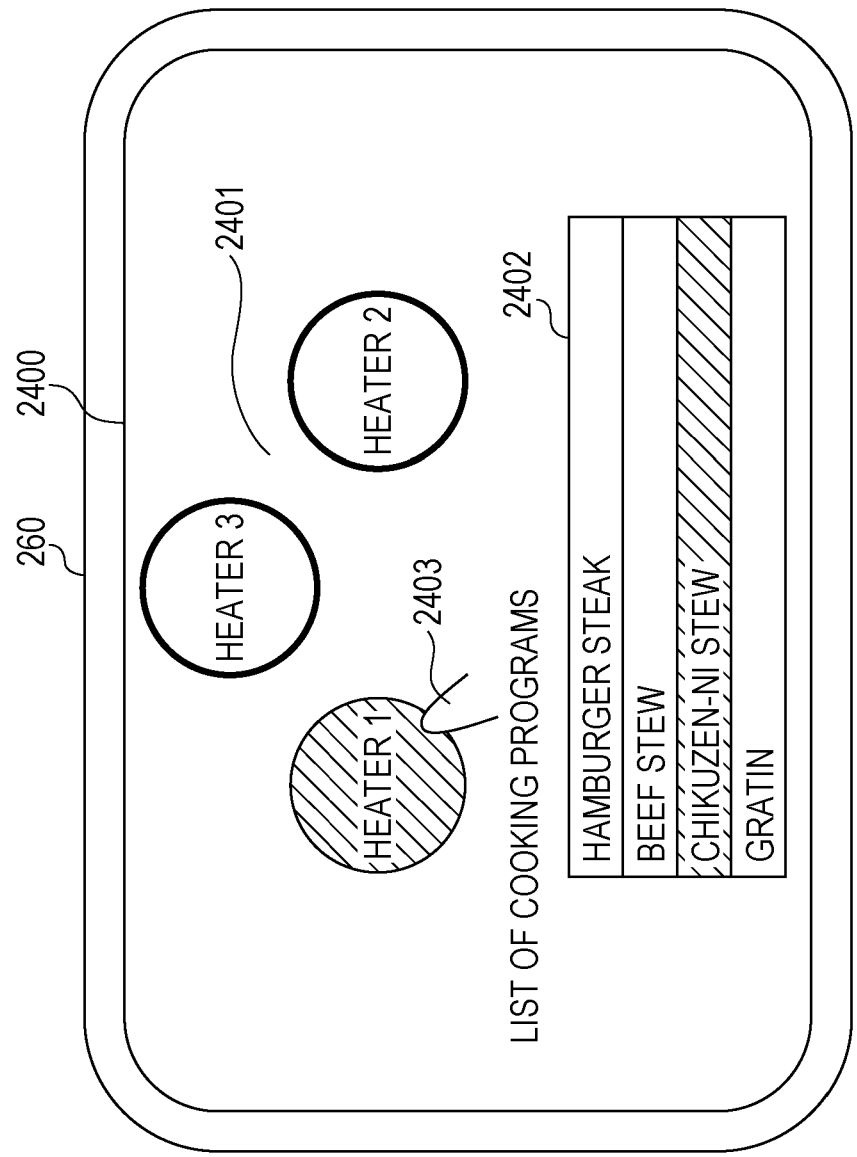
FIG. 24B is a diagram illustrating an example of the menu selection screen displayed on the display terminal.
Figure 24C:
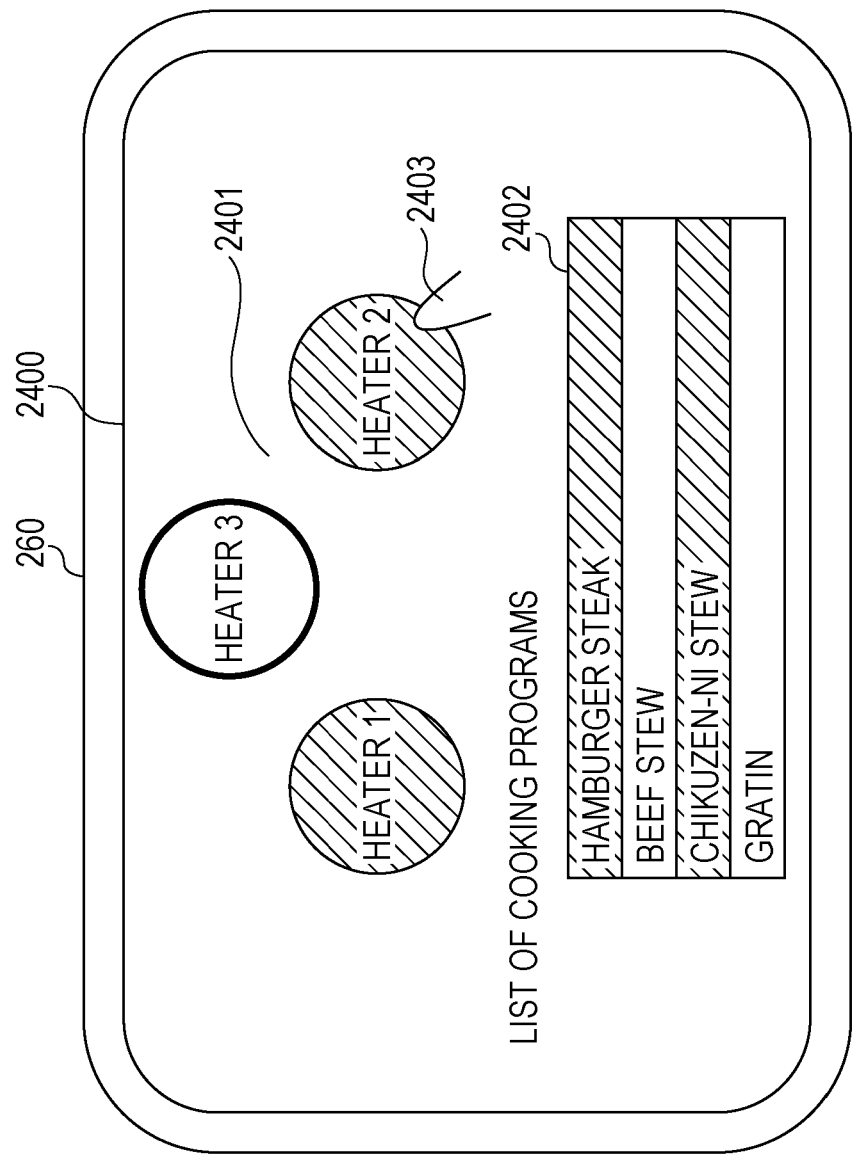
FIG. 24C is a diagram illustrating an example of the menu selection screen displayed on the display terminal.

FIGS. 21 to 23 are sequence diagrams illustrating the operation of the speech-based appliance control system according to the first embodiment. FIGS. 24A, 24B, and 24C are diagrams illustrating an example of a menu selection screen 2400 displayed on the display terminal 260. Note that FIGS. 21 to 23 illustrate a continuous sequence. The process in the sequence diagram illustrated in FIGS. 21 to 23 is initiated when the user 250 gives instructions to the display terminal 260 to start the speech-based appliance control system by, for example, tapping an icon displayed on a display screen of the display terminal 260.

In S2101, the display terminal 260 acquires a menu list request from the user 250. In S2102, the communication circuit 505 in the display terminal 260 transmits the acquired menu list request and the display terminal ID 521 to the gateway 102. The gateway 102 receives the menu list request and the display terminal ID 521.

In S2103, the gateway 102 transmits the menu list request and the display terminal ID 521 received from the display terminal 260, and the gateway ID 541 held in the memory 540 of the gateway 102 to the cloud server 111. The cloud server 111 receives the menu list request, the display terminal ID 521, and the gateway ID 541.

In S2104, the state management unit 740 in the cloud server 111 performs a menu list acquisition process to extract a menu list.

In S2105, the response generation unit 750 in the cloud server 111 transmits the extracted menu list, the display terminal ID 521 that specifies the display terminal 260 to be used for display, and the gateway ID 541 to the gateway 102. The gateway 102 receives the menu list, the display terminal ID 521, and the gateway ID 541.

In S2106, the received data analysis unit 810 in the gateway 102 performs a received data analysis process. In the received data analysis process, the received data analysis unit 810 separates the data received from the cloud server 111 into the menu list, the display terminal ID 521, and the gateway ID 541. Then, in S2107, the transmission data generation unit 820 in the gateway 102 transmits the separated menu list to the display terminal 260 corresponding to the display terminal ID 521.

In S2108, the display control circuit 500 in the display terminal 260 displays a menu selection screen 2400 on the display circuit 502 in a manner illustrated in FIG. 24A in accordance with the received menu list (an example of display screen information). In S2109, the display terminal 260 acquires instructions for a specific cooking program request from the user 250.

As illustrated in FIG. 24A, the menu selection screen 2400 includes a cooking appliance display portion 2401 and a cooking program display portion 2402. In the cooking appliance display portion 2401, a cooking appliance 400 including a plurality of cooking units is schematically displayed. In the example illustrated in FIG. 24A, three cooking units, namely, the "heater 1", the "heater 2", and the "heater 3" of the IH cooker 244, are displayed in the cooking appliance display portion 2401.

In the cooking program display portion 2402, a list of cooking programs is displayed. In the example illustrated in FIG. 24A, four menu items, e.g., "hamburger steak", "beef stew", "chikuzen-ni stew", and "gratin", are displayed in the cooking appliance display portion 2401. The cooking program display portion 2402 may be configured such that swiping up or down in the area corresponding to the cooking program display portion 2402 scrolls the screen to allow the remaining cooking programs to appear.

As illustrated in FIG. 24B, the user 250 taps, for example, an area labeled "chikuzen-ni stew" in the cooking program display portion 2402 and then taps an area labeled "heater 1" in the cooking appliance display portion 2401 with a contact object 2403 (e.g., the user's finger). Then, the display terminal 260 acquires instructions to request that a meal for the cooking program "chikuzen-ni stew" (an example of a first cooking recipe) be cooked using the "heater 1" (an example of a first cooking unit) of the IH cooker 244. In accordance with the instructions, the display terminal 260 acquires the cooking program ID and the appliance ID. In addition, as illustrated in FIG. 24B, the display terminal 260 changes the display color of the tapped areas to allow the user 250 to easily identify the selected items.

It is noted that the appliance IDs corresponding to the "heater 1", the "heater 2", and the "heater 3" of the IH cooker 244 are registered in advance.

Referring back to FIG. 21, in S2110, the communication circuit 505 in the display terminal 260 transmits the cooking program ID 523 to the cooking appliance 400 corresponding to the appliance ID. The cooking appliance 400 receives the transmitted cooking program ID 523, and stores the received cooking program ID 523 in the memory 440. The cooking program ID indicating "chikuzen-ni stew", which is transmitted in S2110 from the display terminal 260 to the cooking appliance 400, is an example of first cooking program information.

In S2111, the communication circuit 505 in the display terminal 260 transmits the cooking program ID, the display terminal ID, and the appliance ID to the gateway 102. The gateway 102 receives the cooking program ID, the display terminal ID, and the appliance ID. The cooking program ID indicating "chikuzen-ni stew", which is transmitted in S2111 from the display terminal 260 to the gateway 102, is an example of first cooking recipe selection information.

In S2112, the gateway 102 transmits the cooking program ID, the display terminal ID, and the appliance ID, which are received from the display terminal 260, and the gateway ID 541 held in the memory 540 of the gateway 102 to the cloud server 111. The communication circuit 650 in the cloud server 111 receives the cooking program ID, the display terminal ID, the appliance ID, and the gateway ID 541.

In S2201, the state management unit 740 in the cloud server 111 performs a cooking program management process. In the cooking program management process, the state management unit 740 performs a process to update the content of the appliance state management DB 620 using the values of the received cooking program ID, display terminal ID, appliance ID, and gateway ID.

Figure 26:
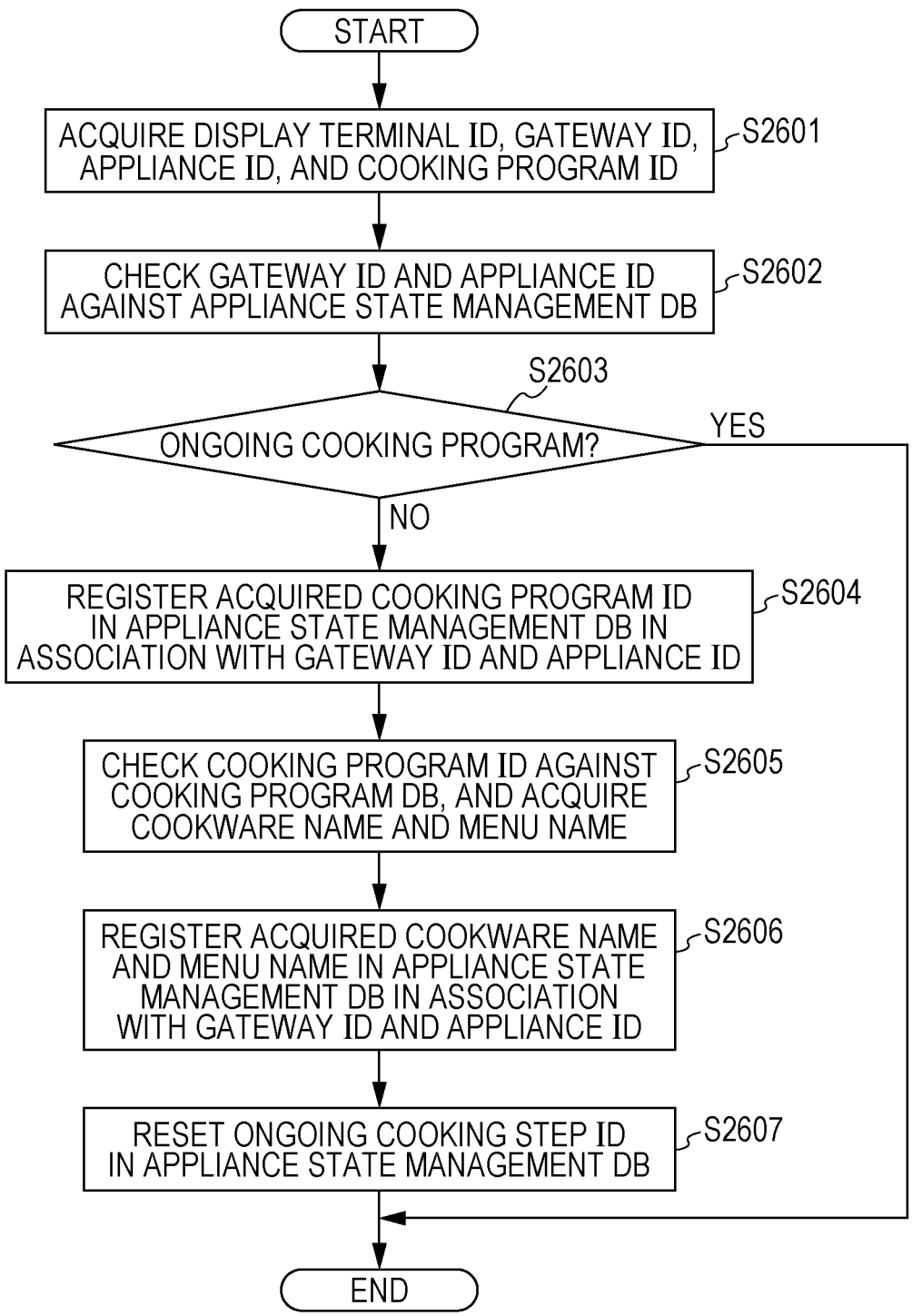
FIG. 26 is a flowchart illustrating a cooking program management process executed in S2201 of FIG. 22.

FIG. 26 is a flowchart illustrating the cooking program management process executed in S2201 of FIG. 22.

In S2601, the state management unit 740 acquires the display terminal ID, the gateway ID, the appliance ID, and the cooking program ID, which are received by the communication circuit 650 in S2112 of FIG. 21.

In S2602, the state management unit 740 checks the gateway ID and the appliance ID against the appliance state management DB 620. In S2603, the state management unit 740 determines whether or not the cooking program ID has been registered in the column of the ongoing cooking program ID in the appliance state management DB 620 associated with the gateway ID and the appliance ID. If the cooking program ID has been registered in the column of the ongoing cooking program ID (YES in S2603), the state management unit 740 ends the process illustrated in FIG. 26.

If the cooking program ID has not been registered in the column of the ongoing cooking program ID (NO in S2603), the state management unit 740 registers the cooking program ID acquired in S2601 in the column of the ongoing cooking program ID in the appliance state management DB 620 in association with the gateway ID and the appliance ID (S2604).

In S2605, the state management unit 740 checks the cooking program ID against the menu list 1900 in the cooking program DB 640, and acquires the cookware name and the menu name. In S2606, the state management unit 740 registers the acquired cookware name and menu name in the columns of the cookware name and menu name in the appliance state management DB 620, respectively, in association with the gateway ID and the appliance ID.

In S2607, the state management unit 740 resets the current value in the column of the ongoing cooking step ID in the appliance state management DB 620 to the initial value (in the example illustrated in FIG. 19B, "S001"), and ends the process illustrated in FIG. 26.

Referring back to FIG. 22, in S2202, the response generation unit 750 in the cloud server 111 performs a response text generation process to generate a response message for the user 250. Specifically, the cloud server 111 holds information on the response messages registered in the cooking step list 1910 (FIG. 19B) in the cooking program DB 640, and information on the response messages registered in the appliance function DB 630 (FIG. 18). The response generation unit 750 in the cloud server 111 reads the response messages stored in the cooking program DB 640 or the appliance function DB 630 to generate text data of response text.

In S2203, the speech synthesis unit 760 in the cloud server 111 performs a speech synthesis process to convert the response message into audio data. Specifically, the cloud server 111 holds information on the acoustic models and language models registered in the speech recognition/synthesis DB 600. The speech synthesis unit 760 in the cloud server 111 reads the information on the acoustic models and language models registered in the speech recognition/synthesis DB 600, and convert the text data of the response text into specific audio data using the information on the acoustic models and language models.

In S2204, the cloud server 111 transmits the generated audio data, the generated text data, the display terminal ID 521, and the gateway ID 541 to the gateway 102. The gateway 102 receives the audio data, the text data, the display terminal ID 521, and the gateway ID 541.

In S2205, the received data analysis unit 810 in the gateway 102 performs a received data analysis process. In the received data analysis process, the received data analysis unit 810 in the gateway 102 separates the received data into the audio data, the text data, the display terminal ID 521, and the gateway ID 541.

Then, in S2206, the transmission data generation unit 820 in the gateway 102 transmits the separated audio data to the audio input and output device 240. In S2207, the audio input and output device 240 outputs audio using the received audio data. Then, in S2208, the transmission data generation unit 820 in the gateway 102 transmits the separated text data to the display terminal 260 corresponding to the display terminal ID 521. In S2209, the display terminal 260 displays a text image corresponding to the received text data.

In S2301, the cooking appliance 400 detects the content of the operation (hereinafter referred to as the "operation content") to be performed on the cooking appliance 400 by the user 250. In S2302, the communication circuit 450 in the cooking appliance 400 transmits the detected operation content, the appliance ID 441, and the cooking program ID 443 to the gateway 102. The gateway 102 receives the operation content, the appliance ID 441, and the cooking program ID 443.

In S2303, the gateway 102 transmits the cooking program ID 443, the operation content, and the appliance ID 441, which are received from the cooking appliance 400, and the gateway ID 541 held in the memory 540 of the gateway 102 to the cloud server 111. The cloud server 111 receives the cooking program ID 443, the operation content, the appliance ID 441, and the gateway ID 541.

In S2304, the state management unit 740 in the cloud server 111 performs a cooking program update process. In the cooking program update process, the state management unit 740 performs a process to update the content of the appliance state management DB 620 using the values of the received cooking program ID, the received operation content, the received appliance ID 441, and the received gateway ID 541. On the basis of the received operation content, the state management unit 740 can know that the immediately preceding cooking step has been executed. The state management unit 740 updates the content of the appliance state management DB 620 in accordance with the result of the immediately preceding cooking step.

Specifically, for example, as illustrated in FIG. 24B, a description is given of the case where, in S2109 of FIG. 21, the user 250 made a request to cook "chikuzen-ni stew" using the "heater 1" of the IH cooker 244. In this case, as illustrated in FIG. 19A, the cooking program ID for "chikuzen-ni stew" is "T001". Thus, the response generation unit 750 in the cloud server 111 acquires the cooking program ID "T001" for "chikuzen-ni stew" from the state management unit 740.

The response generation unit 750 refers to the cooking step list 1910 in the cooking program DB 640 (FIG. 19B), and acquires the response message "Pour 400 cc of purified water into a pot on the stove" associated with the first cooking step ID "S001" associated with the cooking program ID "T001". In S2202 of FIG. 22, the response generation unit 750 generates the above-described response message.

The above-described response message is output as audio in S2207 of FIG. 22, and is displayed on a screen in S2209. Accordingly, the user 250 pours water into a pot and places the pot on the "heater 1" of the IH cooker 244. Then, in S2301 of FIG. 23, the cooking appliance 400 (in the illustrated example, the IH cooker 244) detects an increase in the weight on the "heater 1". In S2302, the cooking appliance 400 transmits the increase in the weight on the "heater 1" to the gateway 102 as operation content.

In S2303, the gateway 102 transmits the operation content indicating the increase in the weight on the "heater 1" to the cloud server 111. The communication circuit 650 in the cloud server 111 receives the operation content.

In S2304, the state management unit 740 acquires the operation content indicating the increase in the weight on the "heater 1", which is received by the communication circuit 650. On the basis of the operation content indicating the increase in the weight on the "heater 1", the state management unit 740 determines that the cooking step ID "S001" in the cooking (of chikuzen-ni stew) associated with the cooking program ID "T001" has been executed.

Thus, the state management unit 740 updates the ongoing cooking step ID corresponding to the "IH cooker: heater 1" with the appliance ID "M01-01" in the appliance state management DB 620 from "S001" to "S002". In this way, the state management unit 740 executes the cooking program update process in S2304.

Through the process illustrated in FIGS. 21 to 23, for example, chikuzen-ni stew is cooked using the "heater 1" of the IH cooker 244. In some cases, while cooking chikuzen-ni stew using the "heater 1", the user 250 may wish to simultaneously cook another meal using another cooking unit of the IH cooker 244. In these cases, for example, in accordance with an operation such as tapping an icon displayed on the display terminal 260, the speech-based appliance control system again starts the process from S2101 of FIG. 21.

In this case, in S2108 of FIG. 21, as illustrated in FIG. 24B, the menu selection screen 2400 indicating that chikuzen-ni stew is being cooked and "heater 1" is in use is displayed on the display terminal 260.

While the menu selection screen 2400 is being displayed on the display terminal 260, as illustrated in FIG. 24C, the user 250 taps, for example, an area labeled "hamburger steak" in the cooking program display portion 2402 and then taps an area labeled "heater 2" in the cooking appliance display portion 2401 with the contact object 2403 (e.g., the user's finger). Then, in S2109 of FIG. 21, the display terminal 260 acquires instructions to request that a meal for the cooking program "hamburger steak" (an example of a second cooking recipe) be cooked using the "heater 2" (an example of a second cooking unit) of the IH cooker 244.

In accordance with the instructions, the display terminal 260 acquires the cooking program ID and the appliance ID. In addition, as illustrated in FIG. 24C, the display terminal 260 changes the display color of the tapped areas to allow the user 250 to easily identify the further selected items.

Then, the process illustrated in FIGS. 21 to 23 is performed again using the cooking program ID indicating "hamburger steak" and the appliance ID indicating the "heater 2" of the IH cooker 244. In this case, the cooking program ID indicating "hamburger steak", which is transmitted in S2110 of FIG. 21 from the display terminal 260 to the cooking appliance 400, is an example of second cooking program information. Furthermore, the cooking program ID indicating "hamburger steak", which is transmitted in S2111 of FIG. 21 from the display terminal 260 to the gateway 102, is an example of second cooking recipe selection information.

The heating of the cooking appliance 400 may be started in response to an operation of the user 250. In this case, the response message "Heat the pot over a high heat", which has been registered in the cooking step list 1910 illustrated in FIG. 19B, may be output.

The heating of the cooking appliance 400 may be automatically started in response to an increase in the weight of the pot. In this case, the response message "The heater 1 was turned on", which has been registered in the appliance function DB 630 illustrated in FIG. 18, may be output.

In response to an operation performed by the user 250 during the execution of a cooking program, the process illustrated in FIG. 23 is executed for each operation.

FIG. 25 is a sequence diagram illustrating a process for determining the target of audio instructions in the speech-based appliance control system according to the first embodiment. The process illustrated in FIG. 25 is initiated when a user gives some instructions to an appliance by using speech.

In S2501, the audio input and output device 240 acquires audio data of the user 250. In S2502, the communication circuit 303 in the audio input and output device 240 transmits the acquired audio data to the gateway 102. The gateway 102 receives the audio data.

In S2503, the gateway 102 transmits the audio data received from the audio input and output device 240 and the gateway ID 541 held in the memory 540 of the gateway 102 to the cloud server 111. The communication circuit 650 in the cloud server 111 receives the audio data and the gateway ID 541.

In S2504, the speech recognition unit 710 and the utterance interpretation unit 730 in the cloud server 111 execute an audio content interpretation process. In the audio content interpretation process, first, the speech recognition unit 710 acquires the user audio data received from the communication circuit 650. The speech recognition unit 710 extracts frequency characteristics from the user audio data. The speech recognition unit 710 extracts phonemic data using the acoustic models held in the speech recognition/synthesis DB 600 and the extracted frequency characteristics.

The speech recognition unit 710 converts the extracted phonemic data into specific character string data by checking the extracted phonemic data against the speech recognition/synthesis DB 600 and determining which character string data of the language models held in the speech recognition/synthesis DB 600 is the most similar to the extracted phonemic data in terms of arrangement. The utterance interpretation unit 730 executes the process described above with reference to FIG. 12 using the character string data obtained by the speech recognition unit 710. In this way, the audio content interpretation process in S2504 is executed.

In S2505, the state management unit 740 in the cloud server 111 executes a state management process. In the state management process, the state management unit 740 executes the process described above with reference to FIGS. 15A and 15B.

In S2506, the response generation unit 750 in the cloud server 111 executes an output generation process. In the output generation process, the response generation unit 750 executes the process described above with reference to FIG. 16.

In S2507, the speech synthesis unit 760 in the cloud server 111 performs a speech synthesis process. In the speech synthesis process in S2507, the speech synthesis unit 760 in the cloud server 111 performs a process to convert response text into audio data. Specifically, the cloud server 111 holds information on the acoustic models and language models registered in the speech recognition/synthesis DB 600. The CPU 671 in the cloud server 111 reads the information on the acoustic models and language models registered in the speech recognition/synthesis DB 600, and convert the character string data into specific audio data using the information on the acoustic models and language models.

In S2508, the cloud server 111 transmits the generated control command, the generated audio data, the generated text data, the appliance ID 441 of the appliance to be controlled, and the gateway ID 541 to the gateway 102. The gateway 102 receives the control command, the audio data, the text data, the appliance ID 441, and the gateway ID 541.

In S2509, the received data analysis unit 810 in the gateway 102 performs a received data analysis process. In the received data analysis process in S2509, the received data analysis unit 810 in the gateway 102 separates the received data into the control command, the audio data, the text data, the appliance ID 441, and the gateway ID 541.

In S2510, the transmission data generation unit 820 in the gateway 102 transmits the separated text data to the display terminal 260. In S2511, the display terminal 260 displays the received text data on the display screen.

In S2512, the transmission data generation unit 820 in the gateway 102 transmits the separated control command to the cooking appliance 400 corresponding to the appliance ID 441. In S2513, the appliance control unit 910 in the cooking appliance 400 controls the operation in accordance with the control command received by the communication unit 900.

In S2514, the transmission data generation unit 820 in the gateway 102 transmits the separated audio data to the audio input and output device 240. In S2515, the audio output unit 1040 in the audio input and output device 240 outputs audio in accordance with the audio data received by the communication unit 1030.

A specific example of the process illustrated in FIG. 25 will now be described. First, a description will be given of the operation in a first specific example in a case where while, as illustrated above in FIG. 24C, chikuzen-ni stew and hamburger steak are being cooked, as in FIG. 14 described above, the user 250 speaks an utterance "Turn off the heat to the stew".

In this case, as a result of the audio content interpretation process in S2504 of FIG. 25, the context data 1400 illustrated in FIG. 14 is output from the utterance interpretation unit 730. Then, in S2505, as described above, the process illustrated in FIGS. 15A and 15B is executed by the state management unit 740.

In the context data 1400 illustrated in FIG. 14, "stew" is associated with the type <category> and the concept <stewed>. Since a category name is included, YES is determined in S1502 of FIG. 15A and the process proceeds to S1503 of FIG. 15B.

In S1503 of FIG. 15B, the category name is checked against the cooking program DB 640 (FIG. 19A). Since <stewed> has been registered in the category name <category>, YES is determined in S1504. Then, in S1505, the menu name <chikuzen_ni> and the cookware name <pot> are output.

Although not given in the cooking program DB 640 illustrated in FIG. 19A, as may be anticipated from the related word IDs of the word name "stew" in FIG. 13A, the beef stew is also a kind of stew. Thus, in S1505, the menu name <beef_stew> and the cookware name <pot> are also output.

In S1506 of FIG. 15A, as a result of checking the output menu names and cookware names against the appliance state management DB 620 (FIG. 17), the menu name <chikuzen_ni> has been registered. Thus, YES is determined in S1507. Then, in S1508, the appliance ID "M01-01" (an example of specific-cooking-unit information) is acquired. Since the appliance ID is uniquely identifiable, YES is determined in S1509, and the process proceeds to S1510 and then to S1511. In this way, an appliance ID is identified by the menu name <chikuzen_ni> in the appliance state management DB 620.

In S1510, the concept <stop_heat> of the word name "turn off the heat" associated with the type <task> in the context data 1400 (FIG. 14) has been registered in association with the appliance ID "M01-01" in the appliance function DB 630 (FIG. 18). Thus, YES is determined in S1511. Then, in S1512, the function ID "O01-01-02" is output. Accordingly, the state management process in S2505 of FIG. 25 ends.

Subsequently, the output generation process in S2506 of FIG. 25, that is, the process illustrated in FIG. 16, which is performed by the response generation unit 750, is executed. In the first specific example, a function ID is output from the state management unit 740. Thus, in S1603 of FIG. 16, the function ID "O01-01-02" is checked against the appliance function DB 630 (FIG. 18), and the control command "CMD=0xFFA05051" and the response message "The heater 1 was turned off" are generated.

Accordingly, in response to the utterance "Turn off the heat to the stew" made by the user 250, the "heater 1" with which chikuzen-ni stew is being cooked, rather than the "heater 2" with which hamburger steak is being cooked, can be accurately turned off. In the first specific example, "Turn off the heat to the stew" is an example of instruction information, "turn off the heat" is an example of first audio information (operation instructions), and "stew" is an example of first menu information or second menu information and is also an example of second audio information.

A description will now be given of the operation in a second specific example in a case where while, as illustrated above in FIG. 24C, chikuzen-ni stew and hamburger steak are being cooked, unlike FIG. 14 described above, the user 250 speaks an utterance "Turn off the heat to the pot", focusing on differences from the operation in the first specific example described above.

In this case, the context data output from the utterance interpretation unit 730 includes the type <equipment> and the concept <pot> associated with the column of the word name "pot", and the type <task> and the concept <stop_heat> associated with the column of the word name "turn off the heat" in the utterance interpretation dictionary DB 625 illustrated in FIGS. 13A and 13B.

The context data includes no category names or ingredient names. Thus, NO is determined in S1502 of FIG. 15A. Then, the process proceeds to S1506. In the appliance state management DB 620 (FIG. 17), the cookware name <pot> in the context data has been registered in one column. Thus, the appliance ID "M01-01" is acquired through S1506 to S1508. Accordingly, an appliance ID is identified by the cookware name <pot> in the appliance state management DB 620.

In the following, the task content "turn off the heat" is the same as that in the first specific example described above. Thus, the process is performed in a manner similar to that in the first specific example described above, and a similar control command and a similar response message are generated.

Accordingly, in response to the utterance "Turn off the heat to the pot" made by the user 250, the "heater 1" with which chikuzen-ni stew is being cooked, rather than the "heater 2" with which hamburger steak is being cooked, can be accurately turned off. In the second specific example, "Turn off the heat to the pot" is an example of instruction information, "turn off the heat" is an example of first audio information (operation instructions), and "pot" is an example of first cookware information or second cookware information and is also an example of second audio information.

A description will now be given of the operation in a third specific example in a case where while, unlike FIG. 24C described above, chikuzen-ni stew and beef stew are being cooked, as in FIG. 14 described above, the user 250 speaks an utterance "Turn off the heat to the stew", focusing on differences from the operations in the first and second specific examples.

In this case, the context data 1400 illustrated in FIG. 14, which is the same as that in the first specific example described above, is output from the utterance interpretation unit 730. Thus, similarly to the first specific example described above, in S1505 of FIG. 15B, the menu name <chikuzen_ni> and the cookware name <pot> are output. In addition, similarly to the first specific example described above, the menu name <beef_stew> and the cookware name <pot> are also output in S1505.

In the third specific example, <beef_stew> has been registered in place of <hamburger> in the menu name in the appliance state management DB 620 illustrated in FIG. 17. Thus, both the menu name <chikuzen_ni> and the menu name <beef_stew> have been registered in the appliance state management DB 620. Accordingly, in S1508 of FIG. 15A, both the appliance ID "M01-01" and the appliance ID "M01-02" are acquired. As a result, a uniquely identifiable appliance ID is not obtained and thus NO is determined in S1509.

In the third specific example, the cookware name <pot> is stored with redundancy. Thus, in S1513 of FIG. 15B, the error message ID "E004" is acquired from the error message list 1920 in the cooking program DB 640 illustrated in FIG. 20A, and is output.

Subsequently, in the third specific example, an error message ID is output from the state management unit 740. Thus, in S1604 of FIG. 16, the error message ID "E004" is checked against the cooking program DB 640 illustrated in FIG. 20A, the response error message "Please enter the name of a menu item" is generated.

Accordingly, in response to the utterance "Turn off the heat to the stew" made by the user 250, it is difficult to determine which of the "heater 1" with which chikuzen-ni stew is being cooked and the "heater 2" with which beef stew is being cooked to select since both chikuzen-ni stew and beef stew are stews. Thus, the user 250 is prompted to utter "the name of a menu item". In the third specific example, "Turn off the heat to the stew" is an example of instruction information, and "turn off the heat" is an example of first audio information (operation instructions).

A description will now be given of the operation in a fourth specific example in a case where while, unlike FIG. 24C described above, chikuzen-ni stew and beef stew are being cooked, unlike FIG. 14 described above, the user 250 speaks an utterance "Turn off the heat to the pot", focusing on differences from the operations in the first to third specific examples described above.

In this case, similarly to the second specific example described above, the context data output from the utterance interpretation unit 730 includes the type <equipment> and the concept <pot> associated with the column of the word name "pot", and the type <task> and the concept <stop_heat> associated with the column of the word name "turn off the heat" in the utterance interpretation dictionary DB 625 illustrated in FIGS. 13A and 13B.

The context data includes no category names or ingredient names. Thus, NO is determined in S1502 of FIG. 15A. Then, the process proceeds to S1506.

In the fourth specific example, similarly to the third specific example described above, in the appliance state management DB 620, <pot> has been registered as the cookware name corresponding to the menu name <chikuzen_ni>, and <pot> has also been registered as the cookware name corresponding to the menu name <beef_stew>. Thus, a uniquely identifiable appliance ID is not obtained.

In the fourth specific example, similarly to the third specific example described above, the cookware name <pot> is stored with redundancy. Thus, similarly to the third specific example described above, the response error message "Please enter the name of a menu item" is generated.

Accordingly, in response to the utterance "Turn off the heat to the pot" made by the user 250, it is difficult to determine which of the "heater 1" with which chikuzen-ni stew is being cooked and the "heater 2" with which beef stew is being cooked to select since two pots are in use. Thus, the user 250 is prompted to utter "the name of a menu item". In the fourth specific example, "Turn off the heat to the pot" is an example of instruction information, and "turn off the heat" is an example of first audio information (operation instructions).

A description will now be given of the operation in a fifth specific example in a case where while, as in FIG. 24C described above, chikuzen-ni stew and hamburger steak are being cooked, unlike FIG. 14 described above, the user 250 speaks an utterance "Heat the pot over a low heat", focusing on differences from the operation in the first to fourth specific examples described above.

In this case, the context data output from the utterance interpretation unit 730 includes the type <equipment> and the concept <pot> associated with the column of the word name "pot", and the type <task> and the concept <low_heat> associated with the column of the word name "low heat" in the utterance interpretation dictionary DB 625 illustrated in FIGS. 13A and 13B.

The context data includes no category names or ingredient names. Thus, NO is determined in S1502 of FIG. 15A. Then, the process proceeds to S1506. In the appliance state management DB 620 (FIG. 17), the cookware name <pot> in the context data has been registered in one column. Thus, the appliance ID "M01-01" is acquired through S1506 to S1508. Accordingly, an appliance ID is identified by the cookware name <pot> in the appliance state management DB 620.

Since an appliance ID is uniquely identified in S1509 of FIG. 15A, the processing of S1510 to S1512 is executed. The concept <low_heat> associated with "low heat" corresponding to the type <task> in the context data has been registered in association with the appliance ID "M01-01" in the appliance function DB 630 illustrated in FIG. 18. Thus, the function ID "O01-01-04" is output.

Subsequently, in S1603 of FIG. 16, the control command "CMD=0xFFA05053" and the response message "The heater 1 was turned down low" corresponding to the function ID "O01-01-04" are generated from the appliance function DB 630 (FIG. 18).

Accordingly, in response to the utterance "Heat the pot over a low heat" made by the user 250, the "heater 1" with which chikuzen-ni stew is being cooked, rather than the "heater 2" with which hamburger steak is being cooked, can be accurately turned down low. In the fifth specific example, "Heat the pot over a low heat" is an example of instruction information, "low heat" is an example of first audio information (operation instructions), and "pot" is an example of first cookware information or second cookware information and is also an example of second audio information.

Note that the task content <low_heat> in the appliance function DB 630 illustrated in FIG. 18, which corresponds to the word name "low heat" in the utterance interpretation dictionary DB 625 illustrated in FIG. 13B, is an example of operation instructions for executing a process having a cooking parameter different from a process that is being executed in accordance with a cooking program.

In the fifth specific example, the cooking parameter is the temperature of the heat, that is, a set temperature. However, a cooking parameter in the present disclosure is not limited to a set temperature. The cooking parameter may be, for example, the duration for which a set temperature is maintained, an inclination toward change in temperature, or a heating on/off duty ratio. In other words, instructions given by the user 250 through utterance may include instructions to change the duration for which a set temperature is maintained.

As described above, according to the first embodiment, in a case where different meals are being cooked simultaneously using two cooking units, e.g., the "heater 1" and the "heater 2" of the IH cooker 244, which of the cooking units instructions have been given to by the user 250 through utterance can be accurately determined.

In addition, in the first embodiment, a response error message is output if it is difficult to determine which cooking unit instructions are provided to. The response error message can prompt the user 250 to make an appropriate utterance.

While the first embodiment described above provides an example in which the audio input and output device 240, the display terminal 260, and the home electric appliances 101 are separate from one another, the present disclosure is not limited to this embodiment. The display terminal 260 may include the audio input and output device 240. Alternatively, each of the home electric appliances 101 may include the audio input and output device 240 and/or the display terminal 260.

Second Embodiment

Figure 27:
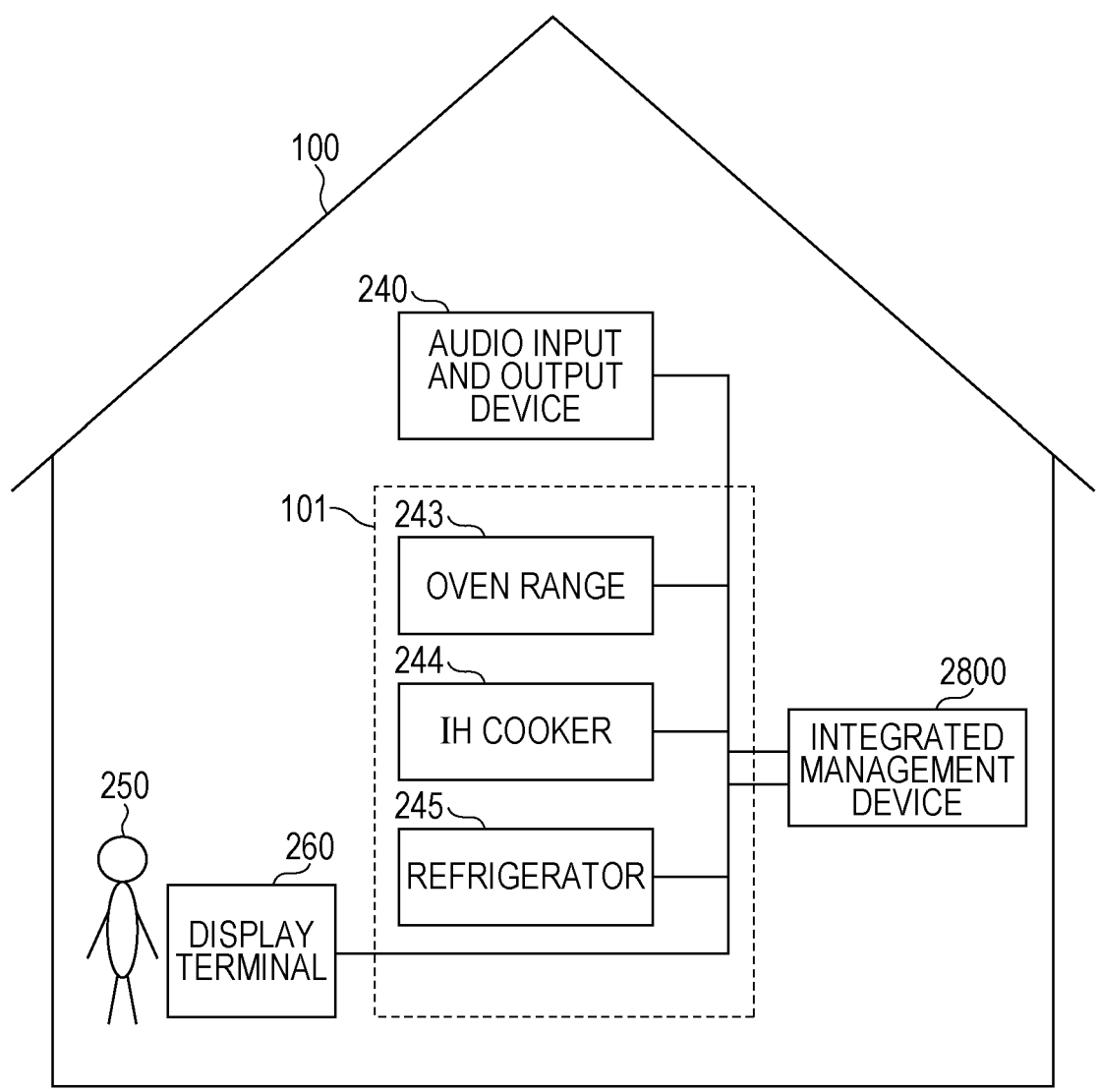
FIG. 27 is a diagram illustrating the configuration of a speech-based appliance control system according to a second embodiment.

FIG. 27 is a diagram illustrating the configuration of a speech-based appliance control system according to a second embodiment. In the second embodiment, substantially the same elements as those in the first embodiment are assigned the same numerals, and are not described in detail herein. In the following, a description will be given of the second embodiment, focusing on differences from the first embodiment.

The speech-based appliance control system according to the second embodiment includes the audio input and output device 240, the plurality of home electric appliances 101, the display terminal 260, and an integrated management device 2800. That is, the speech-based appliance control system according to the second embodiment includes the integrated management device 2800 in place of the gateway 102, the information communication network 220, and the cloud server 111 in the speech-based appliance control system according to the first embodiment.

The integrated management device 2800 is located in the group 100. The integrated management device 2800 may be connected to the display terminal 260, the audio input and output device 240, and the plurality of home electric appliances 101 using wired or wireless connection.

In the second embodiment, the integrated management device 2800 is separate from the home electric appliances 101. However, the present disclosure is not limited to this embodiment. For example, the oven range 243, the IH cooker 244, or the refrigerator 245 may include the integrated management device 2800.

Figure 28A:
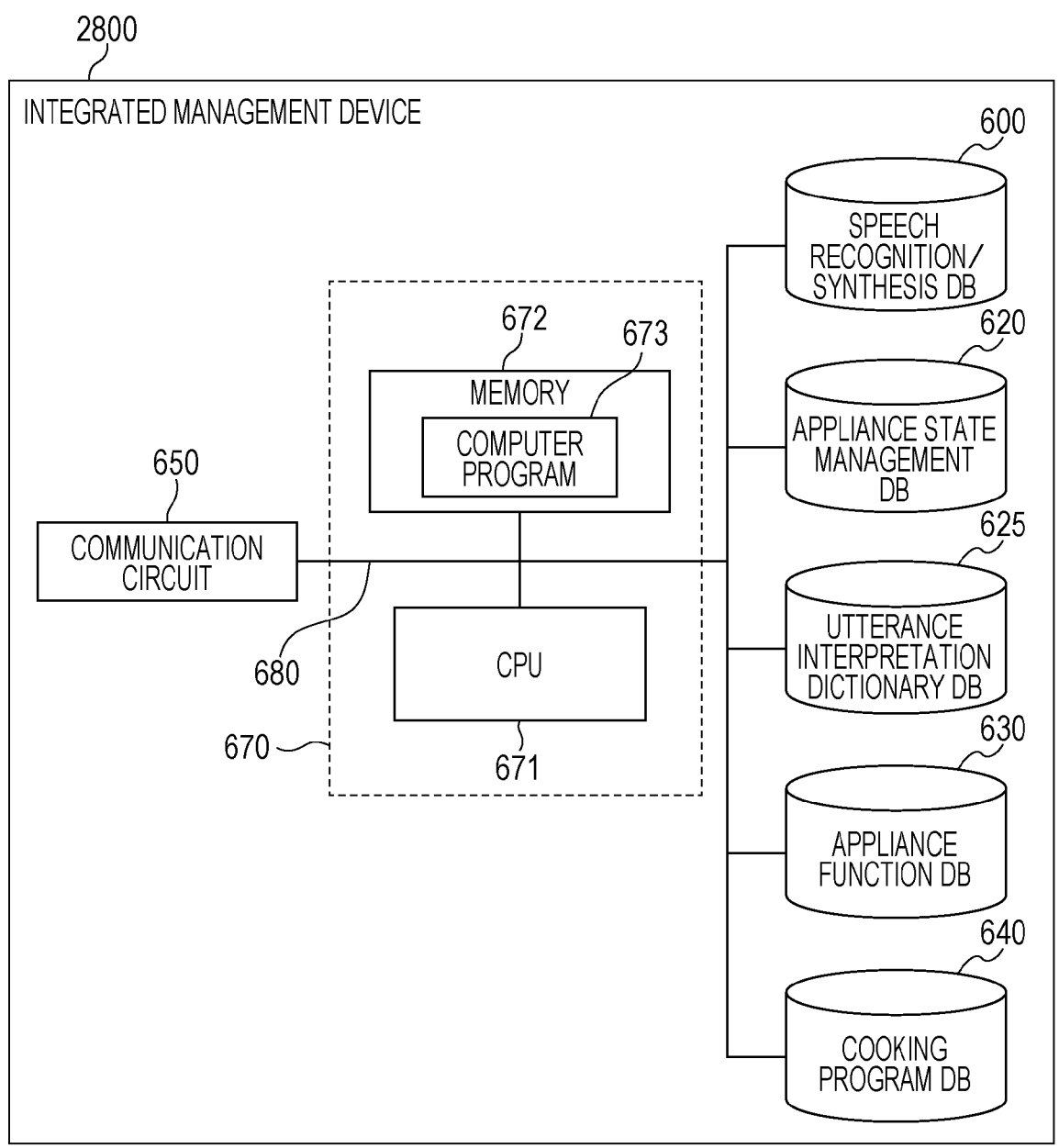
FIG. 28A is a block diagram illustrating the hardware configuration of an integrated management device.

FIG. 28A is a block diagram illustrating the hardware configuration of the integrated management device 2800. The integrated management device 2800 includes the communication circuit 650, the processing circuit 670, the speech recognition database (DB) 600, the appliance state management DB 620, the utterance interpretation dictionary DB 625, the appliance function DB 630, and the cooking program DB 640. The processing circuit 670 includes the CPU 671 and the memory 672 in which the computer program 673 is stored. In this manner, the integrated management device 2800 has substantially the same hardware configuration as that of the cloud server 111 illustrated in FIG. 7.

Figure 28B:
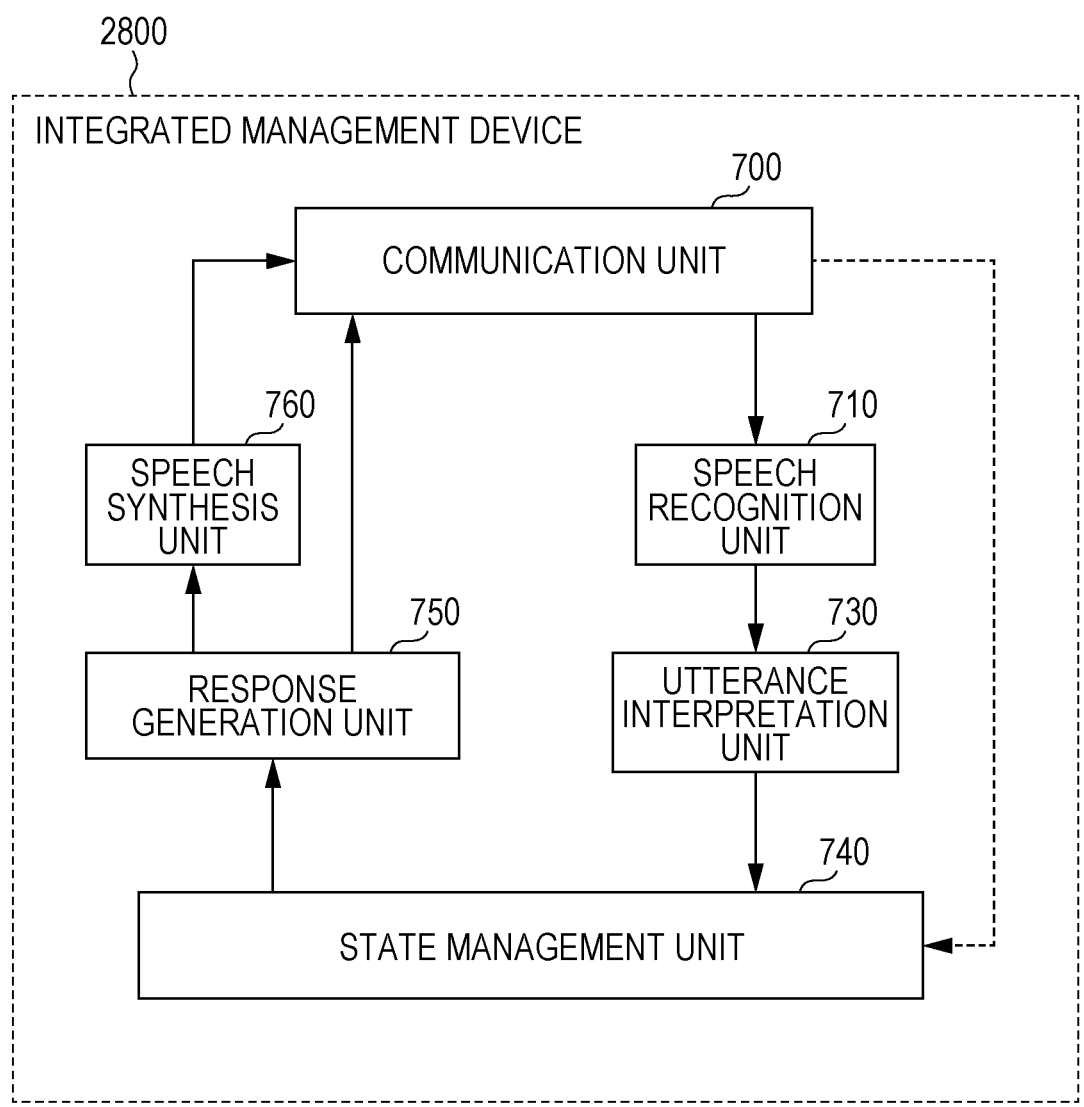
FIG. 28B is a block diagram illustrating the system configuration of the integrated management device.

FIG. 28B is a block diagram illustrating the system configuration of the integrated management device 2800. The integrated management device 2800 includes the communication unit 700, the speech recognition unit 710, the utterance interpretation unit 730, the state management unit 740, the response generation unit 750, and the speech synthesis unit 760. In this manner, the integrated management device 2800 has substantially the same system configuration as that of the cloud server 111 illustrated in FIG. 11.

FIG. 29 is a diagram illustrating a specific example of the appliance state management DB 620 according to the second embodiment. The appliance state management DB 620 according to the second embodiment holds appliance IDs, appliance names <appliance>, ongoing cooking program IDs, ongoing cooking step IDs, cookware names <equipment>, menu names <menu>, and appliance operating states in association with one another. The appliance state management DB 620 according to the second embodiment is different from the appliance state management DB 620 according to the first embodiment illustrated in FIG. 17 in that no gateway ID is held.

FIGS. 30A and 30B are sequence diagrams illustrating the operation of the speech-based appliance control system according to the second embodiment. In FIGS. 30A and 30B, substantially the same steps as those in the operation of the speech-based appliance control system according to the first embodiment illustrated in FIGS. 21 to 23 are assigned the same numerals.

The processes executed by the cloud server 111 in the first embodiment (FIGS. 21 to 23) are executed by the integrated management device 2800 in the second embodiment (FIGS. 30A and 30B).

In the second embodiment (FIGS. 30A and 30B), transmission and reception processes between the cloud server 111 and the gateway 102, which are performed in the first embodiment (FIGS. 21 to 23), are not performed, and the received data analysis processes performed by the gateway 102 are not performed.

In the first embodiment (FIGS. 21 to 23), the display terminal 260 and the cooking appliance 400 transmit data to the gateway 102, whereas in the second embodiment (FIGS. 30A and 30B), the display terminal 260 and the cooking appliance 400 transmit data to the integrated management device 2800.

The operation of the speech-based appliance control system according to the first embodiment (FIGS. 21 to 23) and the operation of the speech-based appliance control system according to the second embodiment (FIGS. 30A and 30B) are the same except for the points described above.

Figure 31:
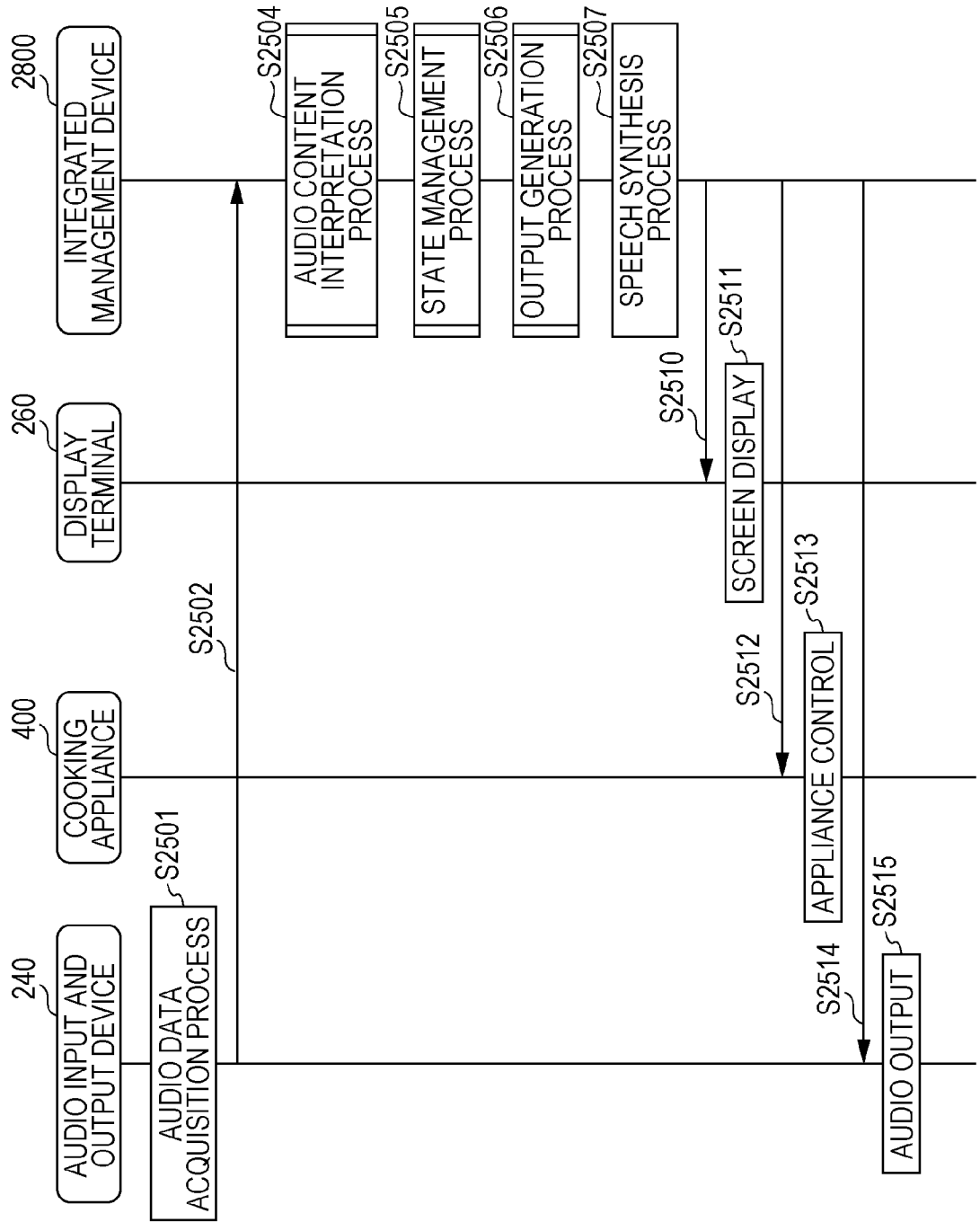
FIG. 31 is a sequence diagram illustrating a process for determining the target of audio instructions in the speech-based appliance control system according to the second embodiment.

FIG. 31 is a sequence diagram illustrating a process for determining the target of audio instructions in the speech-based appliance control system according to the second embodiment. In FIG. 31, substantially the same steps as those in the process of the speech-based appliance control system according to the first embodiment illustrated in FIG. 25 are assigned the same numerals.

The processes executed by the cloud server 111 in the first embodiment (FIG. 25) are executed by the integrated management device 2800 in the second embodiment (FIG. 31).

In the second embodiment (FIG. 31), transmission and reception processes between the cloud server 111 and the gateway 102, which are performed in the first embodiment (FIG. 25), are not performed, and the received data analysis process performed by the gateway 102 is not performed.

In the first embodiment (FIG. 25), the audio input and output device 240 transmits data to the gateway 102, whereas in the second embodiment (FIG. 31), the audio input and output device 240 transmits data to the integrated management device 2800.

The process of the speech-based appliance control system according to the first embodiment (FIG. 25) and the process of the speech-based appliance control system according to the second embodiment (FIG. 31) are the same except for the points described above.

As described above, in the second embodiment, the processes executed by the cloud server 111 in the first embodiment are executed by the integrated management device 2800. The other points are similar to those in the first embodiment, and thus the advantages achievable by the second embodiment are similar to the advantages achievable by the first embodiment.

In the first embodiment described above, only the cloud server 111 has the appliance state management DB 620. In the second embodiment described above, in contrast, only the integrated management device 2800 has the appliance state management DB 620. However, the present disclosure is not limited to these embodiments.

Figure 32:
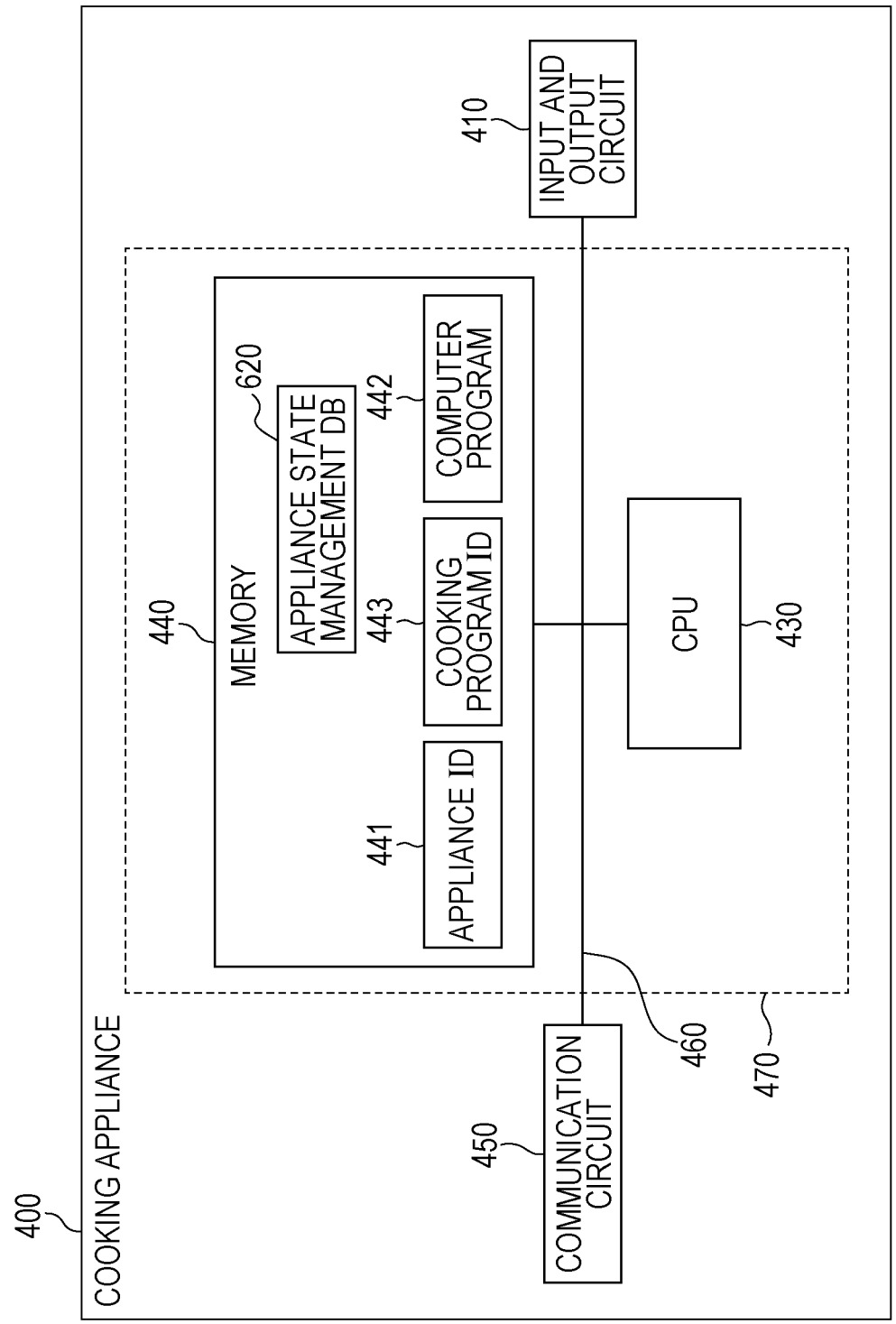
FIG. 32 is a block diagram illustrating the hardware configuration of a cooking appliance according to another embodiment.

FIG. 32 is a block diagram illustrating another example of the hardware configuration of the cooking appliance 400. In FIG. 32, the memory 440 in the cooking appliance 400 additionally includes the appliance state management DB 620.

In the configuration illustrated in FIG. 32, the cooking appliance 400 holds information stored in the appliance state management DB 620. Accordingly, upon receipt of a control command including a cooking program ID, the CPU 430 of the cooking appliance 400 can identify an appliance ID from the information stored in the appliance state management DB 620. Thus, the appliance control unit 910 in the cooking appliance 400 can activate a cooking unit (e.g., the heater 2 of the IH cooker 244) corresponding to the identified appliance ID in accordance with the control command.

While the second embodiment described above provides an example in which the audio input and output device 240, the display terminal 260, the home electric appliances 101, and the integrated management device 2800 are separate from one another, the present disclosure is not limited to this embodiment. The display terminal 260 may include the audio input and output device 240. Alternatively, each of the home electric appliances 101 may include the audio input and output device 240 and/or the display terminal 260. Additionally, each of the home electric appliances 101 may include the integrated management device 2800.

OTHER EMBODIMENTS

A description will now be given of a further embodiment in which a user cooks by applying a cooking recipe that uses a plurality of cooking appliances to a speech-based interactive software agent. The speech-based interactive software agent may be mounted in each cooking appliance, or may be installed in a house so that home cooking appliances or home electric appliances are uniformly controllable. By way example, the speech-based interactive software agent is configured to be able to access each of the home electric appliances and vice versa. In the following, the speech-based interactive software agent is sometimes referred to simply as "the agent".

Here, it is assumed to provide, for example, a cooking recipe that uses an IH cooker or a gas stove, a microwave oven, and an oven to make roast beef and its accompanying boiled vegetables.

The agent notifies the user that the user has to thaw frozen beef, which is an ingredient, and instructs the user to put the frozen beef in the microwave oven and press a thaw button. In this case, the agent accesses the microwave oven to check that the thaw button has been pressed. The agent may also check that the thaw button has been pressed, by receiving a notification from the user that the user has completed carrying out the thawing instructions.

When it is confirmed that the thaw button has been pressed, the agent instructs the user to boil water using the IH cooker to make boiled vegetables which will accompany the roast beef. In response to the instructions, the user pours water into a pot and activates the IH cooker. Also in this case, the agent accesses the IH cooker to check that the IH cooker has been activated. Preferably, the press of a boiling-water button or the like on the IH cooker is detected. Simply, the activation of the IH cooker may be detected. Alternatively, the user may inform the agent that the water has started to boil. Instead of the IH cooker, a gas stove, an electronic kettle, or any other suitable cooking equipment may be used.

After checking that the water has started to boil, the agent instructs the user to prepare vegetables for boiling. Here, the agent may give detailed instructions, such as how to cut or slice the vegetables, to the user. The user informs the agent that the preparation has been completed.

After completion of the thawing of the frozen beef or the boiling of the water, the microwave oven and the IH cooker notify the agent of completion of the action. If access between the microwave oven or the IH cooker and the agent is not available, the user may inform the agent of completion of the action.

After checking the microwave oven and IH cooker and detecting the completion of the thawing of the frozen beef or the boiling of the water, the agent gives further instructions to the user to perform the subsequent operation. Examples of the instructions include taking the beef out of the microwave oven and preparing the beef. Other examples of the instructions include putting the vegetables into the pot filled with boiling water on the IH cooker and boiling the vegetables for, for example, 10 minutes. Placing the vegetables into the pot temporarily reduces the temperature of the water in the pot. Thus, the agent may detect a reduction in temperature, and start a timer to run for 10 minutes after the detection to notify the user when to lift the vegetables out of the pot. The agent may also prompt the user to preheat the oven to, for example, 250 degrees at the same time instructions are given to prepare the beef.

After detecting the completion of the preparation of the beef, the agent instructs the user to put the beef into the oven. Here, the user may inform the agent of the completion of the preparation of the beef.

Upon a sensor or the like in the oven detecting that the beef has been put into the oven, the agent activates the oven. For example, the agent causes the oven to perform operations including roasting the beef at 250 degrees for 15 minutes, and then turning the temperature of the oven down to 160 degrees and roasting the beef for a further 40 minutes. In this case, the agent may perform automatic setting of the operations on the oven, or may instruct the user to operate the oven. In this case, the agent may notify the user when to turn down the temperature of the oven, by using the timer through measurement, at an appropriate time. Alternatively, the user may be prompted to set in advance a temperature control program to turn the temperature of the oven down to 160 degrees after 15 minutes.

After checking that cooking in the oven has been completed, the agent instructs the user to make a sauce from the drippings left over on a roasting tray in the oven. For example, the agent instructs the user to pour the meat juices into a saucepan or a frying pan and to heat the meat juices using the IH cooker. In this case, the agent may automatically set the heating program for the IH cooker to make a sauce, or may instruct the user at an appropriate time to change the heating level. Additionally, instructions for spices and similar items to be added to the meat juices are also given as necessary.

After detecting the completion of the sauce, the agent instructs the user to arrange the boiled vegetables and the roast beef on a plate. After that, the cooking of the recipe is completed.

In this manner, when applying a cooking recipe that uses a plurality of cooking appliances, a speech-based interactive software agent is capable of checking the progress of the cooking by receiving a notification of an operation check from each cooking appliance, and is capable of giving instructions to the user in accordance with the progress.

The processes described above may not necessarily be applied to cooking, and may also be applied to other activities using a plurality of home electric appliances.

While speech-based appliance control systems according to some embodiments have been described above, the present invention is not limited to the embodiments herein described.

The processing units included in the speech-based appliance control systems according to the embodiments described above are typically implemented as large scale integrated circuits (LSIs) that are integrated circuits. These processing units may be separated into single chips, or some or all of them may be integrated into a single chip.

The approach of fabricating an integrated circuit is not limited to an LSI technology, and may be implemented by a dedicated circuit or a general-purpose processor. A field programmable gate array (FPGA) that is programmable after an LSI is fabricated or a reconfigurable processor capable of reconfiguring the connection or setting of circuit cells in the LSI may be used.

In the embodiments described above, each constituent element may be implemented in dedicated hardware or may be implemented by the execution of a software program suitable for the constituent element. Each constituent element may be implemented by reading and executing, with a program executing unit such as a CPU or a processor, a software program recorded on a recording medium such as a hard disk or a semiconductor memory.

One embodiment of the present invention may be implemented as the program described above, or may be implemented as a non-transitory computer-readable recording medium storing the program described above. It is to be understood that the program described above may be distributed via a transmission medium such as the Internet.

The numbers or values used herein are illustrative in order to clarify the present invention, and the present invention is not limited to the illustrated numbers or values. In addition, connection relationships between constituent elements are illustrative in order to clarify the present invention, and the connection relationships that achieve the functions in the present invention are not limited to the illustrated connection relationships.

In addition, the divisions of function blocks in the block diagrams are examples. A plurality of function blocks may be implemented as a single function block, a single function block may be divided into a plurality of pieces, or some functions may be transferred to other function blocks. Additionally, the functions of a plurality of function blocks having similar functions may be processed by a single hardware or software component in parallel or time-sharing fashion.

While a speech-based appliance control system according to an aspect has been described with reference to some embodiments, the present invention is not limited to the embodiments described herein. Various modifications that might be made by those skilled in the art to the embodiments described herein, and embodiments that might be made by combining constituent elements in different embodiments may also be contained within an aspect without departing from the scope of the present invention.

Cloud Service Models

The techniques described in the embodiments described above are feasible in, for example, the following cloud service models. However, the models in which the techniques described in the embodiments described above are feasible are not limited to the following models.

Service Model 1: Local-Data-Center-Based Cloud Service

Figure 33:
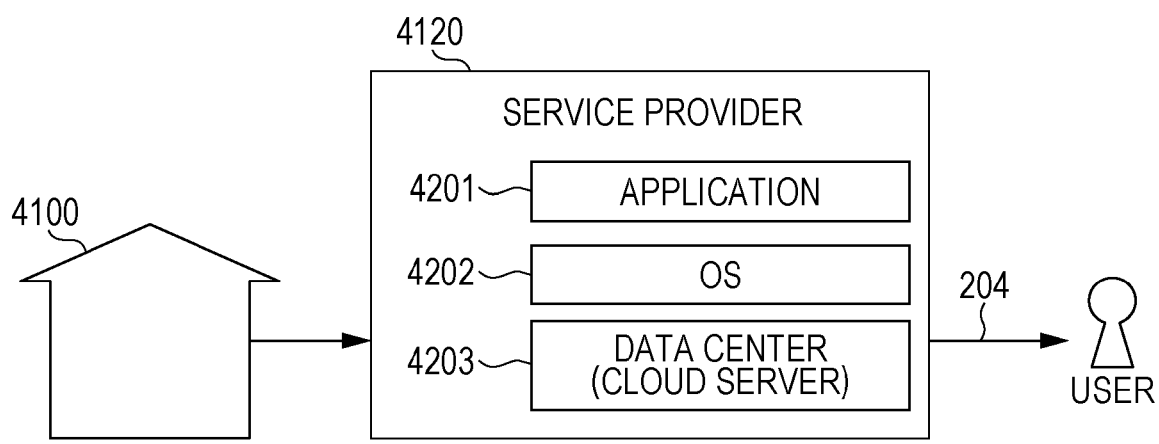
FIG. 33 is a diagram illustrating an overview of a service provided by a speech-based appliance control system in service model 1 (local-data-center-based cloud service)

FIG. 33 is a diagram illustrating an overview of a service provided by a speech-based appliance control system in service model 1 (local-data-center-based cloud service). In this model, the service provider 4120 acquires information from the group 4100, and provides a service to a user. In this model, the service provider 4120 has the function of a data center management company. That is, the service provider 4120 owns a cloud server 4203 that manages big data. Accordingly, no data center management company exists.

In this model, the service provider 4120 operates and manages the data center (cloud server) 4203. In addition, the service provider 4120 manages an operating system (OS) 4202 and an application 4201. The service provider 4120 provides a service using the OS 4202 and the application 4201 that are managed by the service provider 4120 (arrow 204).

Service Model 2: IaaS-Based Cloud Service

Figure 34:
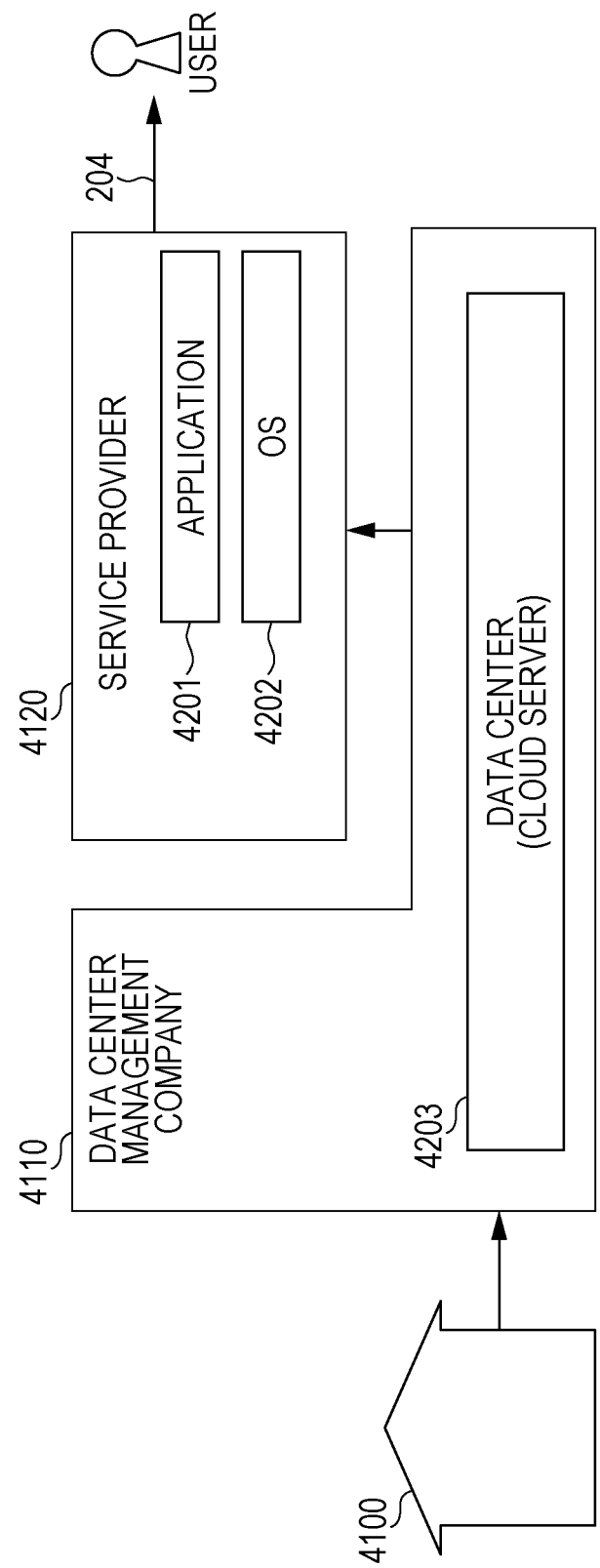
FIG. 34 is a diagram illustrating an overview of a service provided by a speech-based appliance control system in service model 2 (IaaS-based cloud service)

FIG. 34 is a diagram illustrating an overview of a service provided by a speech-based appliance control system in service model 2 (IaaS-based cloud service). IaaS is an acronym for Infrastructure as a Service, and is a cloud service providing model that provides, as a service via the Internet, an infrastructure itself to build and run a computer system.

In this model, the data center management company 4110 operates and manages the data center (cloud server) 4203. In addition, the service provider 4120 manages the OS 4202 and the application 4201. The service provider 4120 provides a service using the OS 4202 and the application 4201 that are managed by the service provider 4120 (arrow 204).

Service Model 3: PaaS-Based Cloud Service

Figure 35:
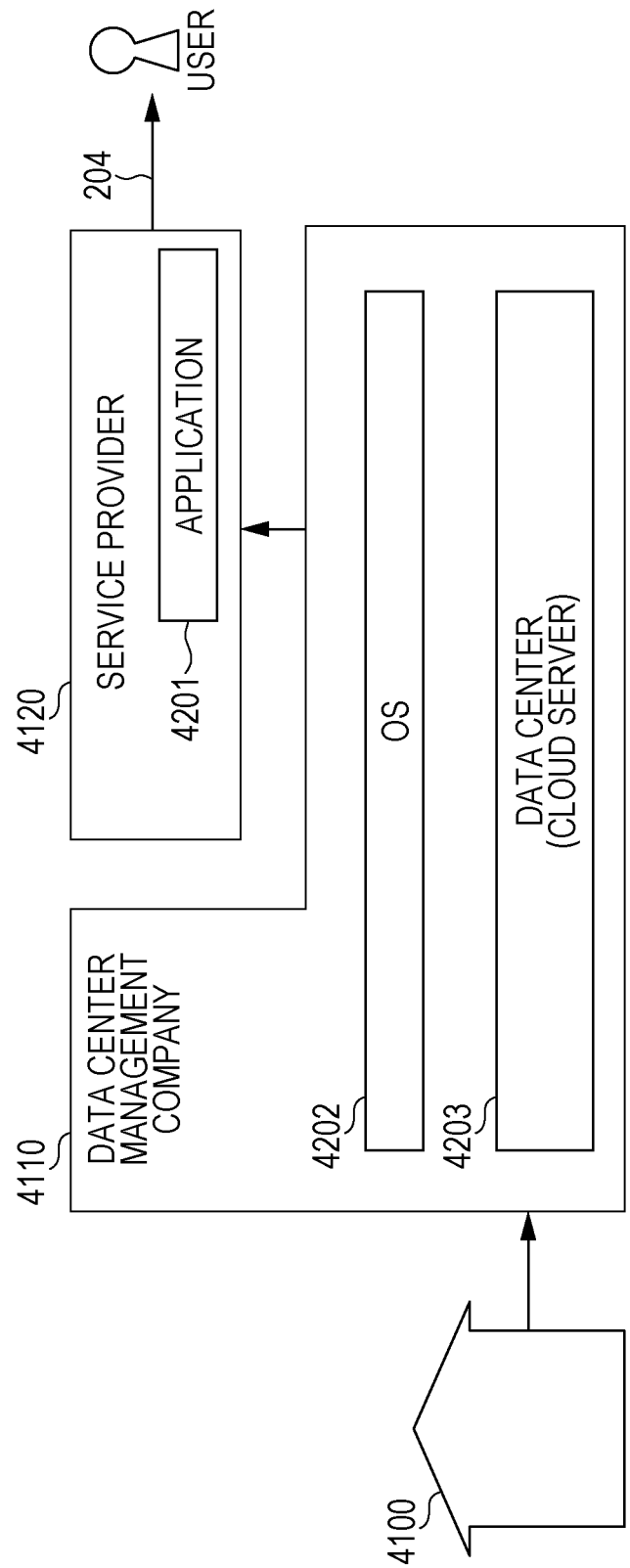
FIG. 35 is a diagram illustrating an overview of a service provided by a speech-based appliance control system in service model 3 (PaaS-based cloud service)

FIG. 35 is a diagram illustrating an overview of a service provided by a speech-based appliance control system in service model 3 (PaaS-based cloud service). PaaS is an acronym for Platform as a Service, and is a cloud service providing model that provides, as a service via the Internet, a platform which provides a foundation to build and run software.

In this model, the data center management company 4110 manages the OS 4202, and operates and manages the data center (cloud server) 4203. In addition, the service provider 4120 manages the application 4201. The service provider 4120 provides a service using the OS 4202 managed by the data center management company 4110 and the application 4201 managed by the service provider 4120 (arrow 204).

Service Model 4: SaaS-Based Cloud Service

Figure 36:
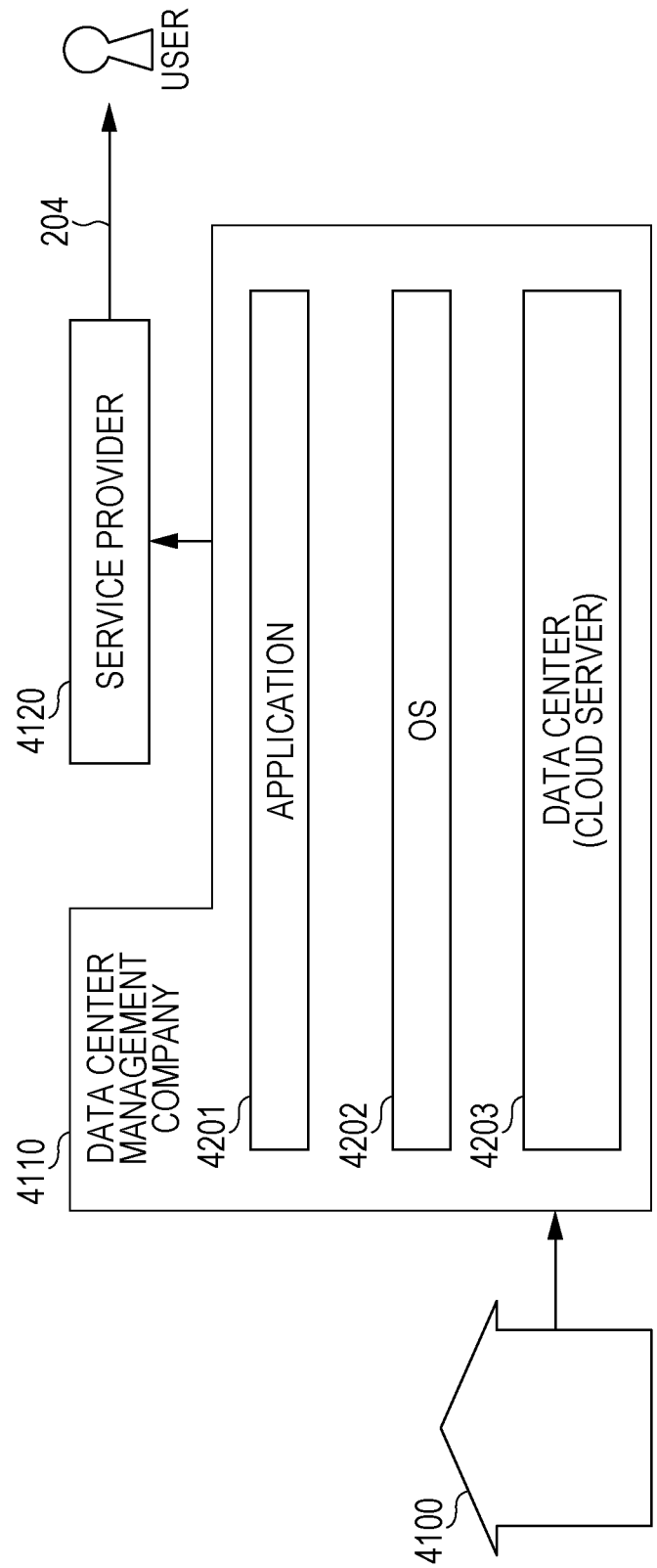
FIG. 36 is a diagram illustrating an overview of a service provided by a speech-based appliance control system in service model 4 (SaaS-based cloud service).

FIG. 36 is a diagram illustrating an overview of a service provided by a speech-based appliance control system in service model 4 (SaaS-based cloud service). SaaS is an acronym for Software as a Service. The SaaS-based cloud service is a cloud service providing model in which, for example, a user such as a company or an individual who does not own a data center (cloud server) has a function of being able to use, via a network such as the Internet, an application provided by a platform provider that owns a data center (cloud server).

In this model, the data center management company 4110 manages the application 4201, manages the OS 4202, and operates and manages the data center (cloud server) 4203. In addition, the service provider 4120 provides a service using the OS 4202 and the application 4201 that are managed by the data center management company 4110 (arrow 204).

Accordingly, the service provider 4120 provides a service in any of the cloud service models described above. In addition, for example, the service provider 4120 or the data center management company 4110 may develop the OS 4202, the application 4201, a database for big data, or the like by itself, or may outsource the development to a third party.

The present disclosure is applicable to a speech-based appliance control system that controls a cooking appliance by using speech, and to the cooking appliance used in the speech-based appliance control system.

What is claimed is:

1. A method for controlling a cooking appliance using a user's speech in a speech-based appliance controller, including the cooking appliance and an audio input device that receives an input of the user's speech, the cooking appliance including a first cooker and a second cooker, the method comprising:

transmitting, to the cooking appliance via a first network, first cooking program information indicating a first cooking program, the first cooking program corresponding to a first cooking recipe, and second cooking program information indicating a second cooking program, the second cooking program corresponding to a second cooking recipe;

recognizing, when instruction information including first audio information indicating operation instructions for the cooking appliance is received from the audio input device, and the first cooker is operated based on the first cooking program and the second cooker is operated based on the second cooking program, the operation instructions from the first audio information;

determining, using a database that manages first cooking menu information indicating a name of a cooking menu item corresponding to the first cooking recipe and second cooking menu information indicating the name of a cooking menu item corresponding to the second cooking recipe, whether or not the received instruction information includes the first audio information and second audio information related to the first cooking menu information or the second cooking menu information; and transmitting, when it is determined that the received instruction information includes the second audio information, to the cooking appliance via the first network, a control command for causing the cooking appliance to execute a process corresponding to the operation instructions, without executing a process that is based on the first cooking program or the second cooking program corresponding to one of the first cooking menu information or the second cooking menu information to which the second audio information is related.

2. The appliance control method according to claim 1, further comprising providing, when it is determined that the instruction information does not include the second audio information, a user of the cooking appliance with an error message indicating that the process corresponding to the operation instructions is not executable at the cooking appliance.

3. The appliance control method according to claim 2, wherein the speech-based appliance controller is further connected to a display, and the error message is displayed on the display.

4. The appliance control method according to claim 2, wherein the speech-based appliance controller is further connected to an audio output device that outputs audio, and the error message is provided to the user of the cooking appliance using the audio output device.

5. The appliance control method according to claim 1, wherein the operation instructions are used for interrupting the process that is based on the first cooking program or the second cooking program in the cooking appliance.

6. The appliance control method according to claim 1, wherein the operation instructions are used for executing a process having a cooking parameter different from a process that is being executed in the cooking appliance in accordance with the first cooking program or the second cooking program.

7. The appliance control method according to claim 1, wherein the speech-based appliance controller further includes a display device, and
the method further comprises:
transmitting display screen information to the display via a second network, the display screen information indicating a display screen that provides two or more cooking recipes including the first cooking recipe and the second cooking recipe, and
receiving, from the display via the second network, first cooking recipe selection information and second cooking recipe selection information, the first cooking recipe selection information indicating that the first cooking recipe has been selected on the display, the second cooking recipe selection information indicating that the second cooking recipe has been selected on the display.

8. The appliance control method according to claim 7, wherein
the first cooking program information is transmitted to the cooking appliance via the display in response to receipt of the first cooking recipe selection information from the display, and
the second cooking program information is transmitted to the cooking appliance via the display in response to receipt of the second cooking recipe selection information from the display.

9. The appliance control method according to claim 1, wherein
the database includes correspondence relationship information indicating a first correspondence relationship between the first cooker and the first cooking program and a second correspondence relationship between the second cooker and the second cooking program,
the method further comprises specifying one of the first cooker or the second cooker that is to execute the process corresponding to the operation instructions from the first cooker and the second cooker based on the correspondence relationship information, and
the control command includes specific-cooking-unit information indicating the specified one of the first cooker and the second cooker.

10. The appliance control method according to claim 9, wherein
the cooking appliance manages the correspondence relationship information, and
the appliance control method further comprises:
specifying a cooker that is to execute the process corresponding to the operation instructions from the first cooker and the second cooker based on the correspondence relationship information and the specific-cooking-unit information, and
causing the specified cooker to execute the process corresponding to the operation instructions.

11. The appliance control method according to claim 3, wherein the display is included in the cooking appliance.

12. The appliance control method according to claim 7, wherein the display is included in the cooking appliance.

13. The appliance control method according to claim 3, wherein the display is included in an appliance that is different from the cooking appliance.

14. The appliance control method according to claim 7, wherein the display is included in an appliance that is different from the cooking appliance.

15. A method for controlling a cooking appliance using a user's speech in a speech-based appliance controller, the speech-based appliance controller including the cooking appliance and an audio input device that receives an input of user's speech, the cooking appliance including a first cooker and a second cooker, the method comprising:
transmitting, to the cooking appliance via a first network, first cooking program information indicating a first cooking program, the first cooking program corresponding to a first cooking recipe, and second cooking program information indicating a second cooking program different from the first cooking program, the second cooking program corresponding to a second cooking recipe;
recognizing, when instruction information including first audio information indicating operation instructions for the cooking appliance is received from the audio input device, and the first cooker is operated based on the first cooking program and the second cooker is operated based on the second cooking program, the operation instructions from the first audio information;
determining, using a database that manages first cookware information indicating a name of a cookware item used in the first cooking recipe and second cookware information indicating the name of a cookware item used in the second cooking recipe, whether or not the instruction information includes the first audio information and second audio information related to the first cookware information or the second cookware information; and
transmitting, when it is determined that the instruction information includes the second audio information, to the cooking appliance via the first network, a control command for causing the cooking appliance to execute a process corresponding to the operation instructions without executing a process that is based on the first cooking program or the second cooking program corresponding to one of the first cookware information or the second cookware information to which the second audio information is related.

16. The appliance control method according to claim 15, further comprising
providing, when it is determined that the instruction information does not include the second audio information, the user of the cooking appliance with an error message indicating that the process corresponding to the operation instructions is not executable at the cooking appliance.

17. The appliance control method according to claim 15, wherein
the operation instructions are used for interrupting a process that is being executed in the cooking appliance in accordance with the first cooking program or the second cooking program.

18. The appliance control method according to claim 15, wherein
the operation instructions are used for executing a process having a cooking parameter different from a process that is being executed in the cooking appliance in accordance with the first cooking program or the second cooking program.

19. The appliance control method according to claim 15, wherein the speech-based appliance controller further includes a display, and
the method further comprises:
transmitting, to the display via a second network, display screen information, the display screen information indicating a display screen that provides two or more cooking recipes including the first cooking recipe and the second cooking recipe, and receiving, from the display via the second network, first cooking recipe selection information and second cooking recipe selection information, the first cooking recipe selection information indicating that the first cooking recipe has been selected on the display, the second cooking recipe selection information indicating that the second cooking recipe has been selected on the display.

20. The appliance control method according to claim 15, wherein the database includes correspondence relationship information indicating a first correspondence relationship between the first cooker and the first cooking program and a second correspondence relationship between the second cooker and the second cooking program, the method further comprises specifying one of the first cooker or the second cooker that is to execute the process corresponding to the operation instructions from the first cooker and the second cooker based on the correspondence relationship information, and the control command includes specific-cooking-unit information indicating the specified one of the first cooker and the second cooker.

21. The appliance control method according to claim 20, wherein the process corresponding to the operation instructions are executed at the one of the first cooker or the second cooker specified based on the specific-cooking-unit information.

22. A speech-based appliance control system comprising:

a cooking appliance having a first cooker and a second cooker;

an audio input device that receives an input of a user's speech; and a server connectable to the cooking appliance and the audio input device, the cooking appliance being controlled using the user's speech, the cooking appliance including a first communicator that receives, from the server, first cooking program information indicating the first cooking program, the first cooking program corresponding to a first cooking recipe, and second cooking program information indicating the second cooking program, the second cooking program corresponding to a second cooking recipe, and a second controller that causes the first cooker to operate based on a first cooking program, and causes the second cooker to operate based on a second cooking program different from the first cooking program, the audio input device including an audio acquirer that acquires instruction information including first audio information indicating operation instructions for the cooking appliance, and a second communicator that transmits the acquired instruction information to the server, the server including a third communicator that transmits the first cooking program information and the second cooking program information to the cooking appliance, a database that manages first cooking menu information indicating a name of a cooking menu item corresponding to the first cooking recipe and second cooking menu information indicating the name of a cooking menu item corresponding to the second cooking recipe, a determiner that, when the instruction information is received from the audio input device, and the first cooker is operated based on the first cooking program and the second cooker is operated based on the second cooking program, recognizes the operation instructions from the first audio information included in the received instruction information and determines whether or not the instruction information includes second audio information related to the first cooking menu information or the second cooking menu information, and a fourth communicator that, when it is determined that the instruction information includes the second audio information, transmits, to the cooking appliance a control command for causing the cooking appliance to execute a process corresponding to the operation instructions, without executing a process that is executed in accordance with the first cooking program or the second cooking program corresponding to one of the first cooking menu information or the second cooking menu information to which the second audio information is related.

23. A cooking appliance used in the speech-based appliance control system according to claim 22.

* * * * *